US011375031B2

(12) United States Patent
Fablet et al.

(10) Patent No.: US 11,375,031 B2
(45) Date of Patent: Jun. 28, 2022

(54) ADAPTIVE DATA STREAMING METHOD WITH PUSH MESSAGES CONTROL

(71) Applicant: CANON KABUSHIKI KAISHA, Tokyo (JP)

(72) Inventors: Youenn Fablet, La Dominelais (FR); Romain Bellessort, Rennes (FR); Frédéric Maze, Langan (FR); Naël Ouedraogo, Maure de Bretagne (FR); Franck Denoual, Saint Domineuc (FR); Hervé Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 16/908,418

(22) Filed: Jun. 22, 2020

(65) Prior Publication Data

US 2020/0322441 A1 Oct. 8, 2020

Related U.S. Application Data

(63) Continuation of application No. 16/107,093, filed on Aug. 21, 2018, now Pat. No. 10,728,353, which is a (Continued)

(30) Foreign Application Priority Data

Jul. 12, 2013 (GB) ...................................... 1312547
Jul. 12, 2013 (GB) ...................................... 1312561
Jun. 12, 2014 (GB) ...................................... 1410540

(51) Int. Cl.
*G06F 15/16* (2006.01)
*H04L 67/55* (2022.01)
(Continued)

(52) U.S. Cl.
CPC .......... *H04L 67/26* (2013.01); *H04L 65/4069* (2013.01); *H04L 65/4084* (2013.01);
(Continued)

(58) Field of Classification Search
CPC ... H04L 63/20; H04L 41/0893; H04L 43/026; H04L 41/22; H04L 43/045; H04L 63/02
(Continued)

(56) References Cited

U.S. PATENT DOCUMENTS

2012/0023254 A1 1/2012 Park
2013/0042015 A1* 2/2013 Begen ................ H04N 21/6125 709/231

FOREIGN PATENT DOCUMENTS

CN 102577411 A 7/2012
CN 103069770 A 4/2013
WO 2013/098317 A1 7/2013

OTHER PUBLICATIONS

I. Fette, et al., The WebSocket Protocol, Internet Engineering Task Force (IETF), Request for Comments: 6455, Dec. 2011, pp. 1-71.
(Continued)

*Primary Examiner* — Wing F Chan
*Assistant Examiner* — Andrew Woo
(74) *Attorney, Agent, or Firm* — Canon U.S.A., Inc. IP Division

(57) ABSTRACT

There is provided methods for managing streaming over communication networks. Server and client devices share a push policy so that the client device may anticipate data pushes by the server. Anticipation makes it possible to cancel early the sending of some pushed data, therefore reducing bandwidth consumption. The shared push policy may be implicit to both server and client. In embodiments, it is explicitly specified by the server to the client, for example embedded in the Media Presentation Description file or included in a specific HTTP header. The client may also request an update of the shared push policy to meet its own requirements.

25 Claims, 29 Drawing Sheets

Related U.S. Application Data continuation of application No. 14/903,989, filed as application No. PCT/EP2014/064949 on Jul. 11, 2014, now Pat. No. 10,104,190.

(51) Int. Cl.

*H04L 65/612* (2022.01)
*H04L 65/60* (2022.01)
*H04L 65/65* (2022.01)
*H04N 21/262* (2011.01)
*H04N 21/472* (2011.01)
*H04L 67/02* (2022.01)
*H04L 65/61* (2022.01)

(52) U.S. Cl.

CPC .......... *H04L 65/602* (2013.01); *H04L 65/608* (2013.01); *H04L 67/02* (2013.01); *H04N 21/26258* (2013.01); *H04N 21/47202* (2013.01)

(58) Field of Classification Search

USPC .................................................. 709/223, 224

See application file for complete search history.

(56) References Cited

OTHER PUBLICATIONS

Belsche, M., Et al. "Hypertext Transfer Protocol version 2.0 draft-ietf-httpbis-http2-03", HTTPbis Working Group, May 2013, pp. 1-48.

* cited by examiner

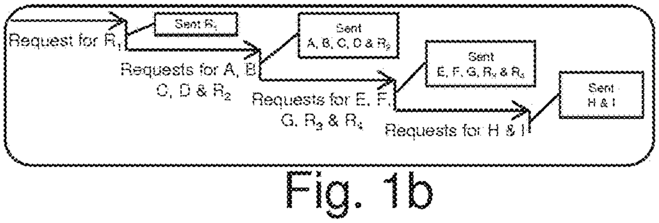
Fig. 1b
Fig. 1a
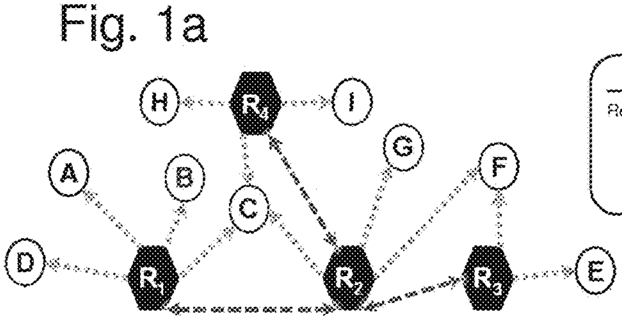
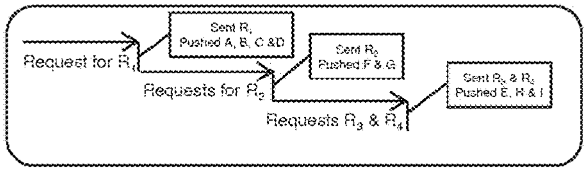
Fig. 1c
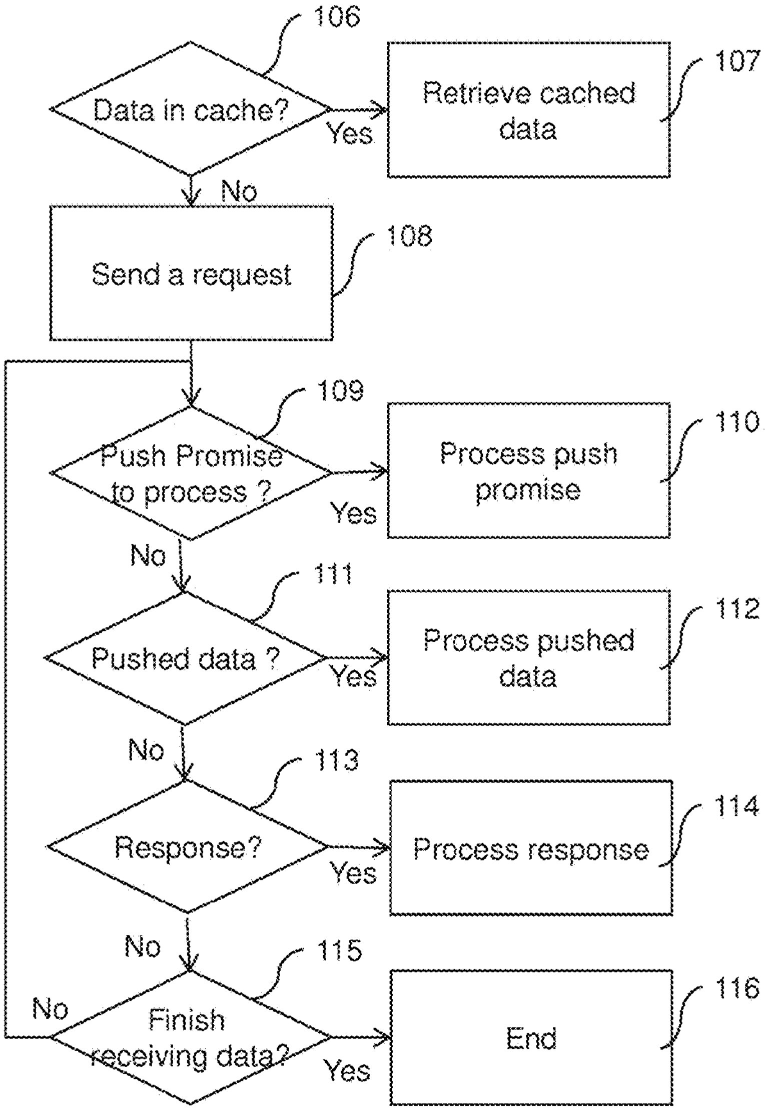
Fig. 1d
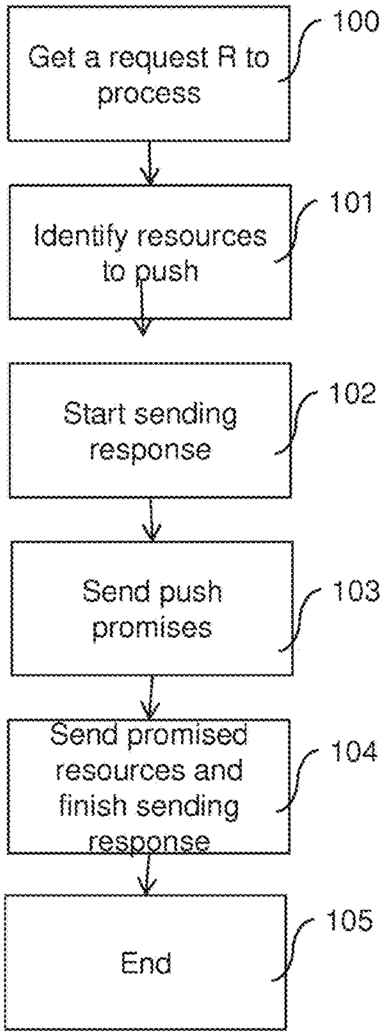
Fig. 1e

```
<?xml version="1.0"?>
    <MPD xmlns:xsi="http://www.w3.org/2001/XMLSchema-instance"
     xmlns="urn:mpeg:DASH:schema:MPD:2011"
     xsi:schemaLocation="urn:mpeg:DASH:schema:MPD:2011 DASH-MPD.xsd"
    type="static"
     mediaPresentationDuration="PT3256S"
     minBufferTime="PT1.2S"
     profiles="urn:mpeg:dash:profile:isoff-on-demand:2011">
     <BaseURL>http://cdn1.example.com/</BaseURL>
     <BaseURL>http://cdn2.example.com/</BaseURL>
    <Period>
<!-- English Audio -->
          <AdaptationSet mimeType="audio/mp4" codecs="mp4a.0x40" lang="en"
500       subsegmentAlignment="true" subsegmentStartsWithSAP="1">
          <ContentProtection schemeIdUri="urn:uuid:706D6953-656C-5244-4D48-
          656164657221"/>
                <Representation id="1" bandwidth="64000">
501                     <BaseURL>7657412348.mp4</BaseURL>
                </Representation>
502             <Representation id="2" bandwidth="32000">
                        <BaseURL>3463646346.mp4</BaseURL>
                </Representation>
<!-- Video -->
          <AdaptationSet mimeType="video/mp4" codecs="avc1.4d0228"
503       subsegmentAlignment="true" subsegmentStartsWithSAP="2">
          <ContentProtection schemeIdUri="urn:uuid:706D6953-656C-5244-4D48-
          656164657221"/>
                <Representation id="6" bandwidth="256000" width="320" height="240">
                        <BaseURL>8563456473.mp4</BaseURL>
                </Representation>
                <Representation id="7" bandwidth="512000" width="320" height="240">
                        <BaseURL>56363634.mp4</BaseURL>
                </Representation>
                <Representation id="8" bandwidth="1024000" width="640" height="480">
                        <BaseURL>562465736.mp4</BaseURL>
                </Representation>
                <Representation id="9" bandwidth="1384000" width="640" height="480">
                        <BaseURL>41325645.mp4</BaseURL>
                </Representation>
                <Representation id="A" bandwidth="1536000" width="1280" height="720">
                        <BaseURL>89045625.mp4</BaseURL>
                </Representation>
                <Representation id="B" bandwidth="2048000" width="1280" height="720">
                        <BaseURL>23536745734.mp4</BaseURL>
                </Representation>
          </AdaptationSet>
     </Period>
</MPD>
```

```
<MPD ...>
600 <Period>
  <BaseURL>http://myserver.com/media</BaseURL>
  <SegmentList>
    <Initialization sourceURL=« URL_SI »/>
  </SegmentList>
601 <AdaptationSet id='1' contentType='video' framerate='30'>
    <!-- Base layer description -->
    <Representation id='R1' mimeType='video/mp4' width='2000' height='1000' bandwidth='512000'>
      <SegmentList>   <SegmentURL media=« URL_BL »/>   </SegmentList>
    </Representation>
  </AdaptationSet>
  <!-- Enhancement layer description, composite track -->
602 <AdaptationSet id='2' contentType='video' framerate='30'>
    <!-- Tile a, b, c and  d are described as components of composite track -->
614 <ContentComponent id='Ta' /><Role schemeIdUri='tiling' value='1:1'/></ContentComponent>
615 <ContentComponent id='Tb'/><Role schemeIdUri='tiling' value='1:2'/></ContentComponent>
616 <ContentComponent id='Tc'/> <Role schemeIdUri='tiling' value='2:1'/></ContentComponent>
617 <ContentComponent id='Td'/> <Role schemeIdUri='tiling' value='2:2'/></ContentComponent>
618 <ContentComponent id='CT'/> <Role schemeIdUri='...role' value='main'/></ContentComponent>
603 <Representation id='R2' mimeType='video/mp4' dependencyId='R1' width='4000' height='2000'
          bandwidth='2048000'>
604   <SubRepresentation level='1' contentComponent='Ta' width='2000' height='1000'/>
605   <SubRepresentation level='2' contentComponent='Tb' width='2000' height='1000'/>
606   <SubRepresentation level='3' contentComponent='Tc' width='2000' height='1000'/>
607   <SubRepresentation level='4' contentComponent='Td' width='2000' height='1000'/>
608   <SubRepresentation level='5' contentComponent='CT' required/>
610   <SegmentList>
        <SegmentURL media=« URL_X index_range=« 0-43 » »/>   620
          ....
      </SegmentList>
    </Representation>
  </AdaptationSet>
 </Period>
</MPD>
```

At client side

At server side

```
                                                  1600
<MPD ...>
  <PushPolicy SegmentIdx="+2"/>
  <Period>
    <BaseURL>http://myserver.com/media</BaseURL>
    <SegmentList>
      <Initialization sourceURL=« URL_SI »/>
    </SegmentList>
    <AdaptationSet id="AS1" mimeType='video/mp4' codecs='hev1' >
      <Representation id='R0' width='1920' height='1080' frameRate='30'... ...bandwidth='256000'>
        <Role schemeIdUri="urn:mpeg:DASH:role:2011" value="main"/>
1601    <SegmentList duration='10'>
1602      <SegmentURL media='seg-full-AS1R0-1.mp4' priorityIdx='1'/>
1603      <SegmentURL media='seg-full-AS1R0-2.mp4' priorityIdx='3'/>
          <SegmentURL media='seg-full-AS1R0-3.mp4' priorityIdx='2'/>
          ...                                                          1604
        </SegmentList>
      </Representation>

      <Representation id='R1' width='1920' height='1080' frameRate='30'... ...bandwidth='256000'>
        <Role schemeIdUri="urn:mpeg:DASH:role:2011" value="associate"/>
        <SegmentList duration='10'>
          <SegmentURL media='seg-full-AS1R1-1.mp4'/>
          <SegmentURL media='seg-full-AS1R1-2.mp4'/>
          <SegmentURL media='seg-full-AS1R1-3.mp4'/>
          ...
        </SegmentList>
      </Representation>
    </AdaptationSet>

    <AdaptationSet id='AS2' mimeType='video/mp4' codecs='hev1' >
      <Representation id='R1' width='2000' height='1000' bandwidth='512000'>
        <SegmentList>
          ...
        </SegmentList>
      </Representation>
    </AdaptationSet>
  </Period>
  <Period>
    ...
  </Period>
</MPD>
```

```
<MPD ...>
  <PushPolicy segmentIdx="+3"/>
  <Period>
   <AdaptationSet id="AS1" mimeType='video/mp4' codecs='hev1' >
    <Representation id='R0' width='1920' height='1080' frameRate='30'... ...bandwidth='256000'>
     <BaseURL>http://myserver.com/media.mp4</BaseURL>
     <SegmentList>
      <InitializationRange="0-999" />
      <SegmentURL mediaRange="1000-4999" indexRange="1000-2000"/>
      <SegmentURL mediaRange="5000-9999" indexRange="5000-7000"/>
      <SegmentURL mediaRange="10000-14999" indexRange="10000-12000"/>
      <SegmentURL mediaRange="15000-19999" indexRange="15000-17000"/>
      ...
     </SegmentList>
    </Representation>
   </AdaptationSet>
  </Period>
  <Period>
   ...
  </Period>
</MPD>
```

1901

1902

```
PUSH_PROMISE
:method = GET
:host: myserver.com
:path = /media.mp4
:if-match: "my-etag1"
Accept: video/mp4
Range:bytes=1000-4999
```

```
PUSH_PROMISE
:method = GET
:host: myserver.com
:path = /media.mp4
:if-match: "my-etag2"
Accept: video/mp4
Range:bytes=5000-9999
```

```
PUSH_PROMISE
:method = GET
:host: myserver.com
:path = /media.mp4
:if-match: "my-etag3"
Accept: video/mp4
Range:bytes=10000-14999
```

```
PUSH_PROMISE
:method = GET
:host: myserver.com
:path = /media.mp4
:if-match: "my-etag4"
Accept: video/mp4
Range:bytes=1000-14999
```

1903

1904

```
PUSH_PROMISE
:method = MGET
:host: example.org
:path = /video/seg2.mp4,
/video/seg3.mp4, /video/seg4.mp4
:if-match: "my-etag1"
accept: video/mp4
```

```
PUSH_PROMISE
:method = GET
:host: example.org
:path = /video/segments.mp4
:if-match: "my-etag1"
Accept: video/mp4
Range:bytes=123-456,789-1223, 4567-6546
```

```
<MPD ...>
  <Period>
  <BaseURL>http://myserver.com/media/</BaseURL>
  <SegmentList>
   <Initialization sourceURL=« URL_SI »/>
  </SegmentList>
  <AdaptationSet id="AS1" mimeType='video/mp4' codecs='hev1' >
   <Representation id='R0' width='1920' height='1080' frameRate='30'... ...bandwidth='256000'>
     <SupplementalProperty schemeIdUri='urn:mpeg:dash:push_policy' value = 'next:3'/>   2300
    <Role schemeIdUri="urn:mpeg:DASH:role:2011" value="main"/>
    <SegmentList duration='10'>
     <SegmentURL media='seg-full-AS1R0-1.mp4'/>
     <SegmentURL media='seg-full-AS1R0-2.mp4'/>
     <SegmentURL media='seg-full-AS1R0-3.mp4'/>
     ...
    </SegmentList>
   </Representation>

   <Representation id='R1' width='1920' height='1080' frameRate='30'... ...bandwidth='2256000'>
   <SupplementalProperty schemeIdUri='urn:mpeg:dash:push_policy' value = 'next:1'/>   2301
    <Role schemeIdUri="urn:mpeg:DASH:role:2011" value="associate"/>
    <SegmentList duration='10'>
     <SegmentURL media='seg-full-AS1R1-1.mp4'/>
     <SegmentURL media='seg-full-AS1R1-2.mp4'/>
     <SegmentURL media='seg-full-AS1R1-3.mp4'/>
     ...
    </SegmentList>
   </Representation>
  </AdaptationSet>

  <AdaptationSet id='AS2' mimeType='video/mp4' codecs='hev1' >
   <Representation id='R1' width='2000' height='1000' bandwidth='512000'>
    <SegmentList>
     ...
    </SegmentList>
   </Representation>
  </AdaptationSet>
 </Period>
 <Period>
  ...
 </Period>
</MPD>
```

Fig. 23

```
<MPD ...>
 <Period id='1'>
   <BaseURL>http://myserver.com/media/</BaseURL>
   <SegmentList>
    <Initialization sourceURL=« URL_SI »/>
   </SegmentList>
   <AdaptationSet id="AS1" mimeType='video/mp4' codecs='hev1' >
    <Representation id='R0' width='1920' height='1080' frameRate='30'... ...bandwidth='256000'>
      <Role schemeIdUri="urn:mpeg:DASH:role:2011" value="main"/>
2401  <SegmentList duration='10'>                          2400
       <SegmentURL media='seg-full-AS1R0-1.mp4' />
       <SegmentURL media='seg-full-AS1R0-2.mp4' />         2405
       <SegmentURL media='seg-full-AS1R0-3.mp4' />
      </SegmentList>
  </Period id ='2'>
   <BaseURL>http://myserver.com/media/</BaseURL>
   <SegmentList>
    <Initialization sourceURL=« URL_SI »/>
   </SegmentList>
   <AdaptationSet id='AS1' mimeType='video/mp4' codecs='hev1' >
    <Representation id='R0' width='1920' height='1080' frameRate='30'... ...bandwidth='256000'>
2402  <Role schemeIdUri='urn:mpeg:DASH:role:2011' value='main'/>
      <SegmentList duration='10'>
2403   <SegmentURL media='seg-full-AS1R0-1.mp4' />
2404   <SegmentURL media='seg-full-AS1R0-2.mp4' />
       <SegmentURL media='seg-full-AS1R0-3.mp4' />
    </SegmentList>
  <Period>
   ...
  </Period>
 </MPD>
```

Fig. 24

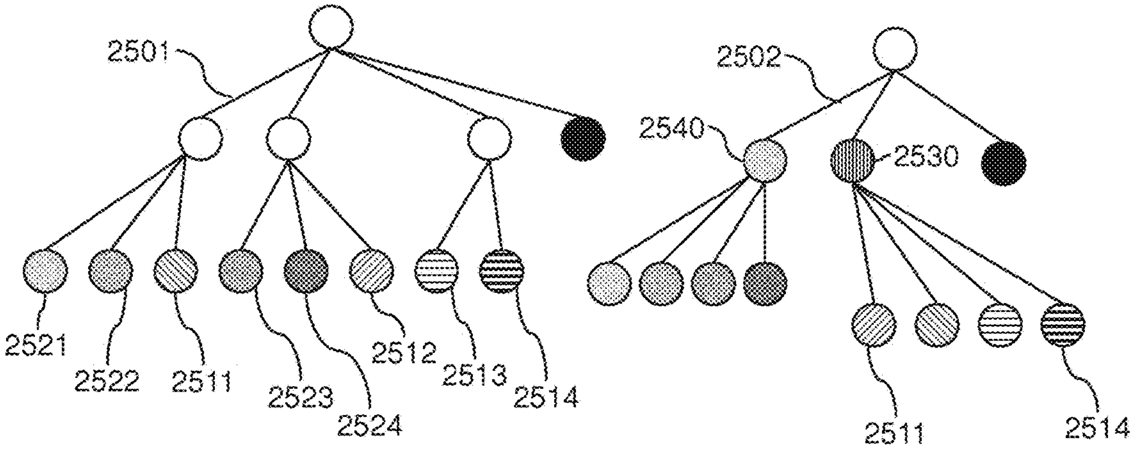

Fig. 25

ADAPTIVE DATA STREAMING METHOD WITH PUSH MESSAGES CONTROL

CROSS-REFERENCE TO RELATED APPLICATIONS

This application is a continuation of U.S. patent application Ser. No. 16/107,093, filed on Aug. 21, 2018, which is a continuation of U.S. patent application Ser. No. 14/903,989, filed on Jan. 8, 2016, and issued as U.S. Pat. No. 10,104,190, issued on Oct. 16, 2018, that is a national phase application of international patent application PCT/EP2014/064949 filed on Jul. 11, 2014, and claims the benefit of, and priority to, GB patent applications: No. 1312547.1 and No. 1312561.2, both of Jul. 12, 2013, and No. 1410540.7 of Jun. 12, 2014, which are all incorporated herein by reference.

FIELD OF THE INVENTION

The present invention relates to data streaming over HTTP communication networks.

More particularly, the present invention relates to adaptive data streaming for satisfying network constraints. The invention may have applications in DASH networks.

DASH (acronym for Dynamic Adaptive Streaming over HTTP) is a communication standard allowing media content streaming (typically audio/video content) over HTTP. According to DASH, media presentations are described as XML files, called "media presentation description" files (MPD in what follows). MPD files provide client devices with information allowing them to request and control the delivery of media contents.

BACKGROUND OF THE INVENTION

The general principle of Media streaming over HTTP is illustrated in FIG. 3. Most of the new protocols and standards for adaptive media streaming over HTTP are based on this principle.

A media server 300 streams data to a client 310. The media server stores media presentations. For example, media presentation 301 contains audio and video data. Audio and video may be interleaved in a same file. The way the media presentation is built is described in what follows with reference to FIG. 4*a*. The media presentation is temporally split into small independent and consecutive temporal segments 302*a*, 302*b* and 302*c*, such as MP4 segments, that can be addressed and downloaded independently. The downloading addresses (HTTP URLs) of the media content for each of these temporal segments are set by the server to the client. Each temporal segment of the audio/video media content is associated with one HTTP address.

The media server also stores a manifest file document 304 (described in what follows with reference to FIG. 5) that describes the content of the media presentation including the media content characteristics (e.g. the type of media: audio, video, audio-video, text etc.), the encoding format (e.g. the bitrate, the timing information etc.), the list of temporal media segments and associated URLs. Alternatively, the document contains template information that makes it possible to rebuild the explicit list of the temporal media segments and associated URLs. This document may be written using the eXtensible Markup Language (XML).

The manifest file is sent to the client. Upon receipt of the manifest file during a step 305, the client is informed of the association between temporal segments of the media contents and HTTP addresses. Also, the manifest file provides the client with the information concerning the content of the media presentation (interleaved audio/video in the present example). The information may include the resolution, the bit-rate etc.

Based on the information received, the HTTP client module 311 of client can emit HTTP requests 306 for downloading temporal segments of the media content described in the manifest file. The server's HTTP responses 307 convey the requested temporal segments. The HTTP client module 311 extracts from the responses the temporal media segments and provides them to the input buffer 307 of the media engine 312. Finally, the media segments can be decoded and displayed during respective steps 308 and 309.

The media engine 312 interacts with the DASH control engine 313 in order to have the requests for next temporal segments to be issued at the appropriate time. The next segment is identified from the manifest file. The time at which the request is issued depends on whether or not the reception buffer 307 is full. The DASH control engine 313 controls the buffer in order to prevent it from being overloaded or completely empty.

The generation of the media presentation and the manifest file is described with reference to FIG. 4*a*. During steps 400 and 401, audio and video data are acquired. Next, the audio data are compressed during 402. For example, the MP3 standard can be used. Also, the video data are compressed in parallel during step 403. Video compression algorithms such as MPEG4, MPEG/AVC, SVC, HEVC or scalable HEVC can be used. Once compression of audio and video data has been performed, audio and video elementary streams 404, 405 are available. The elementary streams are encapsulated during a step 406 into a global media presentation. For example, the ISO BMFF standard (or the extension of the ISO BMFF standard to AVC, SVC, HEVC, scalable extension of HEVC etc.) can be used for describing the content of the encoded audio and video elementary streams as a global media presentation. The encapsulated media presentation 407 thereby obtained is used for generating, during step 408, an XML manifest file 409. Several representations of video data 401 and audio data 400 can be acquired, compressed, encapsulated and described in the media presentation 407.

For the specific case of MPEG/DASH streaming protocol illustrated in FIG. 4*b*, the manifest file is called "Media Presentation Description" (or "MPD" file). The root element of the file is the MPD element that contains attributes applying to all the presentation plus DASH information like profile or schema. The media presentation is split into temporal periods represented by a Period element. The MPD file 410 contains all the data related to each temporal period. By receiving this information, the client is aware of the content for each period of time. For each Period 411, AdaptationSet elements are defined.

A possible organization is to have one or more AdaptationSet per media type contained in the presentation. An AdaptationSet 412 related to video contains information about the different possible representations of the encoded videos available at the server. Each representation is described in a Representation element. For example, a first representation can be a video encoded with a spatial resolution of 640×480 and compressed with a bit rate of 500 kbits/s. A second representation can be the same video but compressed with a bit rate of 250 kbits/s.

Each video can then be downloaded by HTTP requests if the client knows the HTTP addresses related to the video. The association between the content of each representation and the HTTP addresses is done by using an additional level of description: the temporal segments. Each video representation is split into temporal segments 413 (typically few seconds). Each temporal segment comprises content stored at the server that is accessible via an HTTP address (URL or URL with one byte range). Several elements can be used for describing the temporal segments in the MPD file: SegmentList, SegmentBase or Segment Template.

In addition, a specific segment is available: the initialization segment. The initialization segment contains MP4 initialization information (if the video has been encapsulated using the ISO BMFF or extensions thereof) that describes the encapsulated video stream. For example, it helps the client to instantiate the decoding algorithms related to the video.

The HTTP addresses of the initialization segment and the media segments are indicated in the MPD file.

In FIG. 5, there is shown an exemplary MPD file. Two media are described in the MPD file shown. The first one is an English audio stream and the second one is a video stream. The English audio stream is introduced using the AdaptationSet tag 500. Two alternative representations are available for this audio stream:

- the first representation 501 is an MP4 encapsulated elementary audio stream with a bit-rate of 64000 bits/sec. The codec to be used for handling this elementary stream (after MP4 parsing) is defined in the standard by the attribute codecs having the value: 'mp4a.0x40'. It is accessible via a request at the address formed by the concatenation of the BaseURL elements in the segment hierarchy: <BaseURL>7657412348.mp4</BaseURL>, which is a relative URI. The <BaseURL> being defined at the top level in the MPD element by 'http://cdn1.example.com/' or by 'http://cdn2.example.com/' (two servers are available for streaming the same content) is the absolute URI. The client can then request the English audio stream from the request to the address 'http://cdn1.example.com/7657412348.mp4' or to the address 'http://cdn2.example.com/7657412348.mp4'.
- the second representation 502 is an MP4 encapsulated elementary audio stream with a bit-rate of 32000 bits/sec. The same explanations as for the first representation 501 can be made and the client device can thus request this second representation 502 by a request at either one of the following addresses:

'http://cdn1.example.com/3463646346.mp4' or
'http://cdn2.example.com/3463646346.mp4'.

The adaptation set 503 related to the video contains six representations. These representations contain videos with different spatial resolutions (320×240, 640×480, 1280×720) and with different bit rates (from 256000 to 2048000 bits per second). For each of these representations, a respective URL is associated through a BaseURL element. The client can therefore choose between these alternative representations of the same video according to different criteria like estimated bandwidth, screen resolution etc. (Note that, in FIG. 5, the decomposition of the Representation into temporal segments is not illustrated, for the sake of clarity.)

FIG. 5*a* shows the standard behavior of a DASH client. FIG. 5*b* shows a tree representation of an exemplary manifest file (description file or MPD) used in the method shown in FIG. 4*a*.

When starting a streaming session, a DASH client starts by requesting the manifest file (step 550). After waiting for the server's response and receiving the manifest file (step 551), the client analyzes the manifest file (step 552), selects a set $AS_{ij}$ of AdaptationSets suitable for its environment (step 553), then selects, within each AdaptationSet $AS_{ij}$, a Representation in the MPD suitable for example for its bandwidth, decoding and rendering capabilities (step 554).

The DASH client can then build in advance the list of segments to request, starting with initialization information for the media decoders. This initialization segment has to be identified in the MPD (step 555) since it can be common to multiple representations, adaptation sets and periods or specific to each Representation or even contained in the first media segment.

The client then requests the initialization segment (step 556). Once the initialization segment is received (step 557), the decoders get initiated (step 558).

The client then requests first media data on a segment basis (step 560) and buffers a minimum data amount (thanks to the condition at step 559) before actually starting decoding and displaying (step 563). These multiple requests/responses between the MPD download and the first displayed frames introduce a startup delay in the streaming session. After these initial steps, the DASH streaming session continues in a standard way, i.e. the DASH client adapts and requests the media segments one after the other.

The current DASH version does not provide description of Region-Of-Interest within the manifest files. Several approaches have been proposed for such description.

In particular, components of media contents can be described using SubRepresentation elements. These elements describe the properties of one or several components that are embedded in a Representation. In FIG. 6, there is shown an example of a DASH manifest file describing tile tracks as components of a video. For the sake of conciseness and clarity, only one Period 600 is represented. However, subsequent period elements would be organized in a same fashion. In part 601, a first adaptation set element is used for describing a base layer of the scalable video. For example, the video is encoded according to SVC or HEVC scalable. In part 602, a second adaptation set is used for describing the highest resolution layer of the scalable video. For non-scalable video, only the second adaptation set 602 would be present, without dependency to the base layer, i.e. the dependencyId attribute. In this second adaptation set 602, a single representation 603 is described, namely the one that corresponds to the displayable video. The representation is described as a list of segments 610 with respective URLs for client requests.

Thus, the representation depends on another representation identified by 'R1' (dependencyId attribute), actually the base layer representation from the first adaptation set 601. The dependency forces the streaming client to first request the current segment for base layer before getting the current segment for the enhancement layer. This cannot be used to express dependencies with respect to tile tracks because the tracks that would be referenced this way would be automatically loaded by the client. This is something to be avoided, since it is up to the user to select the tiles of interest for him anytime during the media presentation. Therefore, in order to indicate the dependencies between the composite track and the tile tracks the SubRepresentation element is used. The displayable video is described as a list of sub-representations 604 to 608. Each sub representation actually represents a track in the encapsulated MP4 file. Thus, there is one sub-representation per tile (four tiles in the present example) plus one sub-representation for the composite track 608. Each sub-representation is described by a content component element 614 to 618 in order to indicate whether it corresponds to a tile track 614, 615, 616 and 617 or to the composite track 618. The Role descriptor type available in DASH/MPD is used with a specific scheme for tiling. The Role descriptor also indicates the position of the tile in the full-frame video. For example the component 614 describes the tile located at the top left of the video (1:1 for first in row and first in column). The dimensions of the tiles, width and height, are specified as attributes of the sub representation as made possible by MPD. Bandwidth information can also be put here for helping the DASH client in the determination of the number of tiles and the selection of the tiles, according to its bandwidth. Concerning the composite track, it has to be signalled in a different way than the tile tracks since it is mandatory to be able, at the end of the download, to build a video stream that can be decoded. To that purpose, two elements are added into the description. Firstly, the descriptor in the related content component 618 indicates that it is the main component among all the components. Secondly, in the sub representation, a new attribute 'required' is added in order to indicate to the client that the corresponding data have to be requested. All requests for the composite track or for one or more of the tile tracks are computed from the URL provided in the segment list 610 (one per time interval). In the example, "URL_X" combined with "BaseURL" at the beginning of the MPD provides a complete URL which the client can use for performing an HTTP GET request. With this request, the client would get the data for the composite track and all the data for all the tile tracks. In order to optimize the transmission, instead of the request, the client can first request the segment index information (typically the "ssiX" and/or "sidX" information in ISO BMFF well known by the man skilled in the art), using the data available from the index_range attribute 620. This index information makes it possible to determine the byte ranges for each of the component. The DASH client can then send as many HTTP GET requests with appropriate byte range as selected tracks (including the required composite track).

When starting a streaming session, a DASH client requests the manifest file. Once received, the client analyzes the manifest file, selects a set of AdaptationSets suitable for its environment. Next, the client selects in the MPD, within each AdaptationSet, a Representation compatible with its bandwidth, decoding and rendering capabilities. Next, it builds in advance the list of segments to be requested, starting with initialization information for the media decoders. When initialization information is received by the decoders, they are initialized and the client requests first media data and buffers a minimum data amount before actually starting the display.

These multiple requests/responses may introduce delay in the startup of the streaming session. The risk is for service providers to see their clients leaving the service without starting to watch the video. It is common to name this time between the initial HTTP request for the first media data chunk, performed by the client, and the time when the media data chunk actually starts playing as the start-up delay. It depends on the network round-trip time but also on the size of the media segments.

Server Push is a useful feature for decreasing web resource loading time. Such servers are discussed with reference to FIGS. 1*a* to 1*e*.

In FIG. 1*b*, there is shown that in HTTP/2 exchanges, a request must be sent for every resource needed: resources R1 to R4 and sub-resources A to I (as shown in FIG. 1*a*). However, when using the push feature by servers, as illustrated in FIG. 1*c*, the number of requests is limited to elements R1 to R4. Elements A to I are "pushed" by the server to the client based on the dependencies shown in FIG. 1*a*, thereby making the associated requests unnecessary.

Thus, as illustrated in FIGS. 1*b* and 1*c*, when servers use the push feature, the number of HTTP round-trips (request+response) necessary for loading a resource with its sub-resources is reduced. This is particularly interesting for high-latency networks such as mobile networks.

HTTP is the protocol used for sending web resources, typically web pages. HTTP implies a client and a server:

- The client sends a request to the server;
- The server replies to the client's request with a response that contains a representation of the web resource.

Requests and responses are messages comprising various parts, notably the HTTP headers. An HTTP header comprises a name along with a value. For instance, "Host: en.wikipedia.org" is the "Host" header, and its value is "en.wikipedia.org". It is used for indicating the host of the resource queried (for instance, the Wikipedia page describing HTTP is available at http://en.wikipedia.org/wiki/HTTP). HTTP headers appear on client requests and server responses.

HTTP/2 makes it possible to exchange requests/responses through streams. A stream is created inside an HTTP/2 connection for every HTTP request and response. Frames are exchanged within a stream in order to convey the content and headers of the requests and responses.

HTTP/2 defines a limited set of frames with different meanings, such as:

- HEADERS: which is provided for transmission of HTTP headers
- DATA: which is provided for transmission of HTTP message content
- PUSH_PROMISE: which is provided for announcing pushed content
- PRIORITY: which is provided for setting the priority of a stream
- WINDOW_UPDATE: which is provided for updating the value of the control flow window
- SETTINGS: which is provided for conveying configuration parameters
- CONTINUATION: which is provided for continuing a sequence of header block fragments
- RST_STREAM: which is provided for terminating or cancelling a stream.

Push by servers has been introduced in HTTP/2 for allowing servers to send unsolicited web resource representations to clients. Web resources such as web pages generally contain links to other resources, which themselves may contain links to other resources. To fully display a web page, all the linked and sub-linked resources generally need to be retrieved by a client. This incremental discovery may lead to a slow display of a web page, especially on high latency networks such as mobile networks.

When receiving a request for a given web page, the server may know which other resources are needed for the full processing of the requested resource. By sending the requested resource and the linked resources at the same time, the server allows reducing the load time of the web page. Thus, using the push feature, a server may send additional resource representations at the time it is requested a given resource.

With reference to the flowchart of FIG. 1*e*, an exemplary mode of operation of a server implementing the push feature is described.

During step 100, the server receives an initial request. Next, the server identifies during step 101 the resources to push as part of the response and starts sending the content response during step 102. In parallel, the server sends push promise messages to the client during step 103. These messages identify the other resources that the server is planning to push, for instance based on the dependencies shown in FIG. 1*a*. These messages are sent in order to let the client know in advance which pushed resources will be sent. In particular, this reduces the risk that a client sends a request for a resource that is being pushed at the same time or about to be pushed. In order to further reduce this risk, a server should send a push promise message before sending any part of the response referring to the resource described in the push promise. This also allows clients to request cancellation of the push of the promised resources if clients do not want those resources. Next, the server sends the response and all promised resources during step 104. The process ends during a step 105.

The flowchart of FIG. 1*d* illustrates the process on the client side.

When the client has identified a resource to retrieve from the server, it first checks during a step 106 whether or not the corresponding data is already in its cache memory. In case the resource is already in the cache memory (Yes), it is retrieved from it during a step 107. Cached data may be either data retrieved from previous requests or data that were pushed by the server previously. In case it is not in the cache memory (No), the client sends a request during step 108 and waits for the server's response. Upon receipt of a frame from the server, the client checks during step 109 whether or not the frame corresponds to a PUSH promise. If the data frame corresponds to the PUSH promise (Yes), during step 110, the client processes the push promise. The client identifies the resource to be pushed. If the client does not wish to receive the resource, the client may send an error message to the server so the server does not push that resource. Otherwise, the client stores the push promise until receiving the corresponding push content. The push promise is used so that the client does not request the promised resource while the server is pushing it. In case the data frame does not correspond to the PUSH promise (No), it is checked, during step 111, whether or not, the frame is a data frame related to push data. In case it is related to push data (Yes), the client processes the pushed data during step 112. The pushed data is stored within the client cache. In case the frame is not a data frame related to push data (No), it is checked, during step 113, whether it corresponds to a response received from the server. In case the frame corresponds to a response from the server (Yes), the response is processed during step 114 (e.g. sent to the application). Otherwise (No), it is checked during step 115 whether or not the frame identifies the end of a response (Yes). In this case, the process is terminated during step 116. Otherwise, the process goes back to step 109.

Thus, it appears that the client receives the response and the promised resources. The promised resources are therefore generally stored in the client cache while the response is used by the application such as a browser displaying a retrieved web page. When a client application requests one of the resources that were pushed, the resource is immediately retrieved from the client cache, without incurring any network delay.

The storage of pushed resources in the cache is controlled using the cache control directives. The cache control directives are also used for controlling of the responses. These directives are in particular applicable to proxies: any resource pushed or not, may be stored by proxies or by the client only.

FIG. 1*a* is a graph of a set of resources owned by a server with their relationships. The set of resources is intertwined: $R_1$, $R_2$, $R_3$, and $R_4$ are resources that need to be downloaded together to be properly processed by a client. In addition, sub-resources A to H are defined. These sub-resources are related to 1, 2 or 3 resources. For instance, A is linked to $R_1$ and C is linked to $R_1$, $R_2$ and $R_4$.

FIG. 1*b*, already discussed hereinabove, shows an HTTP exchange without using the server PUSH feature: the client requests $R_1$, next it discovers $R_2$, A, B, C and D and request them. After receiving them, the client requests $R_3$, $R_4$, F and G. Finally the client requests H and I sub-resources. This requires four round-trips to retrieve the whole set of resources.

FIG. 1*c*, already discussed hereinabove, illustrates the HTTP exchange using the feature of pushing directly connected sub-resources by the server. After requesting $R_1$, the server sends $R_1$ and pushes A, B, C and D. The client identifies $R_2$ and requests it. The server sends $R_2$ and pushes F and G. Finally the client identifies $R_3$, $R_4$ and requests these resources. The server sends $R_3$, $R_4$ and pushes H and I. This process requires three round-trips to retrieve the whole set of resources.

In order to decrease the loading time of a set of resources, typically a web page and its sub-resources, HTTP/2 allows exchanging multiple request and response priorities in parallel. As illustrated in FIG. 2, a web page may require the download of several resources, like JavaScript, images etc. During an initial HTTP exchange 200, the client retrieves an HTML file. This HTML file contains links to two JavaScript files (JS1, JS2), two images (IMG1, IMG2), one CSS file and one HTML file. During an exchange 201, the client sends a request for each file. The order given in the exchange 201 of FIG. 2 is based on the web page order: the client sends a request as soon as a link is found. The server then receives requests for JS1, CSS, IMG1, HTML, IMG2 and JS2 and processes these requests according that order. The client then retrieves these resources in that order.

HTTP priorities make it possible for the client to state which requests are more important and should be treated sooner than other requests. A particular use of priorities is illustrated in exchange 202. JavaScript files are assigned the highest priority. CSS and HTML files are assigned medium priority and images are assigned low priority. This approach allows receiving blocking files or files that may contain references to other resources sooner than other files. In response, the server is expected to try sending sooner the JavaScript files, the CSS and HTML files afterwards and the images at the end, as described in exchange 202. Servers are not mandated to follow client priorities.

In addition to priorities, HTTP/2 provides that the amount of data being exchanged simultaneously can be controlled. Client and server can specify which amount of data they can buffer on a per connection basis and a per stream basis. This is similar to TCP congestion control: a window size, which specifies an available buffer size, is initialized to a given value; each time the emitter sends data, the window size is decremented; the emitter must stop sending data so that the window size never goes below zero. The receiver receives the data and sends messages to acknowledge that the data was received and removed from the buffer; the message contains the amount of data that was removed from the buffer; the window size is then increased from the given value and the emitter can restart sending data.

In view of the above, it appears that DASH is based on the assumption that the client leads the streaming since the client can generally select the best representation of the content for the purpose of the application it is performing.

For instance, a client may know whether to request High-Definition or Small-Definition content based on its form-factor and screen resolution.

Server-based streaming is typically done using RTP. Contrary to DASH, RTP does not use HTTP and cannot directly benefit from the web infrastructures, in particular proxies and caches. Web socket based media streaming has the same drawbacks. With HTTP/1.1, server-based streaming cannot be easily implemented since the server can generally only answer to client requests. With HTTP/2, in particular with the introduction of the push feature, DASH-based servers can lead the streaming. Thus, servers can use their knowledge of the characteristics of the content they are streaming for optimizing the user experience. For instance, a server may push a film as SD (due to limited bandwidth) but advertisements as HD since advertisements take an additional limited amount of bandwidth. Another example is the case of a server that starts to do fast start with a low-resolution video and switches to the best possible representation once bandwidth is well estimated.

In order to enable a server to lead the streaming, one approach is to let the server push data (in particular DASH data) as preferred. The client then uses whatever data is available to display the video. The server typically announces the push of several segments at once. The server then sends the segments in parallel or successively.

A problem that occurs is that client and server may not know if the promised data will be transmitted and received at the desired time: the client may not know when and in which order the video segments will be sent.

Also, the promised data pushed or announced by the server may mismatch the client needs, thus leading to resource wasting in particular at the server end.

Thus, there is a need for enhancing data streaming especially in the context of DASH-based communications.

SUMMARY OF THE INVENTION

The present invention lies within this context.

According to a first aspect of the invention corresponding to the server's perspective, a method of streaming media data by a server device to a client device, comprises the following steps:

- receiving, from the client device, a request relating to first media data,
- identifying second media data to be sent to the client device without having been requested, and
- in response to said request, transmitting to said client device, data relating to said first media data, and preparing at least one announcement message respectively identifying said second media data with a view to transmit the announcement message or messages to the client device, and wherein the method further comprises the step of using a push policy shared with the client device for the server device to drive the identification or the transmission of the second non-requested media data to the client device.

According to a second aspect of the invention corresponding to the client's perspective, a method of accessing by a client device, media data streamed by a server device, the method comprises the following steps:

- transmitting, to the server device, a request relating to first media data,
- receiving from said server device, in response to said request, data relating to said first media data, wherein the method further comprises the step of using a push policy shared with the server device for the client device to determine second media data to be sent by the server device without having been requested by the client device or to determine an order of transmission thereof by the server device.

In particular, the shared push policy may define how to determine second media data, for the devices to determine the second non-requested media data to be sent by the server device to the client device.

Thanks to this approach, the mismatch between the server's decision regarding the media data to be pushed and the client's needs can be decreased and thus resources can be saved.

This is achieved by using a shared push policy that makes it possible for the client to anticipate the server's behaviour, and thus the second media data that are about to be pushed. Thanks to the shared push policy than may be used for several client's subsequent requests, the client can anticipate the server's behaviour even before the requests are sent to the server.

As a consequence of the anticipation, the client can prepare and request the cancellation of such second media data that are not needed, in an anticipated fashion with respect to the announcement by the server.

The request relating to first media data may concern first media data and/or other data related to this first media data.

The second media data may be associated with said first media data, for example by the server device.

Embodiments of the invention provide a lightweight mechanism for server-guided streaming. Embodiments may be implemented in the context of DASH networks.

Server devices can make content recommendations to the client devices. Also, they can optimize the network usage.

Embodiments of the invention are compatible with existing HTTP/2 features. These features can advantageously be used for implementing embodiments of the invention.

Network performances are generally increased.

Correspondingly, the invention also regards a server device for streaming media data to a client device, the device comprising:

- a receiver configured for receiving, from the client device, a request relating to first media data,
- a control unit configured for identifying second media data to be sent to the client device without having been requested, and
- a transmitter configured for, in response to said request, transmitting to said client device, data relating to said first media data, and preparing at least one announcement message respectively identifying said second media data with a view to transmit the announcement message or messages to the client device, and wherein the control unit is further configured for using a push policy shared with the client device in order to drive the identification or the transmission of the second non-requested media data to the client device.

The invention also regards a client device for accessing media data streamed by a server device, the device comprising:

- a transmitter configured for transmitting, to the server device, a request relating to first media data, and
- a receiver configured for receiving from said server device, in response to said request, data relating to said first media data, wherein the client device is configured for using a push policy shared with the server device in order to determine second media data to be sent by the server device without having been requested by the client device or to determine an order of transmission thereof by the server device.

The server and client devices have the same advantages as the corresponding methods as described above.

Optional features of the methods and devices are defined in the dependent claims. Some of them are explained below with respect to the methods. However they can also apply to the corresponding device.

In some embodiments referred below as to an explicit approach, the method from the server's perspective further comprises:

determining by the server device a push policy, and transmitting, from the server device to the client device, push policy information describing the determined push policy to share the push policy with the client device.

Correspondingly at the client side, the method may further comprise receiving, from the server device, push policy information describing the shared push policy.

As described in some examples below, the push policy information describing the shared push policy is inserted in a description file that is transmitted from the server device to the client device, the description file containing description information that concerns media data including the first media data, the method further comprising determining the second non-requested media data based on said description file using the shared push policy.

In a specific embodiment, the description file describes the media data using a plurality of media data attribute levels, and various shared push policies are defined at various respective levels of the description file.

In other examples, the push policy information describing the shared push policy is embedded in a header of an HTTP frame transmitted from the server device to the client device.

According to specific features, the method may further comprise, at the server device, receiving push policy update information embedded in a header of an HTTP frame from the client device, and updating accordingly the shared push policy before determining non-requested media data from other media data requested by the client device.

Correspondingly, the method may further comprise, at the client device, sending push policy update information embedded in a header of an HTTP frame to the server device.

According to a hybrid approach, the push policy information describing the shared push policy is defined by a first push policy part and a second push policy part, the first push policy part being inserted in a description file that is transmitted from the server device to the client device, the description file containing description information that concerns media data including the first media data, the method further comprising determining the second non-requested media data based on said description file using the shared push policy, and the second push policy part being embedded in a header of an HTTP frame transmitted from the server device to the client device.

For example, the second push policy part may comprise one or more values for one or more associated variables defined in the first push policy part.

Also, the description file may include the description of a plurality of candidate push policies, and the second push policy part may thus comprise an identifier of a candidate push policy from said plurality, which identified candidate push policy thereby forming the first push policy part.

In other embodiments, the push policy information includes a JavaScript program embedded in a web page transmitted from the server device to the client device.

In yet other embodiments, the method further comprises determining the second non-requested media data based on a structured document (such as a description file described above or an HTML page introduced in examples below), the structured document containing description information that concerns media data including the first media data, and the push policy information includes an XPath expression to be evaluated on a tree representation of the structured document to identify the second non-requested media data.

Regarding the syntax of the push policy information, embodiments provide that the push policy information includes a first push attribute defining an amount of second non-requested media data to be identified in a description file, the description file containing description information that concerns media data including the first media data, and the method further comprising determining the second non-requested media data based on said description file using the shared push policy.

According to specific features, the first push attribute identifies the second non-requested media data relatively to the first media data requested within the description file. This may be done using operators as described below.

In a variant, the first push attribute is an identifier of specific media data within the description file.

According to specific features, the description information in the description file describes media data according to at least one media data attribute from amongst a period attribute defining a time period to which the media data belong, an adaptation attribute defining a media type of the media data, a representation attribute defining an encoding version (e.g. bitrate, frame rate, frame resolution, timing information, etc.) of the media data and a segment attribute defining, and the push policy information includes at least a second push attribute defining a constraint on the media data attribute or attributes, for identifying the second non-requested media data.

This makes it possible to have very selective push policies throughout the description file.

In particular, the push attribute or attributes may define a media data attribute or attributes of the second non-requested media data relatively to the corresponding media data attribute or attributes of the first media data within the description file.

Alternatively, the push attribute or attributes may identify a node in the description file in which the second non-requested media data have to be retrieved.

In some embodiments, the description information in the description file includes priority attributes associated with the media data, one priority attribute for each media data, and an order of transmission of the second media data is based on the associated priority attributes. This is to define an order of transmission of the push data.

In embodiments, the shared push policy identifies the second media data from the first media data requested.

In embodiments referred below as to an implicit approach, the shared push policy is implemented using the same second media data determining algorithm at both the server device and the client device, the algorithm enabling the server device and the client device to determine the same second media data from the first media data requested.

In some embodiments adapted to both the implicit and explicit approaches, if the identified second media data comprise a plurality of media segments, each requiring an announcement message, the method may further comprise merging the corresponding plurality of announcement messages into a single announcement message to be transmitted to the client device. This is to reduce bandwidth consumption since less announcement messages will be sent.

To take actual advantage of the shared push policy and consequent anticipation of pushes by the client device, the method may further comprise receiving, from the client device, a cancellation request requesting to cancel transmission of a part of the second non-requested media data so that the server device does not transmit the corresponding prepared announcement message.

Correspondingly at the client, the method may further comprise sending, to the server device, a cancellation request requesting to cancel transmission of a part of the second non-requested media data, in order to drive the server device not to transmit an announcement message identifying the part of the second non-requested media data.

In embodiments of the invention, the second non-requested media data are determined by the client device independently of at least one announcement message prepared by (and possibly received from) the server device and identifying the second non-requested media data the server device intends to send to the client device without having been requested. Here, "independently" means that the client device is able to make the determination of the second non-requested data without being aware of such announcement message (i.e. PUSH_PROMISE) which is dedicated to inform the client device of the future transmission of such non-requested data.

In other embodiments of the invention, the same shared push policy is used for determining respective non-requested media data from a plurality of requests relating to respective first media data. By using the same push policy over time and successive requests, the client is even more in good position to efficiently anticipate the transmission of useless data by the server, and thus in position to efficiently cancel their transmission and the transmission of corresponding announcement messages.

Regarding the notification of an order of transmission of the push data from the server to the client, a method of streaming media data by a server device to a client device, may comprise the following steps:

- receiving, from the client device, a request relating to first media data,
- identifying second media data to be sent to the client device without having been requested,
- transmitting to said client device, in response to said request, data relating to said first media data, and at least one announcement message respectively identifying said second media data, and
- wherein the method further comprises the following steps:
- defining by the server device an order of transmission of the second media data (this form all or part of the shared push policy),
- transmitting information related to the order of transmission with said announcement messages, said information enabling the client device to determine the order of transmission defined by the server.

For example, the order of transmission of said second media is defined according to priority values according to the client device, the media data having the highest priority value being transmitted first.

Said priority values may be defined according to the HTTP/2 protocol.

According to embodiments, at least one priority value is associated with a network bandwidth estimation mechanism, and the method further comprises the following steps:

- transmitting to the client device second media data with a priority value associated with said mechanism,
- receiving from the client device, in response to said second media data, at least one control flow message, and
- estimating an available bandwidth based on said at least one control flow message received.

For example, the server device transmits said second media data according to a plurality of data frames having respective and different sizes.

The method may further comprise defining by the server device, based on said bandwidth estimation, an updated order of transmission of the second media data.

According to embodiments said request from the client device comprises a request for receiving a description file related to media data comprising said first media data, the description file containing description information concerning said first media data, the method further comprising determining the second non-requested media data based on said description file.

For example, requested first media data are video segments.

The streaming may be performed according to the DASH standard.

For example, the method further comprises the following steps:

- receiving, from the client device, an ordering update request,
- defining, based on said ordering update request, a new order of transmission of the second media data and updating the information related to said new order of transmission of the second media data, and
- transmitting said second media data to the client according to said updated information related to the order of transmission.

The method may further comprise transmitting to the client device, an ordering update confirmation message.

For example, said updated order is defined for the second media data for which transmission to the client device has not been initiated at the time of receipt of said ordering update request.

For example, said ordering update request comprises an ordering value for at least part of second media data.

According to embodiments, the order of transmission of said second media is defined according to priority values, and when a priority value is updated for at least part of a first media data, the priority values for at least part of second media data to be sent to the client device without having been requested and associated with said at least part of first media data, are updated accordingly.

For example, said first and second media are associated according to at least one of a temporal relationship, a spatial relationship and a quality relationship.

According to embodiments:

- said second media data comprises enhancement data for enhancing quality of the first media data, and
- when a priority value is updated for a media data of an enhancement layer, priority values are updated for all the media data of said enhancement layer.

For example, the first and second media data comprise video temporal segments, and the starting time of the enhancement media data is based on information related to a video content of the first media data.

For example, said information related to a video content of the first media data is stored in said description file.

For example, said order of transmission is based at least on decoding relationships between first a second media data.

For example, said order of transmission is based at least on statistical popularities of the media data.

For example, said order of transmission is based at least on a playing time of the media data on the client device's end.

For example, said order of transmission is based at least on an estimated transmission time of the media data.

For example, said order of transmission is based at least on user-defined interests for the media data.

The method may further comprise the following steps:

receiving, from the client device, control messages, said control messages enabling the server device to identify media data currently being played, defining by the server, based on said control messages, an updated order of transmission of the second media data, and transmitting said second media data to the client according to said updated order of transmission.

The method may further comprise a step of transmitting to the client device, an ordering update confirmation message.

For example, said control messages relate to a use of a buffer memory of the client device, said buffer memory storing media data for them to be played by the client.

For example, the server device keeps record of first requested media data sent, and identification of the second media data is performed based on said use of the buffer memory and said record.

For example, said order of transmission information is transmitted within said announcement messages.

For example, said order of transmission information is transmitted within dedicated messages after said announcement messages.

From the client's perspective, a method of accessing by a client device, media data streamed by a server device, may comprise the following steps:

transmitting, to the server device, a request relating to first media data, receiving from said server device, in response to said request, data relating to said first media data, and at least one announcement message respectively identifying second media to be sent to the client device without having been requested, wherein the method further comprises the following step:

receiving information related to an order of transmission of the second media data with said announcement messages, said information (i.e. the shared push policy) enabling the client device to determine an order of transmission of the second media data defined by the server.

The method may further comprise determining by the client device whether the order of transmission of the second media data defined by the server device satisfies streaming constraints at the client device's end, and if said constraints are not satisfied, transmitting, to the server device, an ordering update request.

For example, the order of transmission of said second media data is defined according to priority values according to the client device, the media data having the highest priority value being transmitted first.

For example, said priority values are defined according to the HTTP/2 protocol.

According to embodiments, at least one priority value is associated with a network bandwidth estimation mechanism, the method further comprises the following steps:

receiving from the server device second media data with a priority value associated with said mechanism, transmitting to said server device, in response to said second media data, at least one control flow message, thereby enabling the server device to estimate an available bandwidth based on said at least one control flow message transmitted.

For example, the client device receives said second media data according to a plurality of data frames having respective and different sizes.

For example, an updated order of transmission of the second media data is defined, by the server device, based on said bandwidth estimation.

For example, said request from the client device comprises a request for receiving a description file related to media data comprising said first media data, the description file containing description information concerning said first media data, the method further comprising determining the second non-requested media data based on said description file.

For example, requested first media data are video segments.

For example, said streaming is performed according to the DASH standard.

The method may further comprise receiving said second media data from the server device according to updated information related to a new order of transmission of the second media data defined by the server device.

The method may further comprise a step of receiving from the server device, an ordering update confirmation message.

According to embodiments, said updated order is defined for the second media data for which transmission from the server device has not been initiated at the time of receipt of said ordering update request by the server device.

According to embodiments, said ordering update request comprises an ordering value for at least part of the second media data.

According to embodiments, the order of transmission of said second media is defined according to priority values, and when a priority value is updated for at least part of a first media data, the priority values for at least part of second media data to be sent to the client device without having been requested and associated with said at least part of first media data, are updated accordingly.

For example, said first and second media data are related according to at least one of a temporal relationship, a spatial relationship and a quality relationship.

According to embodiments:

said second media data comprise enhancement data for enhancing quality of the first media data, and when a priority value is updated for at least part of first media data of an enhancement layer, priority values are updated for all the media data of said enhancement layer.

For example, the first and second media data comprise video temporal segments, and the starting time of the enhancement media data is based on information related to a video content of the first media data.

According to embodiments, said information related to a video content of the first media data is stored in said description file.

According to embodiments, said order of transmission is based at least on decoding relationships between first and second media data.

According to embodiments, said order of transmission is based at least on statistical popularities of the media data.

According to embodiments, said order of transmission is based at least on a playing time of the media data on the client device's end.

According to embodiments, said order of transmission is based at least on an estimated transmission time of the media data.

According to embodiments, said order of transmission is based at least on user-defined interests for the media data.

The method may comprise the following steps:

transmitting, to the server device, control messages, said control message enabling the server device to identify a media data currently being played, and receiving said second media data from the server device according to an updated order of transmission defined, by the server device, based on said control messages.

The method may comprise a step of receiving from the server device, an ordering update confirmation message.

For example, said control messages relate to a use of a buffer memory of the client device, said buffer memory storing media data for them to be played by the client device.

According to embodiments, the server device keeps record of first media data sent, and identification of the media being currently played is performed based on said use of the buffer memory and said record.

For example, said order of transmission information is received within said announcement messages.

For example, said order of transmission information is received within dedicated messages after said announcement messages.

Still referring to the order of transmission, a method of managing, by a proxy server, data exchanges between client devices and server devices, may comprise the following steps:

receiving, from a server implementing a method as defined above regarding the notification of an order of transmission, media data to be retransmitted to a client device, determining, based on the order of transmission of the media data, a retransmission priority for the media data, and performing retransmission of the media data received to the client device, based on said transmission priority determined.

The method may further comprise storing said media data received, based on said retransmission priority determined.

The method may further comprise the following steps:

receiving, from a client device implementing a method according to the second aspect, an ordering update request, updating said retransmission priority according to said ordering update request, if said request is related to a media data to be retransmitted, and performing retransmission of the media data according to the updated retransmission priority.

The method may further comprise the following steps:

receiving from a first client device, a request to a first server device, for media data, wherein said media data is stored by the proxy server for retransmission to a second client device from a second server device, determining priority values respectively associated with said media data by said first and second server devices, updating said priority values according to respective streaming constraints for the first and second client devices, and retransmitting said media data to said first and second client devices according to said updated priority values, wherein said first and second server devices implement a method according to the first aspect and said first and second client devices implement a method according to the second aspect.

The method may further comprise sending to the first and second server devices update notifications relating to the updated priority values.

According to another aspect of the invention there is provided a method of streaming data between a server device and a client device comprising:

performing a method according to the first aspect by a server device, and performing a method according to the second aspect by a client device.

According to yet another aspect of the invention there are provided computer programs and computer program products comprising instructions for implementing methods as defined above, when loaded and executed on computer means of a programmable apparatus.

According to yet another aspect of the invention, there is provided a server device configured for implementing methods according to the first aspect.

According to yet another aspect of the invention, there is provided a client device configured for implementing methods according to the second aspect.

Solutions for adaptive streaming of media data from a server to a client device have been proposed, in order to adapt in particular the type and quantity of data that are sent to the client device to the features of the concerned client device and to the characteristics of the networks providing the connection between the server and the client device.

In this context, some solutions, such as the DASH (Dynamic Adaptive Streaming over HTTP) standard, propose to store a plurality of versions of the resource (or content) to be distributed and to send to a client device requesting the resource a description file including a description of the various versions representing the resource and respective pointers (e.g. URLs) to these versions.

Based on the description file, the client device can then select a version of the resource that best matches its needs and request this version using the corresponding pointer.

This solution is advantageous in that the description file is light as it contains no media data (but only pointers to media data). It avoids the exchange of media data that would be unsuitable for the client device by letting the client select relevant versions for its usage. Moreover it fits in the current Web architecture based on HTTP and can exploit caching mechanisms already deployed.

In return, this solution however needs several exchanges (or roundtrips) between the client device and the server before media data is received at the client device and may then be decoded and displayed, which results in a start-up delay In embodiments, the invention provides a method for providing media data representing a media item (e.g. a video) from a server storing data representing the media item, at least a temporal segment of which is represented by a plurality of versions, the method comprising the following steps implemented by the server:

receiving a request from a client device for a description file including a description of the versions representing the temporal segment and respective pointers to the versions representing the temporal segment;

selecting data among sets of data pointed to in the description file;

sending the description file to the client device;

pushing the selected data to the client device.

By pushing data selected in an appropriate manner (i.e. sending data that is not solicited by the client device, but has been selected by the server as further explained below), one or several roundtrip(s) can be avoided and the decoding and display of the media data can thus start faster.

The media item may for instance be a video, or an audio item, such as an audio track, for instance.

It may be noted that the sets of data mentioned above include the versions representing the temporal segments, but may as well include other data such as initialization data, as explained below.

As just noted, the selected data may include initialization data for a decoder of the client device. The decoder can thus be initialized without the client device having to specifically request for the initialization data, and thus faster.

As noted above, the selected data may also include at least part of one of said versions representing the temporal segment.

The step of selecting data may include estimating a quantity of data (e.g. video data) to be pushed, which may then be used when deciding which data are to be selected. The quantity may be estimated based on a buffer time defined in the description file and/or based on a bandwidth estimation determined by the server.

The step of selecting data may be performed based on at least one preference included in the request and/or based on usage data derived from prior exchanges between the server and the client device and/or based on an analysis of the description file by the server and/or based on a table stored in the server and associated with the description file.

According to a possible embodiment, it may be provided a step of sending a push promise related to and prior to the step of pushing the selected data. The client device may thus be informed of the data to be pushed, before actually receiving these data.

The step of sending the push promise may be performed prior to the step of sending the description file, which makes it possible to inform the client device at an early stage.

The push promise includes for instance an identification of the selected data.

According to a proposed embodiment, the server determines a confidence level associated to the selected data and the push promise includes the determined confidence level.

According to a possible implantation explained in the detail description given below, the server may store a hierarchical representation of blocks of data forming the selected data. In such a case, the following steps may be provided:

- receiving from the client device an instruction for not pushing a block of data;
- cancelling the pushing of said block of data and of blocks of data connected to said block of data in the hierarchical representation.

The proposed method may include a step of determining a level of confidence associated with the selected data; then:

- if the determined level of confidence is below a predetermined threshold, pushing the selected data includes pushing only initialization data for a decoder of the client device;
- if the determined level of confidence is above the predetermined threshold, pushing the selected data includes pushing initialization data for a decoder of the client device and at least part of one of said versions representing the temporal segment.

Embodiments of the invention also provide a method for receiving media data representing a media item (e.g. a video) from a server storing data representing the media item, at least a temporal segment of which is represented by a plurality of versions, the method comprising the following steps implemented by a client device:

- sending a request to the server for a description file including a description of the versions representing the temporal segment and respective pointers to the versions representing the temporal segment;
- receiving the description file from the server, the description file containing pointers to sets of data;
- receiving unsolicited data from the server, wherein said unsolicited data belong to said sets of data.

As noted above, the unsolicited data may include initialization data for a decoder of the client device (in which case a step of initializing the decoder with said unsolicited data may be provided) and/or at least part of one of said versions representing the temporal segment (in which case a step of decoding at least part of the unsolicited data may be provided).

The request may include at least one preference defining decoding at the client device, which may help the server in determining the media data to be pushed.

The request may also include an indicator that the client device accepts pushed data, based on which the server may effectively decide to push data.

As explained above, it may be provided a step of receiving a push promise related to and prior to the step of receiving the unsolicited data. This step of receiving the push promise may occur prior to the step of receiving the description file.

The push promise may include an identification of the unsolicited data and/or a level of confidence associated with the unsolicited data.

The following steps may be provided at the client device:

- determining acceptance or refusal of a push promise based on data included in the push promise;
- sending an instruction for not pushing said unsolicited data in case of refusal.

The following steps may also be used:

- determining acceptance or refusal of a push promise based on a level of confidence associated with the unsolicited data and included in the push promise;
- sending an instruction for not pushing said unsolicited data in case of refusal.

A step of buffering said unsolicited data upon receipt, before decoding these data, may be used.

As pushed data are meant to correspond only to initialization data and/or initial media data, the following steps may be implemented:

- determining data (e.g. video data) to be requested (i.e. not planned to be pushed) based on the description file and on data included in the push promise;
- sending a request for the determined data to the server.

Embodiments of the invention also propose a method for streaming media data representing a media item (e.g. a video) from a server storing data representing the media item to a client device, at least a temporal segment of the media item being represented by a plurality of versions, the method comprising the following steps:

- the client device sending a request to the server for a description file including a description of the versions representing the temporal segment and respective pointers to the versions representing the temporal segment;
- the server receiving the request from the client device;
- the server selecting data among sets of data pointed to in the description file;
- the server sending the description file to the client device;
- the server pushing the selected data to the client device;
- the client device receiving the description file from the server;

the client device receiving the selected data from the server.

Embodiments of the invention also provide a device for providing media data representing a media item (e.g. a video) from a server, the server storing data representing the media item, at least a temporal segment of which is represented by a plurality of versions, and comprising:

a receiver configured to receive a request from a client device for a description file including a description of the versions representing the temporal segment and respective pointers to the versions representing the temporal segment;

a selection module configured to select data among sets of data pointed to in the description file;

a module configured to send the description file to the client device;

a module configured to push the selected data to the client device.

Embodiments of the invention also provide a device for receiving media data representing a media item (e.g. a video) from a server storing data representing the media item, at least a temporal segment of which is represented by a plurality of versions, the device comprising:

a module configured to send a request to the server for a description file including a description of the versions representing the temporal segment and respective pointers to the versions representing the temporal segment;

a module configured to receive the description file from the server, the description file containing pointers to sets of data;

a module configured to receive unsolicited data from the server, wherein said unsolicited data belong to said sets of data.

Lastly, embodiments of the invention provide a system comprising a server and a client device for streaming media data representing media item (e.g. a video) from the server storing data representing the media item to the client device, at least a temporal segment of the media item being represented by a plurality of versions, the client device comprising a module configured to send a request to the server for a description file including a description of the versions representing the temporal segment and respective pointers to the versions representing the temporal segment;

the server comprising a module configured to receive the request from the client device, a selection module configured to select data among sets of data pointed to in the description file, a module configured to send the description file to the client device and a module configured to push the selected data to the client device;

the client device comprising a module configured to receive the description file from the server and a module configured to receive the selected data from the server.

Optional features proposed above for the method for providing media data and the method for receiving media data also apply to the method for streaming media data and to the various devices and system just mentioned.

BRIEF DESCRIPTION OF THE DRAWINGS

Other features and advantages of the invention will become apparent from the following description of non-limiting exemplary embodiments, with reference to the appended drawings:

FIG. 1*a* illustrates a graph of a set of resources owned by a server;

FIG. 1*b* illustrate an HTTP exchange without using a server PUSH feature;

FIG. 1*c* illustrates an HTTP exchange using a feature of pushing directly connected sub-resources by the server;

FIG. 1*d* illustrates a flowchart of an exemplary mode of operation on a client side;

FIG. 1*e* illustrates a flowchart of an exemplary mode of operation of a server implementing a push feature;

FIG. 5 illustrates a Media Presentation Description (MPD) file;

FIG. 6 illustrates an example of a DASH manifest file;

FIG. 16 shows an MPD document in which a PushPolicy node is used to specify a push policy applied by the server;

FIG. 19 illustrates an MPD document with a push policy that indicates that the three segments following a requested segment will be pushed;

FIG. 23 shows an MPD document in which a SupplementalProperty element is used to specify a push policy applied by the server at a hierarchical level of the document;

FIG. 24 shows an MPD document used as example for an XPath based push policy;

FIG. 25 illustrates the reordering of elements in a priority tree, for example in a webpage, before applying a push policy;

DETAILED DESCRIPTION OF EMBODIMENTS OF THE INVENTION

In what follows, embodiments of the invention are described in the context of DASH-based networks implementing the HTTP 2.0 protocol. The data streamed is, for example, video data. Embodiments of the invention are not limited to DASH networks.

A server device of a communication network that streams data to a client device implements a push feature according to which it can transmit data elements to the client without explicit requests from the client for the data elements transmitted.

The server and the client may share push policies that drive the server to determine the push promises and to actually transmit the corresponding data. Thanks to this sharing, the client may anticipate the push of some useless data, to cancel such push. This results in reducing the server's processing, as well as the network use since PUSH_PROMISE frames may be cancelled before being sent.

In specific embodiments, the server can indicate in its push promises, by which it announces transmission of the not explicitly requested data elements, ordering information concerning the order in which the server intend to transmit the data elements. The order of the data elements may be defined using priority values, for example the priority values according to HTTP/2.

Upon receipt of the push promises, the client device can determine in advance the order of transmission intended by the server, thereby enabling the client to react to the proposed order in case it does not match its own desired order. For example, the client device can update the priority values and send the updated priority values to the server. The server can thus change the transmission ordering based on the new priority values in order to better match the client's needs. The server can use the updated priorities into account for future data transmissions.

According to embodiments, the client may request a full reordering or a partial reordering of the transmission of the data elements to the server.

Figure 7A:
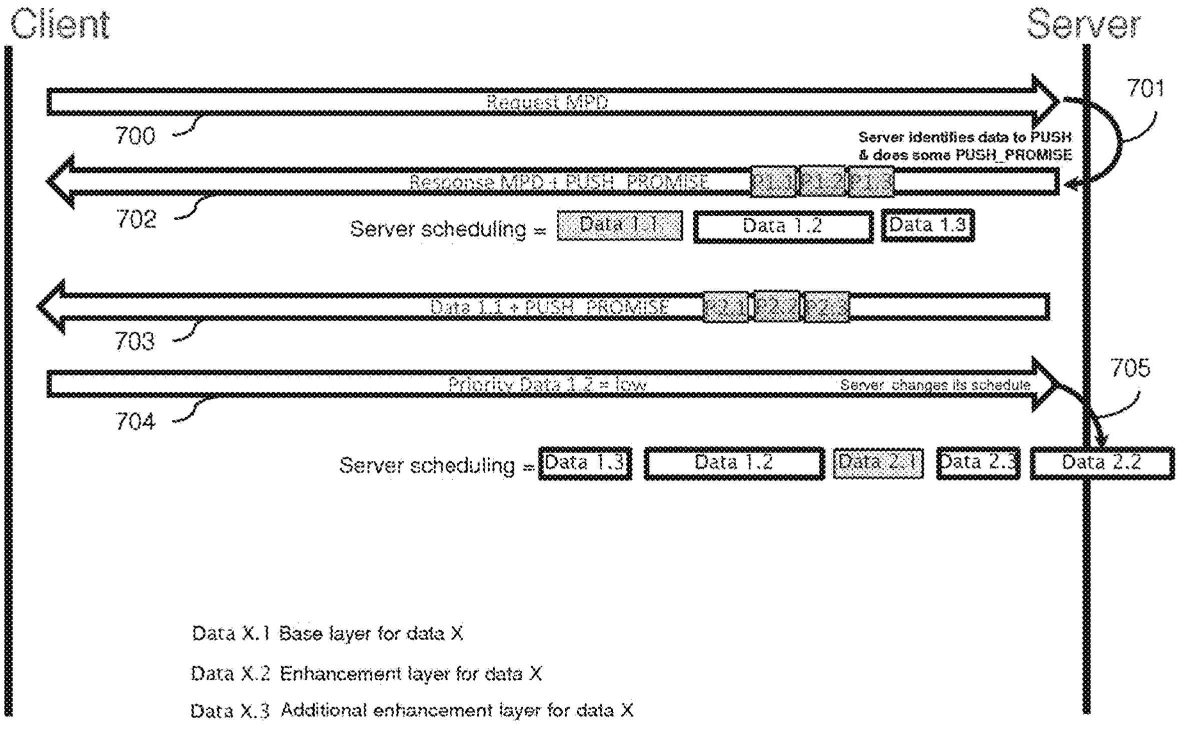
FIGS. 7*a* and 7*b* illustrate media segment reordering according to embodiments.

Full reordering is described with reference to FIG. 7*a*. A client requests, during a step 700, a Media Presentation Description (MPD hereinafter) to a server. The server retrieves the MPD to send back to the client and identifies corresponding data elements to push during a step 701. In the example of FIG. 7*a*, the server identifies "Data 1.1", "Data 1.2" and "Data 1.3" as data elements to push. These elements are for example data segments. Element "Data X.1" represents the base layer for data X, element "Data X.2" represents the enhancement layer for data X and "Data X.3" represents the additional enhancement layer for data X. The server defines a specific order of transmission for the data elements. The server associates respective priority values with the PUSH_PROMISE frames to be sent to the client for announcing the upcoming push data elements. The server then sends the PUSH_PROMISE frames "P1.1", "P1.2" and "P1.3" with the associated priorities and the MPD during a step 702. Next, shortly after sending the MPD and the push promise, during a step 703, the server sends to the client a data frame corresponding to the "Data 1.1" element and a PUSH_PROMISE messages "P2.1", "P2.2" and "P2.3" respectively corresponding to the elements "Data 2.1", "Data 2.2" and "Data 2.3", which are segments following "Data 1.1", "Data 1.2" and "Data 1.3" in the transmission order defined. In parallel to the receipt of the data frame and the push promise of step 703, the client decides, after receipt of the MPD and the "P1.1", "P1.2" and "P1.3" PUSH_PROMISE frames, that the enhancement layer "Data 1.2" is of lower priority compared to the additional enhancement layer "Data 1.3". Thus, the client sends a priority update frame to lower "Data 1.2" priority during a step 704. Upon receipt of the priority update request, the server changes the schedule of the transmission during a step 705. Hence, transmission of "Data 1.2" is postponed after "Data 1.3" is transmitted. In addition, the server uses the MPD to link the segments associated with "Data 1.2". It identifies "Data 2.2" and lowers its priority as well.

Figure 7B:
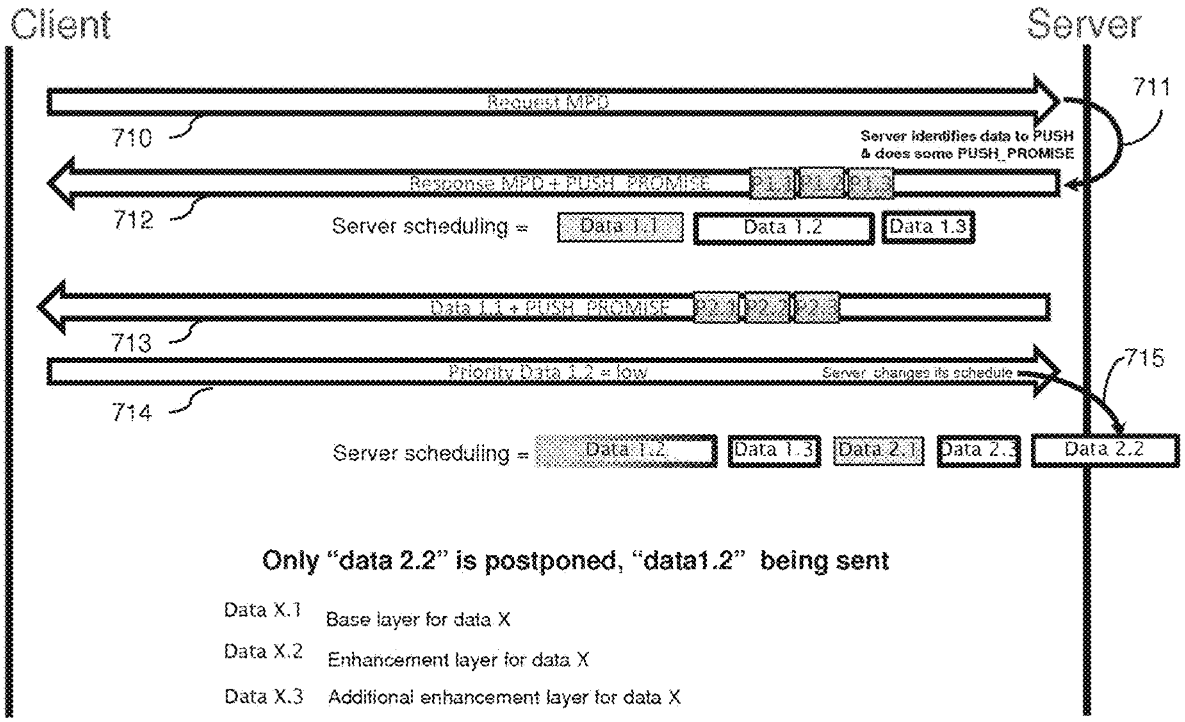

Partial reordering is described with reference to FIG. 7*b*. Steps 710 to 714 of FIG. 7*b* are substantially the same as steps 700 to 704 of FIG. 7*a*. After receipt of the priority update frame, the server behaviour differs as compared to step 705 previously described. During step 715, the server already started transmission of "Data 1.2" and proceeds further with the transmission. For that segment, there is no change in the priority. The server nevertheless updates the priority of the connected segments, namely "Data 2.2" in the present example. In order to announce the fact that the priority change has been taken into account, the server may send a priority update massage for "Data 2.2". The client can thus be informed of the change.

Embodiments of the invention may be implemented in use cases wherein servers can push high quality video parts well enough in advance so that the whole part of the video can be played as high quality. For instance, the video can be split into a part 1, played as low quality, a part 2, played as high quality and a part 3 played as low quality. The bandwidth between the client and server allows real-time streaming of low quality but not high quality. In that case, the server may interleave part 1 with the enhancement of part 2. Once part 1 has been played, the enhanced part 2 is also available and the server sends the base layer of part 2 to be played as high quality jointly with the enhancement of the same part 2. Thus, the server makes sure that the whole part 2 is played as high quality. Part 3 is sent thereafter. Quality flickering, which disturbs the user experience, can be alleviated and quality switching only occurs at a limited number of moments. The server is in the best position to know when to switch to a different quality level since it knows the video content.

Figure 8:
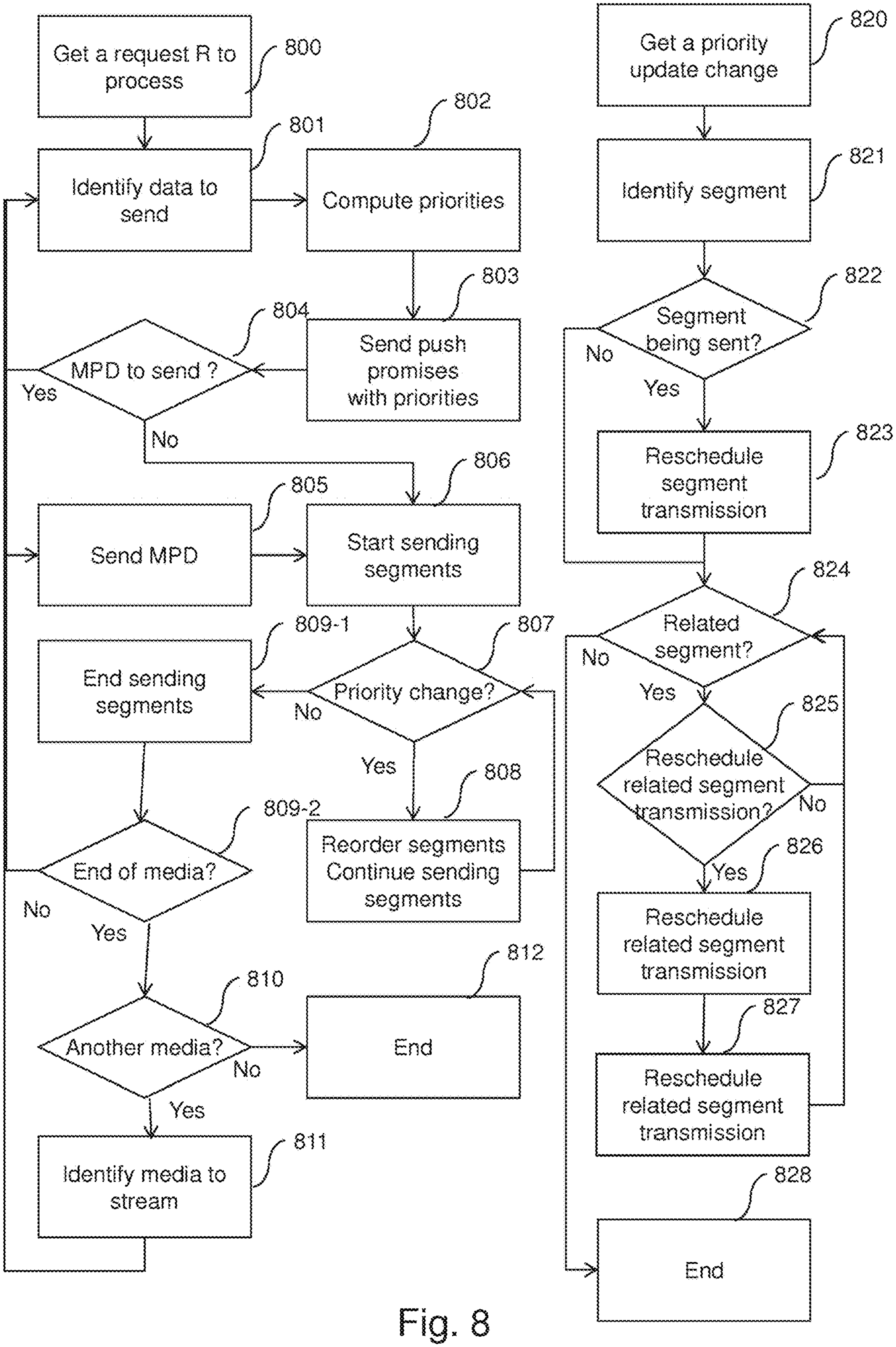
FIG. 8 is a flowchart of exemplary steps performed by servers according to embodiments.

FIG. 8 is a flowchart of steps performed by a server implementing a push-based DASH media streaming according to embodiments. Steps 800 to 812 describe the general principles. Steps 820 to 827 more specifically deal with the management of the priority feedback from the client.

During a step 800, the server receives a request R from the client. This request identifies a specific media, typically by referring to an MPD file. Next, the server performs an iterative process comprising steps 801 to 810. The process comprises sending data according to a defined order. The order of transmission is updated according to the client's feedback. Once the data are sent, they are received and played by the client. Next the server identifies new data to send and the process continues so on.

The first iteration starts with step 801, during which the data to be sent are identified. In case of the first performance of the iterative process, a fast start approach may be used in order to enable the client to start video playing as quickly as possible. In addition, the server may also identify subdivision of the media into chapters. In case the server knows that the client generally navigates using chapters, the server may actually select not only the segments that correspond to the beginning of the media but also the segments corresponding to the start of the first chapters in the media. After the first performance of the iteration, the server may also detect that the connection may support the transmission of a higher quality representation of the media. Thus, the server may identify when the resolution or quality switch should be done.

Once the server identified a list of segments to push, the server defines a transmission order for these segments. The transmission order is used for computing initial priority values for each pushed segment during a step 802. The ordering may be based on several parameters.

A first parameter may be the relationships between the different segments: for example some segments must be available for correctly decoding other segments. The segments that must be available are thus assigned higher priorities than said other segments.

A second parameter may be the popularity of video segments, which may be gathered from past statistics. As an example, with YouTube URLs specific times in a video may be addressed. When clicking on the links associated with these URLS, only the video needed to start the video playing at the specified time is retrieved. In addition, if a video is being chaptered, the beginning of each chapter is generally more often retrieved from users than segments in between chapter starts. Segments of the chapter beginning are thus assigned higher priorities than the in-between chapter segments.

A third parameter may be the timeline: the priority of a video segment that is closer to being played is higher than the priority of a video segment that is to be played later.

A fourth parameter may be the estimated time spent to actually transmit the segment. When the video segment is large, it takes a long time to be transmitted and therefore, transmission should start as soon as possible, i.e. with a high priority.

In case two segments have identical priorities, the corresponding data frames can be interleaved during transmission.

In case regions of interests are identified in the media content, if the bandwidth is not large enough for a high quality representation but is large enough for a low quality representation, the server may select an enhancement layer only for the region of interest.

Once the priorities are computed, the server sends PUSH_PROMISE frames containing the priority values during step 803. Identification of all segments is not needed for starting transmission of the PUSH_PROMISE frames. In case an MPD is to be sent for the segments to be pushed (step 804), the MPD is sent (step 805). The segment transmission starts in parallel during step 806.

Once the PUSH_PROMISE frames are received by the client, the server may receive priority update changes and then change its transmission schedule accordingly (steps 807 to 808 and steps 820 to 828). While sending segments, the server awaits receipt of priority change messages. In case a priority change message is received (step 807), the server reorders the segments accordingly and continue the segment transmission (step 808). Once all segments are sent (step 809-1), the server restarts an iteration process in order to continue streaming the media until the end of the media. When the end of a media is reached (step 809-2), the server checks whether or not it should automatically start streaming another media (step 810). In case another media should be streamed (Yes), the server identifies the new media to stream (step 811) and restarts the process from step 801. In case no new data should be streamed, the process is stopped (step 812).

The management of the priority feedback from the client, i.e. of step 808, starts with the receipt of a priority update change message during step 820. The following steps may also be performed in case the client cancels a segment push: this case may be seen in practice as equivalent to assigning the lowest priority to that segment.

Upon receipt of the priority update change message, the server identifies the related segment during step 821. The server then proceeds with the reordering of the segment transmission (steps 822, 823). If the segment is already transmitted, the process ends. If the segment is being transmitted, depending on the server implementation, it may refuse to change the transmission (for example because it is too complex) or it may actually reschedule the remaining data to be sent.

The rescheduling of the data may be performed as follows. The server stores a list of video segments to push (and/or video segments that are being pushed). This list is ordered according to the priorities set by the server. The server then sets the new priority value for the segment. The list is then reordered and the corresponding video segment transmission is made earlier or later accordingly.

Once the video segment is reordered, the server may actually decide to apply this priority change to other related video segments. If a client raised the priority of a video segment which is part of an enhancement layer, the server may raise the priority of all the segments of this enhancement layer. Conversely, if the client lowers the priority of a base video segment layer, the priority of all segments temporally related to this segment may be lowered. This process is described in steps 824 to 827. Based on the MPD and the rescheduled video segment, the server identifies a list of related segments (step 824). The relationship may be temporal, spatial, quality-based etc. The MPD may be enhanced in order to better show the potential relationships. In particular, when the priority of an initialization segment (which is necessary to play more than one video segment) is lowered or raised, all related segments may be rescheduled. This can be the case as well for base layer segments and enhancement segments. For each identified related segment, the server tests whether or not the transmission of the related segment should be changed (step 825). In case it should be changed, the server computes the new priority value for each segment (step 826) and reschedules the segment transmission accordingly (step 827). The new priority value may be computed by adding to the old value the difference between the new priority value received during step 820 and the initial priority value of the segment identified during step 821. The process stops when each related segment has been tested (step 828).

The server may also receive control flow messages, such as WINDOW_SIZE frames. These messages may enable the server to identify what the client is currently playing. When some additional buffer space is available on the client's end, it may be inferred that some data have been removed from the buffer, typically the oldest data. If the server keeps a history of the data sent, the server is able to identify which data have been removed. Thus, provided the server knows the client's cache ordering, the server can have knowledge of which video segments the client is currently playing. This ordering may be based on the MPD that makes it possible to order the cached data according to the timeline. A server may then detect client time skipping for instance. The server may react by quickly sending the start of the next chapter in advance so that the client can continue skipping video chapters.

It should be noted that the sending of a PUSH_PROMISE frame with priorities may be done in various ways. A PUSH_PROMISE frame must relate to an opened stream which is initiated by the client. According to embodiments, the initial stream made by the client during step 800 may be always left open. According to other embodiments, a PUSH_ PROMISE frame is sent within a stream opened by the server. In this case, the client considers the PUSH_ PROMISE frame as it is sent by the parent client-initiated stream. Thus, it can compute the right headers of the virtual request corresponding to the particular PUSH_PROMISE frame.

According to other embodiments, a priority message is sent jointly with a PUSH_PROMISE. A first possibility is to send it as a header within the PUSH_PROMISE frame. Another possibility is to send a PRIORITY frame with the stream ID reserved by the corresponding PUSH_PROMISE frame. A third possibility is to send the PUSH_PROMISE frame, then the corresponding HEADERS frame (to open the stream) and then the PRIORITY frame on this newly opened stream.

In order to further control the client's buffer, the server may send a new representation of a segment cached by the client. Within the headers sent as part of this new representation, HTTP cache directives may be used to request the client to actually remove the segment, for instance by marking it as not cacheable. This may make it possible to recover buffer space on the client's end. HTTP/2 control flow may be used. The server can then push additional data.

A server may send priority values for each video segment. The server may also send priority values for specific segments. In case the server did not send a priority value for a current PUSH_PROMISE frame, the client can compute a priority value from the last priority value sent from the server. For instance, the client may increment the priority value each time a new PUSH_PROMISE frame with no priority value associated with is received. Hence, the PUSH_ PROMISE frames can be grouped so that updating the priority of the specific segment will also update the priorities of all segments of the group.

The process on the client's side is described with reference to FIG. 9.

The client should be able to play the content available at a given time. However, the client has to cope with potential buffer limitations and processing time. The client has to check whether or not the transmission ordering proposed by the server matches the memory space available in the client's buffer and matches the content currently played by the client.

During a first step 900, the client connects to the server and requests an MPD file. The client then retrieves the MPD file during a step 901 and waits (step 902) for the receipt of data. When data are received, the client checks (step 903) whether the data are a push promise. In case a push promise has been received, this means that a new video segment is being sent by the server. The client processes the push promise. In particular, the client may validate the priority values proposed by the server during step 904. In case the client wishes to change the priority values (step 905) for the current segment or another promised segment, the client compute a new priority value and sends it to the server (step 906).

In case the client receives video data (step 907), the client links the video segment to the MPD file (step 908) and stores the video data (step 909). Linking the video data to the MPD file makes it possible for the client to retrieve the video segment when it will be further used for decoding the video (step 911). This may also provide efficient storage of the video data (step 909), for example if contiguous video segments are grouped.

The buffer storage constraints may further change the priority. Thus, the client may check again whether a priority value has to be changed and may communicate with the server if needed (steps 905, 906).

Once the client is ready to start or continue playing video (step 910), the client retrieves from its cache the next time slot video segments (step 911) and decodes and plays the video (step 912). As part of step 911, the client may query its cache in order to know which video segments are available. By default, the client may use all video segments available, in particular all enhancement segments if any. The client may let the server select the content: generally speaking, all segments should be used by the client. If some segments cannot be used jointly (like audio English tracks and French tracks), the client should dismiss the unused segments in the first place. It should be noted that not all clients may get access to the cache state: web applications in particular do not usually have access to the web browser cache. In such a case, the server may directly send the list of pushed segments to the web application client. For instance, this information may be exchanged from the server to the client using a web socket connection.

As the video is played and decoded, the corresponding video segments may be removed from the buffer. Hence, the client updates its available buffer size using a WINDOW_ SIZE frame. The client may keep video segments that have been recently played in order to enable the user to rewind the video during a limited period of time. The flow control update mechanism may also be used when the user does a fast forward/time skip. The client may remove old stored video content to make room for new content and announces this change to the server using a WINDOW_SIZE frame. When the server receives the WINDOW_SIZE frame, the server may be able to compute which video segments were removed and then identify what the client is actually playing, as discussed above.

In what follows, step 904 is described in more details.

The client holds a list of all push promised video segments. This list is ordered according to the priority information found in the push promise frames. First, it is checked for potential frozen video issues. Based on an estimation of the available bandwidth and the ordered video segment list, transmission beginning and end times of each segment can be estimated. Based on these times, it may be tested whether each video segment will be available at the time it should be used for video playing. If a promised video segment is expected to be delivered after its corresponding video playing use, its priority should be increased. Thus, the video segment is moved up in the push promised video segment list order. In order to compute the exact priority value, it is searched for the position in the video segment list that makes it possible to have the video segment delivered on time and that is the closest to the current video segment position. The priority is then set to a value between the priorities of the video segments in the list that are before and after the video segment new position.

Other factors may also be used by the client for changing the video segment priorities. For instance, if the client is expecting to do some chapter-switching, the client may actually increase the priority of all video segments that start the chapters, in particular the corresponding initialization segments.

According to embodiments, the client-side flow control comprises disabling the per-stream flow control and keeping only a per-connection flow control. The per-connection window size defines the maximum amount of video that a client may actually store at any given time. The client and the server may negotiate at initialization time and during the connection in order to decrease or increase this window size. If the server wants to push some HD content, the server may request the client to increase the window size. If the connection bandwidth is low, the server may need to anticipate well in advance the sending of HD content for a specific part of the video, in which case the buffer size should be made larger.

The order of transmission may be an important issue when the buffer has a single size. In particular, as the buffer is filled with data, the priority ordering becomes more and more important. An important constraint is that the video never freezes. As long as the buffer is largely empty, the server may push various video segments, like segments largely in advance in order to provide an efficient fast forward or chapter skipping. Once the buffer is almost fully filled, the video segments to push should be as close as possible to the video segments being played. This push behaviour may be done by the server if the server has accurate information concerning the client buffer. It may also be implemented by the client using the priority update mechanism.

Figure 9:
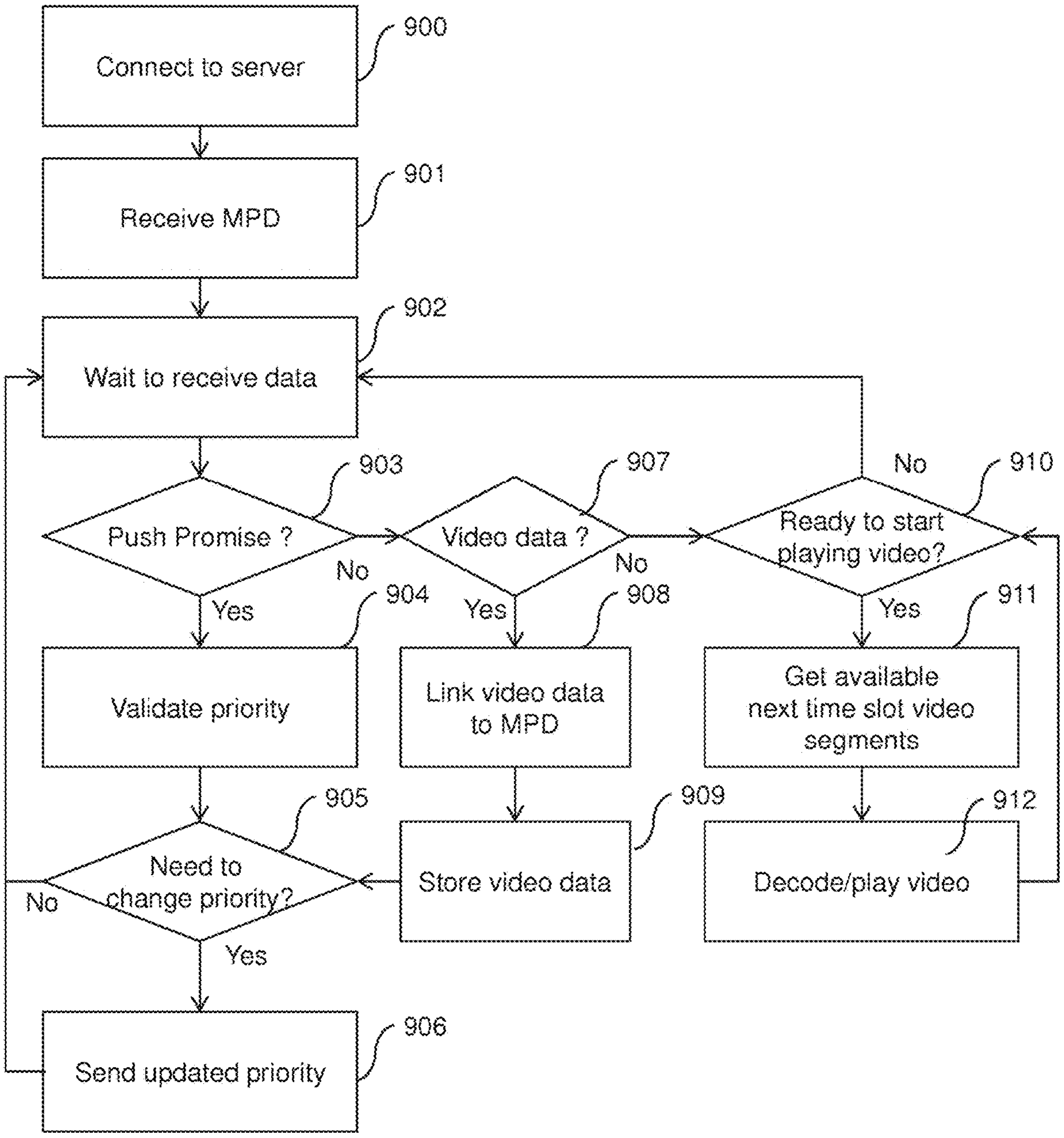
FIG. 9 is a flowchart of exemplary steps performed by clients according to embodiments.

In case of automated video switching, the flowchart of FIG. 9 may be extended by detecting the push of a new MPD as part of the push promise check (step 903). When an MPD push is detected, the client may start receiving segments of a new video as part of step 908. The client must therefore identify the MPD related to the video data. Once the video playing is finished for a given MPD (step 902), the new MPD may be used for continuing video playing. The client may actually flush all video segments linked to the previous MPD.

Figure 10:
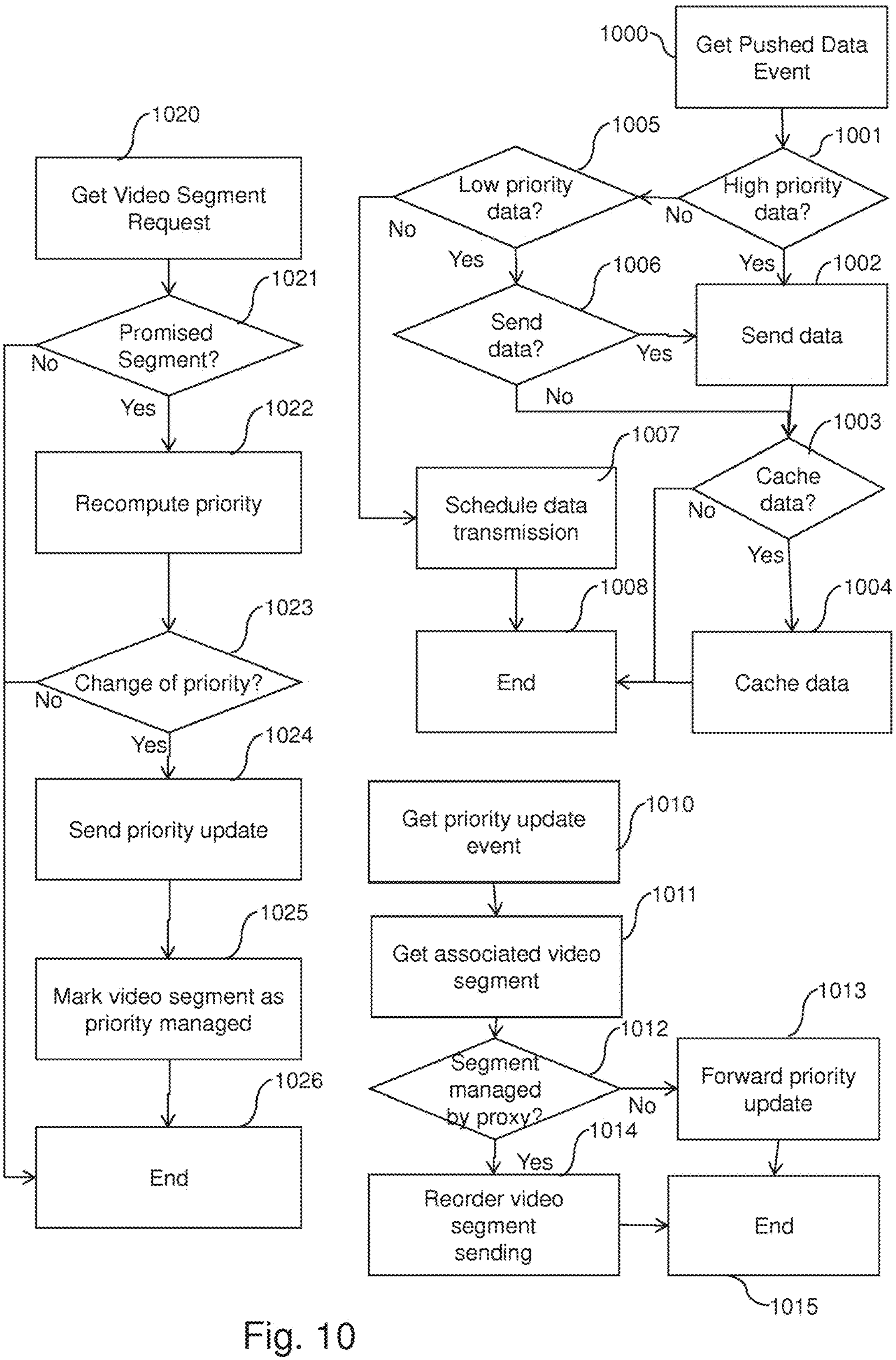
FIG. 10 is a flowchart of exemplary steps performed by proxies according to embodiments.

With reference to FIG. 10, the behaviour of a DASH-aware proxy is described. When receiving a segment pushed from a server, a proxy is not mandated to push it to the end-client. In case of DASH streaming though, it can be considered good practice (or default behaviour) to do so.

The proxy may be able to adjust the server and client behaviours, both in terms of priority processing as well as pushed data to be sent. A proxy may in fact handle independently the priorities with the client from the priorities with the server. In addition, the server may push more data than needed for a given client and the proxy may retrieve the additional pushed data to fulfil requests from other clients.

A server may push a video segment for several reasons. For example, a video segment may be pushed in case it is believed to be useful for the end-client. A video segment may also be pushed in case it is believed that the video segment can be used several times and that it is worth pushing it to proxies.

In the first case, proxies generally send the video segment to the client. Proxies may postpone its transmission in order to optimize the client or proxy network state, for instance the client radio state. An exemplary case may be the segment push for fast start video playing and bandwidth estimation, in which case data should be sent as fast as possible to the client. In case the server is interested in pushing data to proxies, proxies may not automatically send the video segment to the client, except if they have means to know that the video segment will be useful to the client. In order to make possible the identification of video segments that may not be sent to clients, a specific priority value may be used. Using a priority value makes it possible to have the proxy always check the priority value for optimizing the processing of the various frames that arrive.

FIG. 10 comprises three flowcharts. One flowchart relates to the process of filtering pushed segments (steps 1000 to 1008). Another flowchart relates to the process performed when a segment is requested by a client while it is already promised to another client (steps 1010 to 1015). Another flowchart relates to the management of priority changes (steps 1020 to 1026).

The process of filtering pushed segments starts with the receipt (step 1000) of a pushed data event, typically when receiving a PUSH_PROMISE frame or a related DATA frame. The proxy checks whether the data are of high priority or not (step 1001). Data may be considered as of high priority if their priority value is much larger than priority values of other segments being transmitted. Data may also be considered as of high priority if its priority value has a special meaning, such as fast start or bandwidth estimation. If the data are of high priority, they are sent as quickly as possible to the client (step 1002). The proxy then decides whether or not to store the data (steps 1003, 1004). This decision may be made once when receiving the corresponding PUSH_PROMISE frame or the corresponding HEADERS frame that opens the pushed data stream. This decision may also be based on the proxy cache state, the envisioned use of the video, the popularity of the video source or other criteria. The proxy stores the video segment if the segment is pushed while being requested by one or more clients at the same time. The video segments may also be stored if segments are identified as fast start.

If the data are not of high priority, the proxy checks whether it is of low priority (step 1005). Data of low priority may be data for which transmission to the client may be skipped but that are considered by the server as interesting for network intermediaries like proxies. The proxy first decides whether or not to send the data to the client (step 1006). This decision may be made once when receiving the corresponding PUSH_PROMISE frame or the corresponding HEADERS frame that opens the pushed data stream. If it is decided so, the proxy sends the corresponding frame to the client (step 1002). The process then stops after deciding whether or not to store the data.

The priority value negotiated between the server and proxy may be different from the priority value negotiated between the client and proxy. Therefore, in case the data is of usual priority (i.e. not of low priority and not of high priority), the proxy checks whether the segment priority value is managed by the proxy. As illustrated in FIG. 10 (steps 1020 to 1026), the proxy uses the client-to-proxy value for scheduling the time when the data should be transmitted: the proxy holds a list of all to-be-transmitted video-related frames. These frames are ordered according to the priority values before being sent following that order.

In the case the proxy is receiving a priority update frame (step 1010), the proxy identifies the related video segment (step 1011). If its priority value is not being managed by the proxy (step 1012) the proxy forwards the priority update frame to the server (step 1013). Otherwise, the proxy stores this new priority value and reorders the video segment transmission (step 1014) accordingly. In case a potential conflict appears, in particular in case the video segment delivery from the server is expected to be too late for the client needs, the proxy can then forward the priority value to the server.

Steps 1020 to 1026 relate to the case of a proxy that receives a request from a client to a video segment (step 1020) that is already promised by the server to another client (step 1021). Depending on the priority given to that request, the proxy computes the minimum proxy-to-server priority that would fulfil the client's request (step 1022). This computation is done by computing the proxy-to-server priority value that will ensure that the server-to-proxy delivery time is earlier than the proxy-to-client expected delivery time. The priority is changed if the computed priority is below the currently set priority (step 1023), in which case the proxy will send a priority update message to the server (step 1024) and the proxy will mark this video segment priority as managed by the proxy so that the proxy sends the video segment to its two clients at the best time for their needs. Similarly to this process, a proxy may receive several priority updates to the same segment from several clients, in which case the proxy may actually send the lowest priority value that satisfies all clients.

Figure 11:
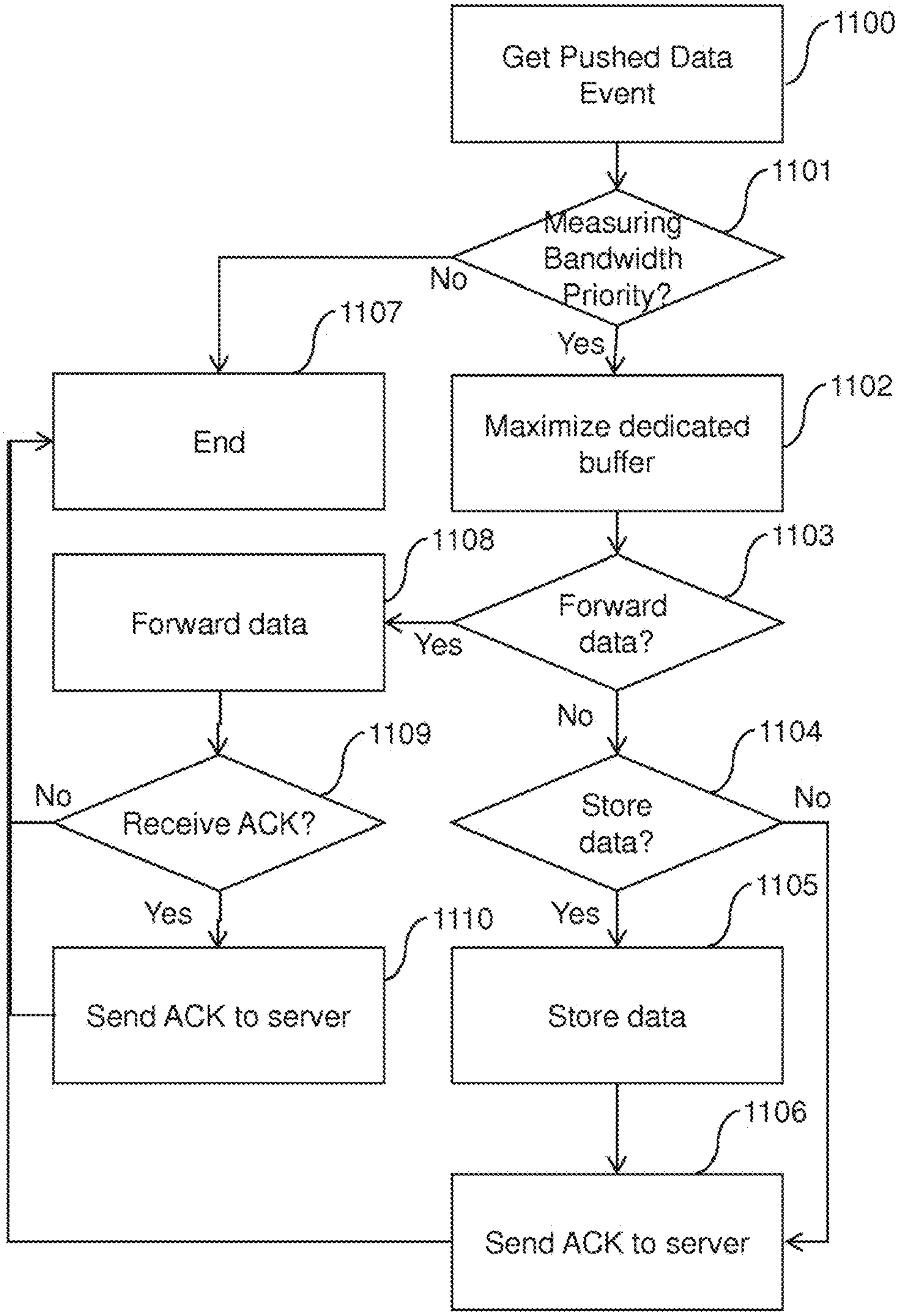
FIG. 11 illustrates bandwidth measurement according to embodiments.

With reference to FIG. 11 there is described an embodiment according to which a client receives a pushed data event whose priority value indicates that the server wants to use it for measuring bandwidth. Measuring bandwidth may be done using TCP/IP packets through active or passive measurements for computing round trip times. Based on round trip times, the available bandwidth may be computed as found in document Saubhasik et al. "Bandwidth Estimation and Rate Control in Bit Vampire". This computation may potentially take into account effects of HTTP/2 control flow. By making notification that some data frames are used for bandwidth estimation possible, the bandwidth available without HTTP/2 control flow can be estimated.

The process starts with step 1100 during which a pushed data frame is received from the server. Next, it is checked whether the associated priority of the stream indicates that the server is measuring bandwidth (step 1101). In that case, the dedicated buffer is maximized (step 1102). Alternatively the stream flow control can be disabled. If the receiving node is a proxy (step 1103), it may forward the segment data. Otherwise, the client decides whether to store the segment (step 1104). The client stores the pushed segment (step 1105). In any case, the client sends an acknowledgement to the server in the form of a WINDOWS_UPDATE (step 1106) for the per-connection window. This acknowledgment will then be used by the server for estimating the connection bandwidth. In the case the client is a proxy, it forwards the pushed data (step 1108) as quickly as possible. When receiving an acknowledgment from the end-client, the proxy forwards it back to the server as well (steps 1109, 1110).

In order to estimate the available bandwidth, the server may use the round trip time of the sent data frame that is computed as the difference between the sending time of the data frame and the reception time of the acknowledgment message, the pairing between the two being based for instance on the data frame size which should be equal to the window size update. Round trip times can be computed from various data frames of one or more video segment. In order to increase accuracy, the data frames may have various sizes. Splitting a video segment into several DATA frames of different sizes can be performed by the server. The server only needs to ensure that the network layer will not split DATA frames into several TCP/IP packets (hence smaller DATA frames) or not buffer content to be sent and merge several DATA frames into a TCP/IP packet. Based on those measurements, standard techniques can be used for computing the available bandwidth (an example can be found in the above-mentioned document) that the server may use to actually decide which video representation to use.

Figure 12:
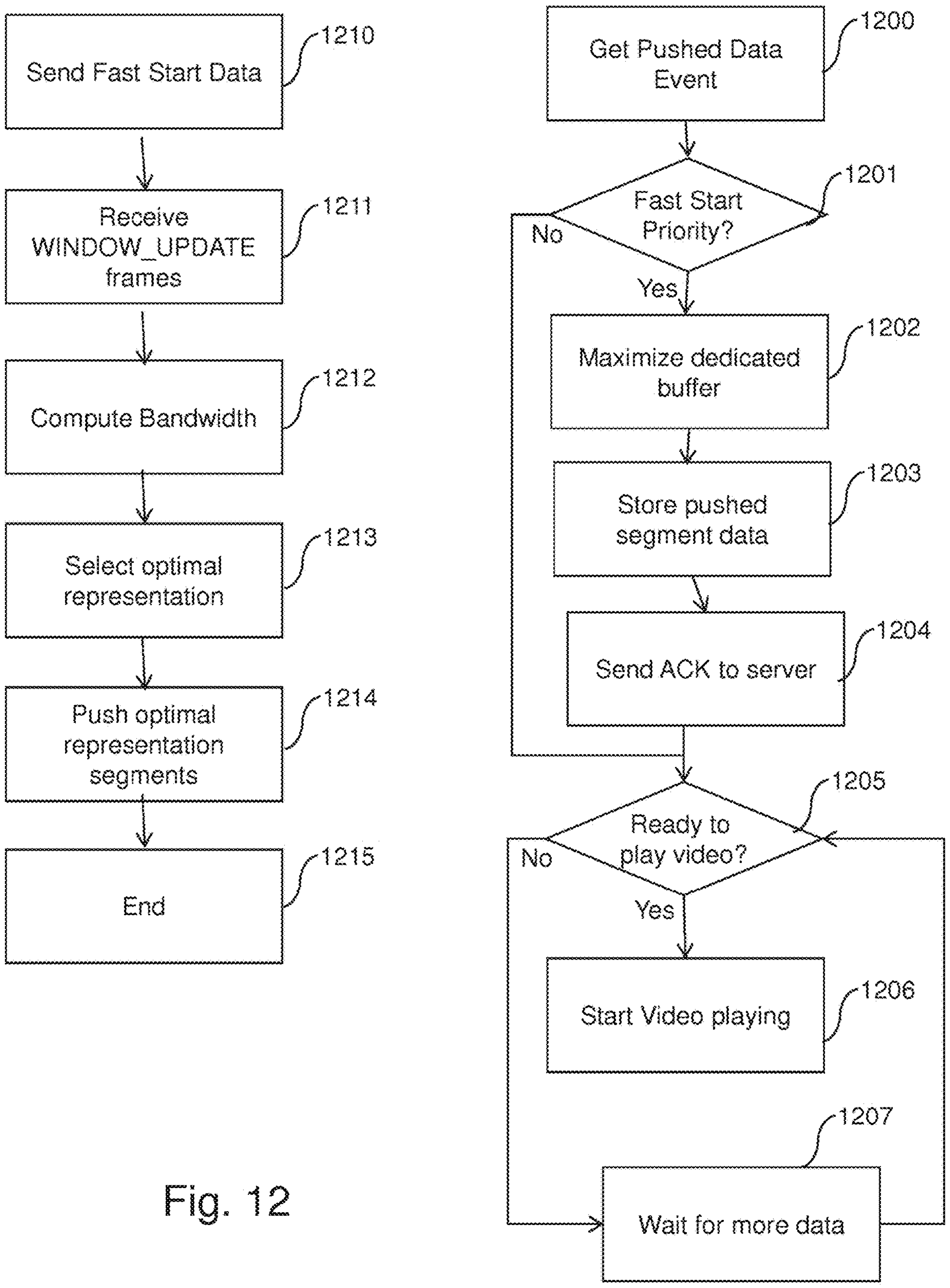
FIG. 12 illustrates video playing initialization according to embodiments.

With reference to FIG. 12, there is described the case of an initial video playing. The server pushes data using the fast start priority. It is considered that the data probably have a low-bit rate and that the client will receive those data and send acknowledgments to the server so that the server can estimate the bandwidth and switch to the optimal representation. The client-side process is described in steps 1200 to 1207. The server-side process is described in steps 1210 to 1215.

The client process starts with a step 1200 of receipt of pushed data. The client then checks whether the priority has the fast start value (step 1201). In that case, the client typically maximizes the dedicated buffer (step 1202). This maximization is performed when receiving the PUSH_PROMISE of the pushed data. The data are then stored (step 1203) and the client sends an acknowledgement to the server using the WINDOW_UPDATE frame (step 1204). The client then checks whether enough data are available to start playing the video (step 1205). If they are, the video playing starts (step 1206). Otherwise the client waits for more data (step 1207), until enough data are available for starting playing the data.

The server process starts with a step 1211 of sending segment data frames with the fast start priority (step 1210). The server then receives acknowledgments (step 1211) that will allow computing the available bandwidth (step 1212). Once enough measurements are obtained, the server selects the optimal representation (step 1213) and starts pushing optimal representation segments (step 1214). The server decides when to switch representation. This has at least two benefits. First the server may know when the measurements are accurate enough and may switch from one resolution to another as soon as this is the case, while the client will need to handle some delay. Second, the server may decide to switch from one resolution to another at the time that is less disturbing for the user experience. Indeed, the server has the knowledge of the video content. In particular, the MPD may be augmented with information on the times at which resolution switch can be best envisioned.

The present invention relates to an enhanced streaming method where, at the server side, a request relating to first media data is received, from the client device; second media data to be sent to the client device without having been requested are identified; and then data relating to said first media data are transmitted to said client device, in response to said request, and at least one announcement message respectively identifying said second media data is prepared with a view to transmit the announcement message or messages to the client device.

At the client side, a request relating to first media data is transmitted to the server device; and data relating to said first media data are received from said server device, in response to said request, The enhanced streaming method reduces the mismatches between the server's decisions to push some media data and the client's needs for such data. As will be apparent from below, the server and the client share a push policy so that they both determine the same media data to be pushed from any media data requested by the client. A push policy defines how to determine the data to push, and may be seen as a rule for determining which resources linked to requested data are about to be pushed after the requested data are processed (after a GET request), and possibly how they are pushed (e.g. in which order). Usually, the linked resources are determined using one document, for instance a manifest file, such as an MPD file (in the DASH context for multimedia data), or an HTML document.

As a consequence, based on the shared push policy, the client is able to anticipate the server's behaviour to avoid, and more precisely to cancel, the transmission of useless media data from the server. Use of bandwidth in the communication network between the client and the server is thus reduced. Furthermore, the number of HTTP requests and PUSH_PROMISE cancellation is reduced, which lowers the latency of the application in particular for low latency live video streaming.

According to the invention, the server may use a push policy shared with the client device for the server device to drive the identification and the transmission of the second non-requested media data to the client device. In particular, it may use a push policy shared with the client device and defining how to determine second media data, for the server device to determine the second non-requested media data to be sent to the client device. Correspondingly, the client may use a push policy shared with the server device and defining how to determine second media data, for the client device to determine second media data to be sent by the server device without having been requested by the client device.

Figure 14A:
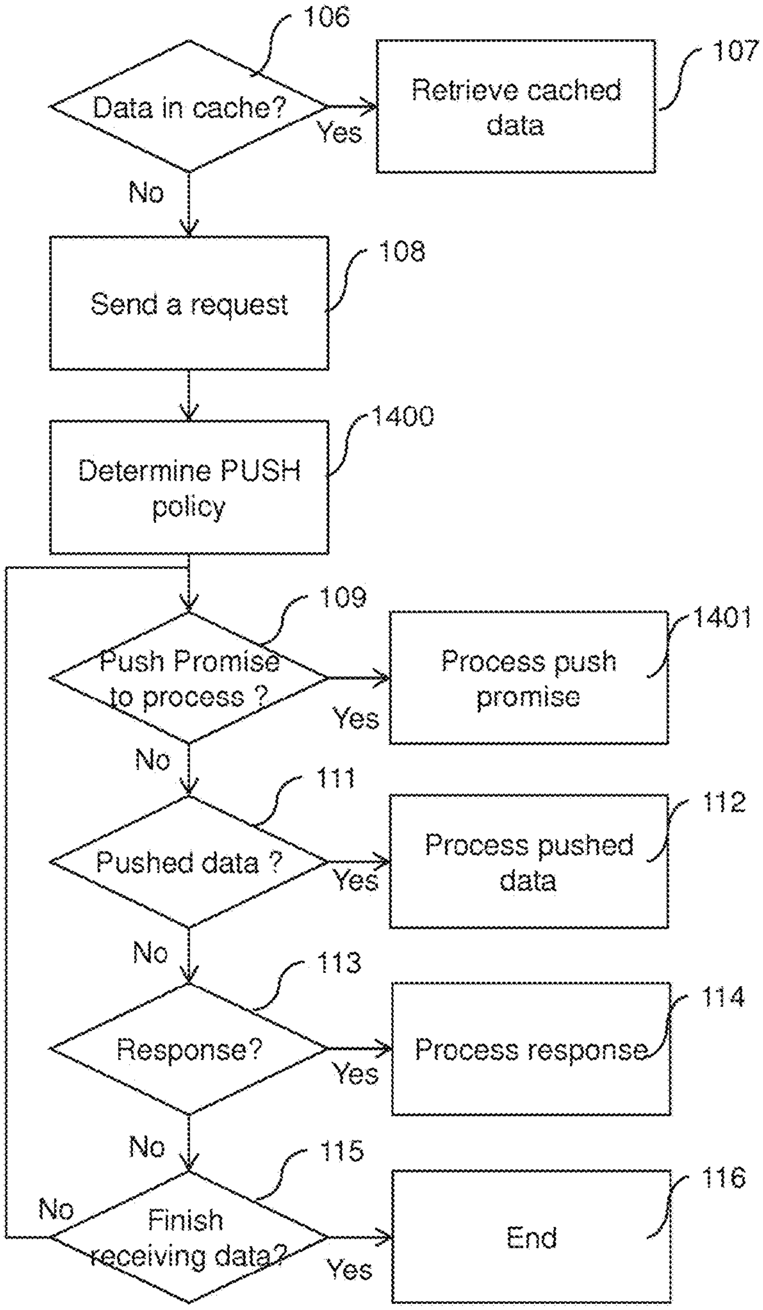
FIG. 14*a* illustrates, using a flowchart, general steps of the invention at the client side.
Figure 14B:
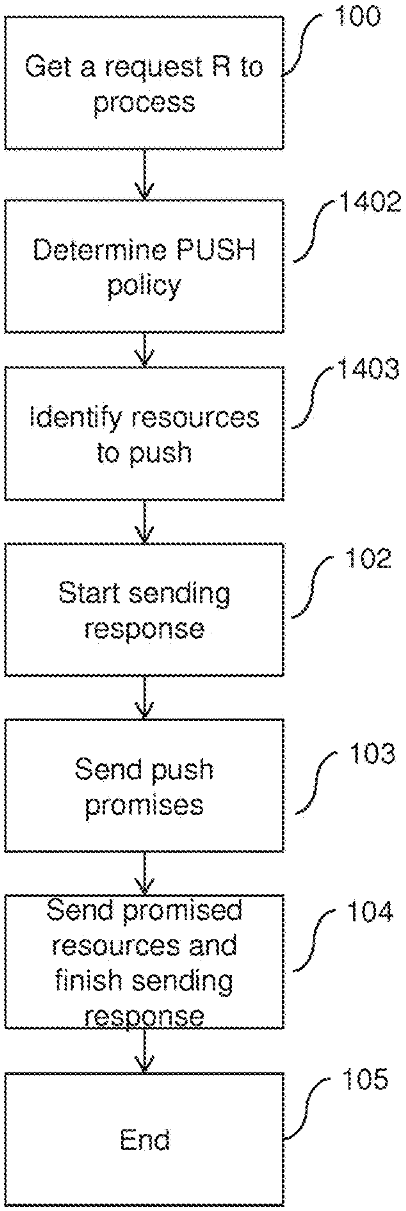
FIG. 14*b* illustrates, using a flowchart, general steps of the invention at the server side.

FIG. 14*a* illustrates, using a flowchart, general steps of the invention at the client side, while FIG. 14*b* illustrates, using a flowchart, general steps of the invention at the server side.

In comparison to the process described with reference to FIGS. 1*d* and 1*e*, additional stages 1400 and 1402 make it possible for respectively the server and the client to determine the push strategy that is shared with the other, and thus to be used.

According to first embodiments, the shared push policy is an implicit push policy, meaning that the client and server do not exchange (explicit) policy data to tell the other what is the push policy to be shared. An implementation of the implicit approach for the shared push policy includes using the same algorithm, referred to as "second media data determining algorithm", at both the server device and the client device, the algorithm enabling the server device and the client device to determine the same second media data from the first media data requested.

For instance, the algorithm is predetermined either during the set-up of the client and server or relatively to a specific standard. A typical example of algorithm may consist in pushing the N resources following the requested resource in a parsing order of the manifest file, where N is a predetermined number, for instance 4.

Referring to the Figures, the steps 1400 and 1402 consist, in case of implicit push policy, in loading in memory the predetermined algorithm for identifying the resources to be pushed (step 1403 at the server side).

The client may efficiently use the so determined push policy for estimating the number of PUSH_PROMISE that are expected and for preparing cancellation messages for unwanted push data, for instance in step 1401.

For instance, this would result for the server in receiving, from the client device, a cancellation request requesting to cancel transmission of a part of the second non-requested media data so that the server device does not transmit the corresponding prepared announcement message. For its part, the client would thus send, to the server device, a cancellation request requesting to cancel transmission of a part of the second non-requested media data, in order to drive the server device not to transmit an announcement message identifying the part of the second non-requested media data. One may understand that such cancellation can occur before the announcement message is transmitted from the server device or received by the client device. This approach may be useful for example, when the client decides to switch to another version of a medium. In such situation, it can decide to cancel the segments pushed for the previous version.

It may also be noted that, thanks to the knowledge of the resources to be pushed using the algorithm, the client can make a second request to the server in parallel, in order to retrieve subsequent resources without having to wait for the corresponding PUSH_PROMISE from the server. In case of DASH, this possibility for the client makes it possible to reduce the latency of the client while ensuring that the second request will not interfere with a PUSH_PROMISE that will be received later.

The client may also request other resources that it needs, if it determines from the results of the algorithm that these other needed resources are not about to be pushed.

According to second embodiments, the shared push policy is defined in exchanges between the client and server, either explicitly by defining the whole rule (i.e. algorithm or parameters of the algorithm), or using references to push policies predefined at both sides. This requires for the server to first determine a push policy information describing the push policy of the server. Then the push policy information is transmitted to the client to share the push policy with the client. Correspondingly, the client thus receives, from the server device, push policy information describing the shared push policy.

Figure 15A:
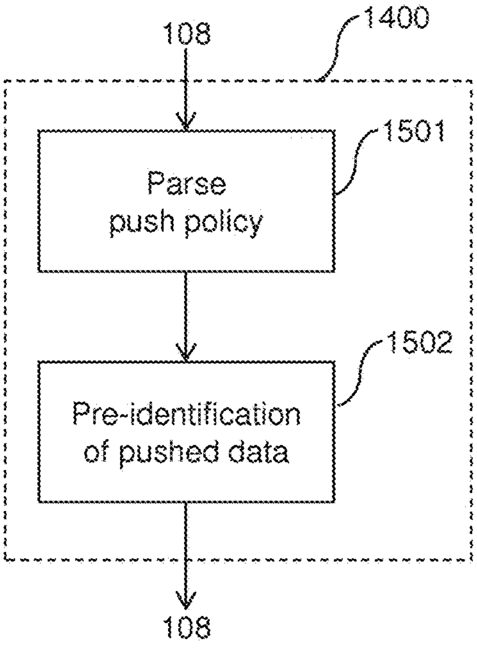
FIG. 15*a* illustrates, using a flowchart, steps of determining the shared push policy at the client side based on the explicit approach.
Figure 15B:
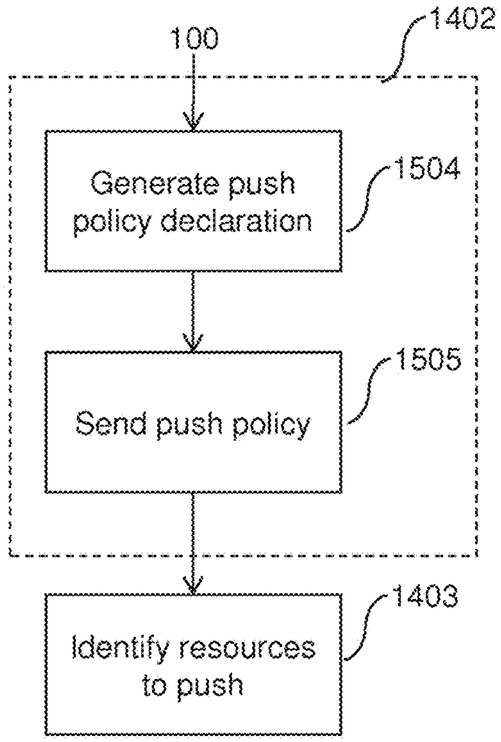
FIG. 15*b* illustrates, using a flowchart, steps of determining the push policy at the server side when the explicit approach is used.

One advantage of the explicit approach relies on the fact that a different push policy could be used by the server for each client or for each multimedia presentation (e.g. each MPD), in order to better meet their processing characteristics. FIG. 15*a* illustrates, using a flowchart, step 1400 of determining the shared push policy at the client side based on the explicit approach, while FIG. 15*b* illustrates, using a flowchart, step 1402 of determining the push policy at the server side when the explicit approach is used. As shown in FIG. 15*b*, the server generates at step 1504 a message to declare the push policy and then sends it to the client at step 1505, in order to share it. The information describing the push policy in the declaration message is referred to as push policy information.

Figure 17:
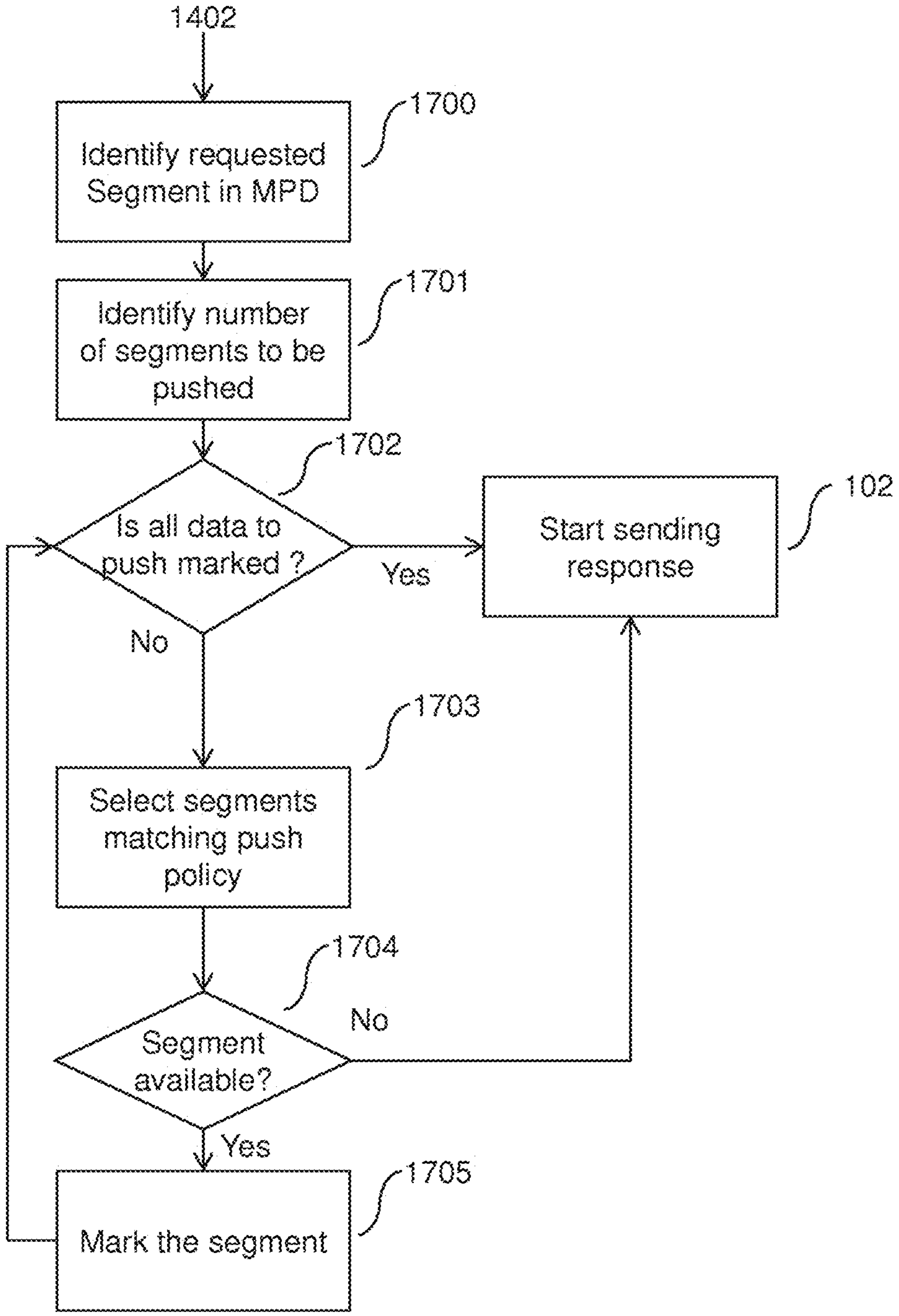
FIG. 17 illustrates, using a flowchart, steps for identifying and marking some segments as ready to be pushed according to the shared push policy "PushPolicy"

FIGS. 16 to 18 described below give exemplary details on how the push policy is declared and transmitted to the client.

The resources to be pushed using the push policy as determined at step 1402 are then identified at step 1403 with the selection algorithm (or second media data determining algorithm) defined in the push policy declaration message generated in step 1504.

On the client side as shown in FIG. 15*a*, the client is able to pre-identify the resources to be pushed for a given resource request by applying the same selection algorithm. This makes it possible for the client to predetermine the data that will be pushed by the server and thus ensure an efficient management of push data and a reduction in the number of GET requests if appropriate.

To apply the same selection algorithm, the client receives the push policy information describing the push policy applied by the server.

Various push policy declaration methods may be used.

In one embodiment, the push policy declaration is shared thanks to a JavaScript program that takes, as input parameters, a request R and a DOM tree corresponding to the document containing the resources to be pushed (typically the manifest file for DASH) and that outputs an ordered list of resources to be pushed. In this embodiment, the push policy information includes a JavaScript program embedded in a web page transmitted from the server device to the client device.

In other embodiments, the push policy is described within the manifest file. That is the push policy information describing the shared push policy is inserted in a description file that is transmitted from the server device to the client device using the shared push policy. The description file contains description information that concerns media data including the first media data, and is used by both sides to determine the second non-requested media data to be pushed.

In DASH, the description file is for instance the MPD file. The description below is mainly based on DASH and MPD files. However, the same approach applies to other manifest-based streaming methods like Smooth Streaming or HTTP Live Streaming.

According to specific embodiments, the push policy information includes a first push attribute defining an amount of second non-requested media data to be identified in a description file. This makes it possible to specify the number of segments to be pushed after one request R is received from the client.

This is illustrated by FIG. 16 which shows an MPD document in which a PushPolicy node 1600 is used to specify the push policy applied by the server.

In this example, the PushPolicy node 1600 includes a push attribute, namely "SegmentIdx", to declare the number of segments to be pushed after a GET request is received. For instance, if the client requests segment 1601 in its GET request, it will receive, as a response, a PUSH_PROMISE frame for the next two segments in parsing order of the MPD document. In this example, the first push attribute identifies the second non-requested media data relatively to the first media data requested within the description file. More generally, a predetermined number of K segments to be pushed is used to define the push policy value. Consequently, for each segment requested by the client, the server will push the K next segments.

Figure 2:
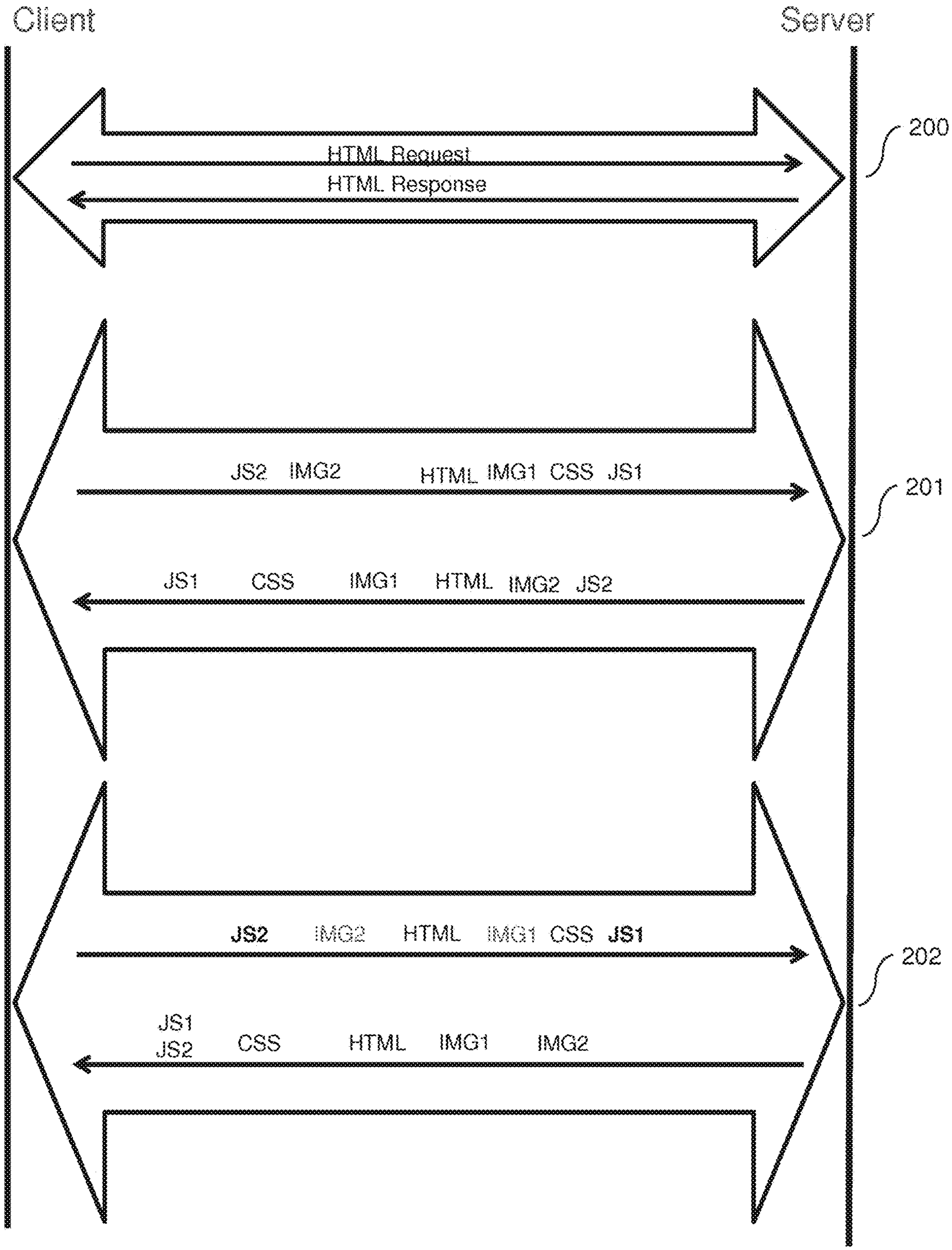
FIG. 2 illustrates exchanging multiple request and response priorities in parallel.
Figure 3:
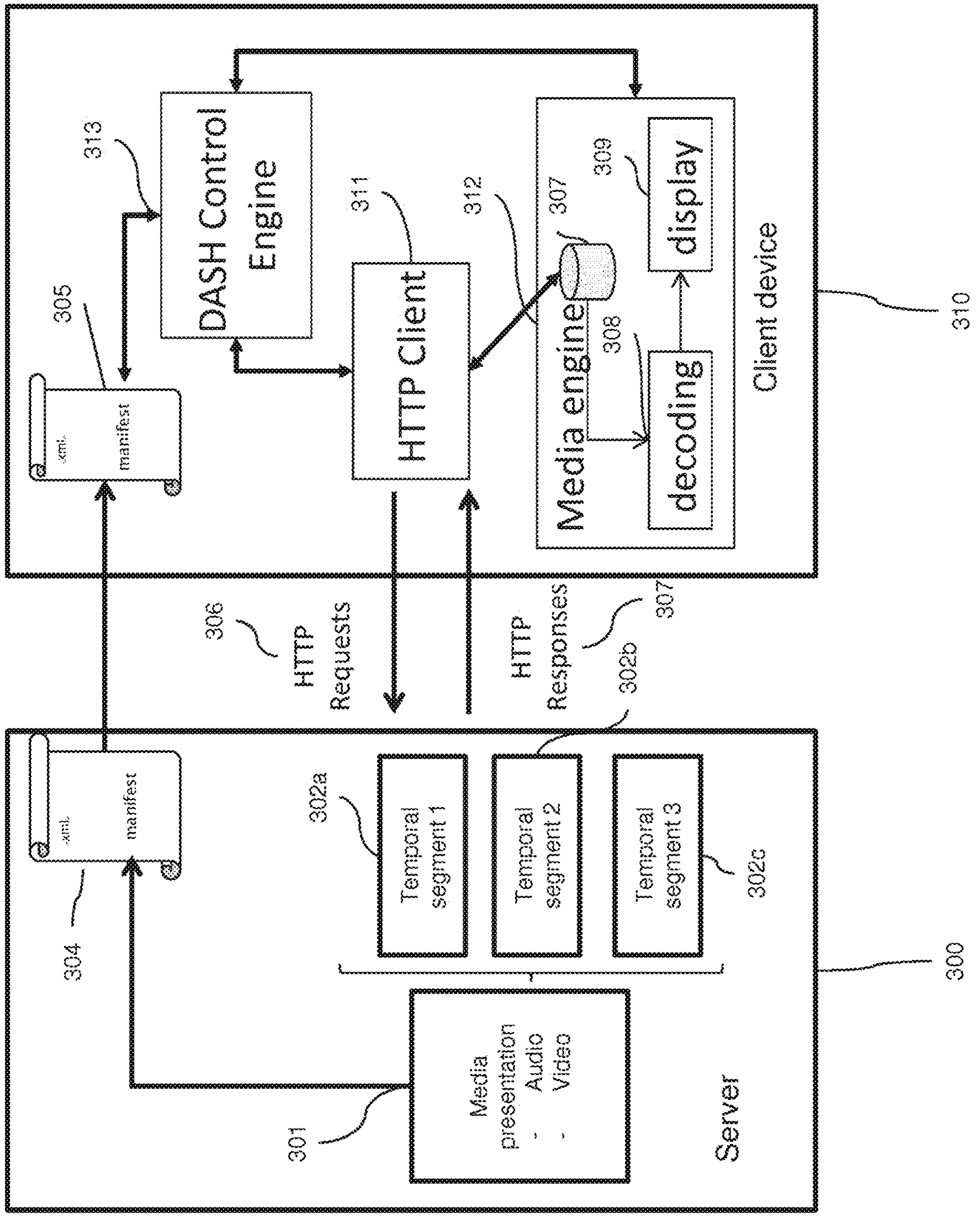
FIG. 3 is a block diagram illustrating Media streaming over HTTP.
Figure 4A:
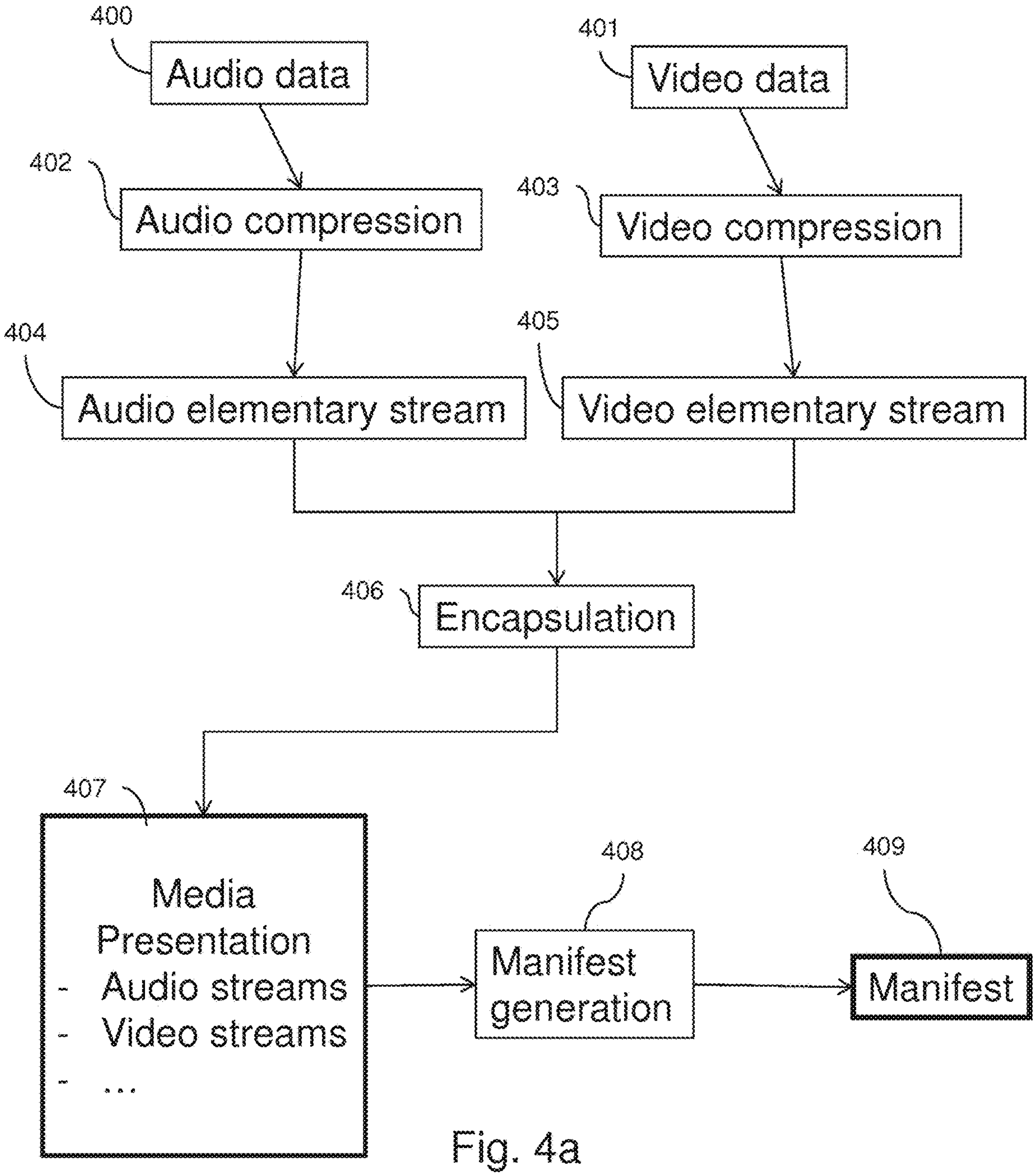
FIG. 4*a* illustrates the generation of the media presentation and the manifest file.
Figure 4B:
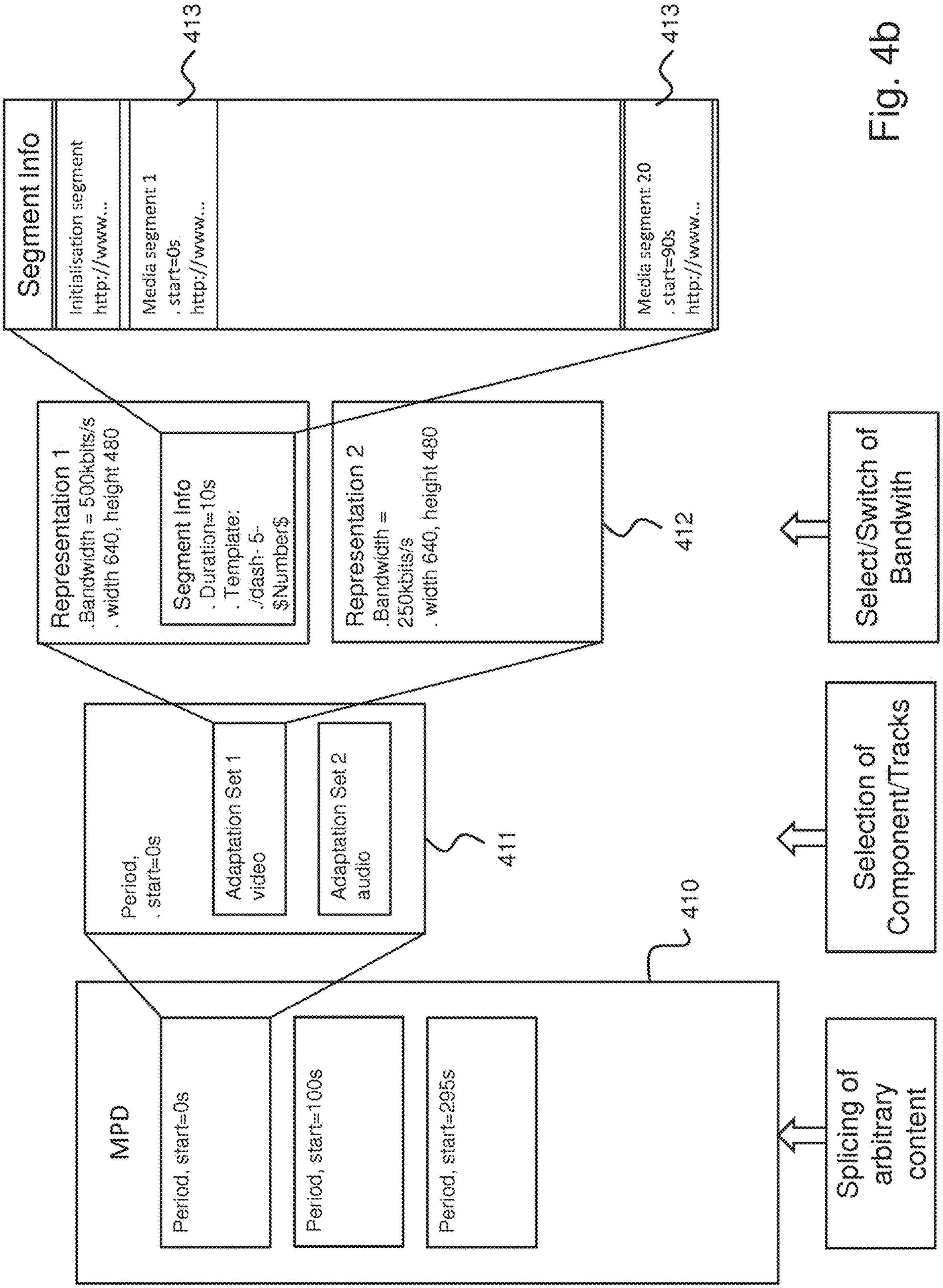
FIG. 4*b* illustrates streaming protocol for MPEG/DASH.

Whereas the example 1600 of FIG. 16 shows a single push attribute, there may be several push attributes. Each push attribute may represent a constraint on nodes of the DOM (Document Object Model) tree representing the manifest for selecting the segments to be pushed. Referring to the previous example of FIG. 4*b*, the push policy node 1600 can refer to media data described in the description file (MPD file) using media data attributes (the MPD elements and/or attributes) including a period attribute "PeriodIdx" that refers to a Period element to which the media data belong, an adaptation attribute "AdaptationSetIdx" that refers to an AdaptationSet element of the media data, a representation attribute "RepresentationIdx" that refers to a Representation element, i.e. an encoding version (specific codec, resolution or bitrate . . . ) of the media data and a segment attribute "SegmentIdx" that refers to a segment in a given Representation.

Based on these existing media data attributes, the push policy information may include at least a second push attribute defining a constraint on the media data attribute or attributes, for identifying the second non-requested media data.

For instance, a push attribute may be related to the PeriodIdx attribute to specify a constraint on the period for selecting the segment to push; another one may be related to the AdaptationSetIdx attribute to specify a constraint on the adaptation; another one may be related to the RepresentationIdx attribute to specify a constraint on the representation; in addition to the above first push attribute related to the SegmentIdx attribute.

When a push attribute is not present or void, the related media data attribute must be considered as unconstrained.

The value of the push attributes may use the following syntax:

push attribute=[operator] operand where "operator" is optional and takes the value '+' or '-' to define the segments to be pushed relatively ("+" means after and "–" means prior to) to the requested segment, and where "operand" is either an integer value superior or equal to 0 or '*' as wildcard parameter.

FIG. 17 illustrates, using a flowchart, steps for identifying and marking some segments as ready to be pushed according to the shared push policy "PushPolicy". This flowchart illustrates step 1403.

First, the server identifies at step 1700 the segment requested in the manifest file. The request includes an identified "reqSegIdx" of this segment.

For each node type in the manifest file MPD, an index value is attributed to each node. The value is incremented for each Node in the order of appearance in the manifest file.

Next, the indexes of the Period, AdaptationSet, Representation and SegmentURL that correspond to the requested segment (i.e. the segment specified in the GET request) are retrieved by parsing the whole MPD until the requested segment is reached.

The operator and operand values of the push attributes defined in the push policy are used to identify in which nodes the segments to be pushed are defined (except for the SegmentIdx attribute that defines the amount of segments to be pushed, when associated with "+" or "–" operator).

When no operator is specified, the operand value identifies the index of the Node within which the data to be pushed have to be retrieved. For example, where the first push attribute "SegmentIdx" has no operator, it is an identifier, within the description file, of a specific segment to be pushed. In one alternative, when the operator is not specified the operand value may identify range values, for example "SegmentIdx=2-5" would return segments with index equal to 2, 3, 4 and 5.

Otherwise (an operator is specified), the operand value represents an offset value (named "idxOffset") to apply to the index of the requested segment ("reqSegIdx" obtained in step 1700). In such case, the segments to be pushed should be in the Nodes with indexes comprised in the [reqSegIdx, reqSegIdx+idxOffset] range if the operator is "+" and in [regSegIdx-idxOffset, regSegIdx] if the operator is "–". The use of an operator makes it possible to define a media data attribute or attributes of the second non-requested media data relatively to the corresponding media data attribute or attributes of the first media data within the description file.

For instance, let's consider the following push policies:

1. <PushPolicy RepresentationIdx="−1" SegmentIdx="2"/>
2. <Push Policy Period Idx="+1" SegmentIdx="+2"/>
3. <PushPolicy PeriodIdx="+0" SegmentIdx="+2"/>

PushPolicy #1 specifies that the server will push the segment of index 2 in the representation node preceding the representation node of the requested segment.

With PushPolicy #2, the server will push the two segments following the requested segment, either in current period or in the following. For example, when requesting segment 2401 on FIG. 24, segments 2405 and 2402 would be pushed.

PushPolicy #3 is very similar to the PushPolicy #2, the main difference is when the requested segment is the penultimate of the Period. For example, when requesting 2401, only the last segment 2405 in the current Period (instead of two segments) would be pushed. With PushPolicy #3, PeriodIdx restricts the segment search to the requested segment's Period node and thus only the last segment of the Period is pushed (because the segment requested is the penultimate segment in the Period). On the contrary, with PushPolicy #2 the segments can be retrieved from the next period.

In an alternative or as an optional value, the value of the operand may be also '*' (wildcard meaning) which means that any segment should be pushed. When it is associated with operator '+' (respectively "−"), it means that all subsequent (resp. preceding) segments to the requested one should be pushed.

This alternative allows the client to send only a single HTTP request to retrieve all segments of one Period for instance with the following PushPolicy: <PushPolicy Period Idx="+0" SegmentIdx="+*">.

In these examples, the use of the SegmentIdx attribute to identify the second media data (to be pushed) relatively to the requested first media data requires that the second media data are adjacent to the first media data. In an embodiment, the SegmentIdx attribute may include an offset (in addition to the operand) to apply to the index of the requested segment. This shifts the index of a reference segment from which a specified amount of segments has to be pushed. As an example, the syntax of the SegmentIdx attribute may be:

push attribute:[operator]operand[,offset] where "offset" is a positive or negative integer different from 0 to apply to the requested segment index. In such case the search range is [reqSegIdx+offset, reqSegIdx+idxOffset+offset] when the operator is '+' and [reqSegIdx-idxOffset+offset, reqSegIdx+offset] when the operator is '−'.

The syntax of the push policy can also contain conditions like (non restrictive) a maximum size of data or a time in the presentation being pushed, respectively. For instance:

<PushPolicy SegmentIdx='+*[size<500000]'> defines a push policy to push no more than 500 kilo bytes of segments data.

<PushPolicy SegmentIdx='+*[time<0:01:30]'> defines a push policy to push no more than 1 minute and 30 seconds of next segments data.

While the above examples show how to declare the push policy that determines which segments have to be pushed, there may be a need to also specify in which preferred order the segments will be pushed. This information should also be shared between the client and the server.

As an example, the declaration of an order of transmission of the pushed segments as described above with reference to FIGS. 7 to 12 could apply.

In one alternative embodiment for an order of transmission of pushed segments, the description information in the description file includes priority attributes associated with the media data, one priority attribute (for example "priorityIdx") for each media data, and an order of transmission of the second media data is based on the associated priority attributes. Thanks to the transmission of the description file, the client is also aware of the values taken by these priority attributes, and is thus able to determine the intended order of transmission.

As shown in the example of FIG. 16, each segment (for instance identified by one SegmentURL Node) described in the manifest file includes a priorityIdx attribute (1604) which specifies the push order of the segment. In the example of FIG. 16, segment 1603 is pushed before segment 1602. These priorities are computed during the media segments preparation at the server side. Different priority values can be used: a relative priority value in a given Representation (as on FIG. 16) or an absolute priority value either as a 32 bit number with 4 most significant bits for the Period priority, 4 next MSBs for the AdaptationSet priority value, next 8 bits for the Representation priority value and least 16 significant bits for the segment priority. An alternative way of signalling the absolute priority value is to use a comma separated list of priority values, one for each of the above cited levels, for example: priorityIdx='1, 1, 2, 1' to define successively the Period priority, the AdaptationSet priority, the Representation priority and then the segment priority. First embodiment with 32 bit value would give (in binary):

priorityIdx='00010001000000010000000000000001'.

A main advantage of using priorityIdx values is to make it possible to define a priority order between segments from different Representation (typically an associate representation such as an alternate view of the video). It is useful when the push policy consists in sending segments of different Representation sets. A typical use case is for streaming of layered video (a layer being a view in multi-view or a scalability layer in scalable video) where segments from one layer would be interleaved with segments with one or more other layers.

Back to FIG. 17, based on the push policy as defined in the MPD file, the server determines at step 1701 the number of segments to be pushed. This number is directly inferred from the SegmentIdx attribute value: if the operator is not used in the attribute value, this number is equal to 1; otherwise (operator is "−" or "+") the number is equal to the operand value and is assumed infinite when the operand is "*" (but limited by other constraints and by the number of existing segments).

Next, an iterative process composed of steps 1702 to 1705 is applied by streaming server until the number of segments to push is reached (test 1702) to mark each of the segments to be pushed.

For each iteration, the server retrieves at step 1703 the list of segments defined in the MPD file that respect the PushPolicy constraints (Adaptation Set, Representation, Period and Segment constraints and optional conditions).

If the list of segment is empty or all its segments are already marked (test 1704) the process ends and the server starts sending (step 102 above) the response to client's request.

Otherwise, the first segment of the list is marked in step 1705 as to be pushed during steps 103 (PUSH_PROMISE) and 104 (promised segments).

In these MPD-based examples of declaring the push policy, one push policy is defined using a PushPolicy element (see 1600 in FIG. 16).

It is recalled here that the description file describes the media data using a plurality of media data attribute levels, namely the Period, AdaptationSet and Representation elements defined above.

As a slight variant to the above, various shared push policies may be defined at various respective levels of the description file. This is to be able to define various push policies depending on the level (Adaptation Set, Representation, Period) concerned, so as to adapt the push strategy to the content of the media stream.

This is illustrated through FIG. 23 in which the push policy is defined using for example the "SupplementalProperty" descriptor at the desired level, here at the Representation level.

Using a push policy per <MPD> level makes it possible to have a constant and same push strategy across media.

Using a push policy per <Period> level makes it possible to have a push strategy that can vary along time.

Using a push policy per <AdaptationSet> level makes it possible to have a media-adapted push strategy.

Using a push policy per <Representation> level makes it possible to have a push strategy that can be adapted to the media characteristics (bandwidth . . . ).

In the example of FIG. 23, the push policy specified at the Representation level is configured to push more segments for low bit rate video segments (2300) than for high bitrate video (2301), so to avoid using too much bandwidth with push data.

Note that the explanations above with respect to the syntax of the push attributes may also be applied to this slight variant. In particular the push policy can be signalled in a manifest as a new element (as in FIG. 16), or using an existing descriptor with a new schemeldUri (as in FIG. 23) or as a new descriptor (not represented) or any means compliant with MPD schema or MPD schema extension points.

The MPD could also contain a list of alternative PUSH policies each one having a unique identifier (see below for more explanation about the list).

In other alternative embodiments, a push policy may define that segments for complementary Representations are systematically pushed, for example using the following syntax:

<push policy Segments='+complementary'> or value='complementary' when using a DASH descriptor.

In case of layered video, this means that for a requested video segment, each segment at the same time from all Representations declared as complementary Representations (typically through a dependencyId attribute in the MPD signalling dependencies between different Representations) would also be pushed.

Another push policy could also consist in pushing segments from associated Representations, signalled either with the @associationId attribute or with a role='supplementary'.

In case of fully server driven streaming, the push policy could provide information on whether the server behaviour has to be 'aggressive' (or 'optimistic') or 'conservative', i.e. respectively trying to push segments of higher quality or trying to push at the same quality level (preserving bandwidth).

In other embodiments, the push policy is transmitted in a dedicated HTTP header, referred to as "push-policy" header. That is the push policy information describing the shared push policy is embedded in a header of an HTTP frame transmitted from the server device to the client device.

These embodiments make it possible to vary the push policy over time, since they are no longer dependent on the transmission of the MPD file as above and the client and the server exchange using HTTP/2 protocol.

FIG. 18 is an example of communication between a server and client with a push policy transmitted in a HTTP "push-policy" header (the header name "push-policy" is just an example).

The push-policy header includes a list of push attributes, each defining a constraint on the data to be pushed. In particular, the syntax of the PushPolicy described previously may be transcribed to HTTP header syntax.

Figure 18A:
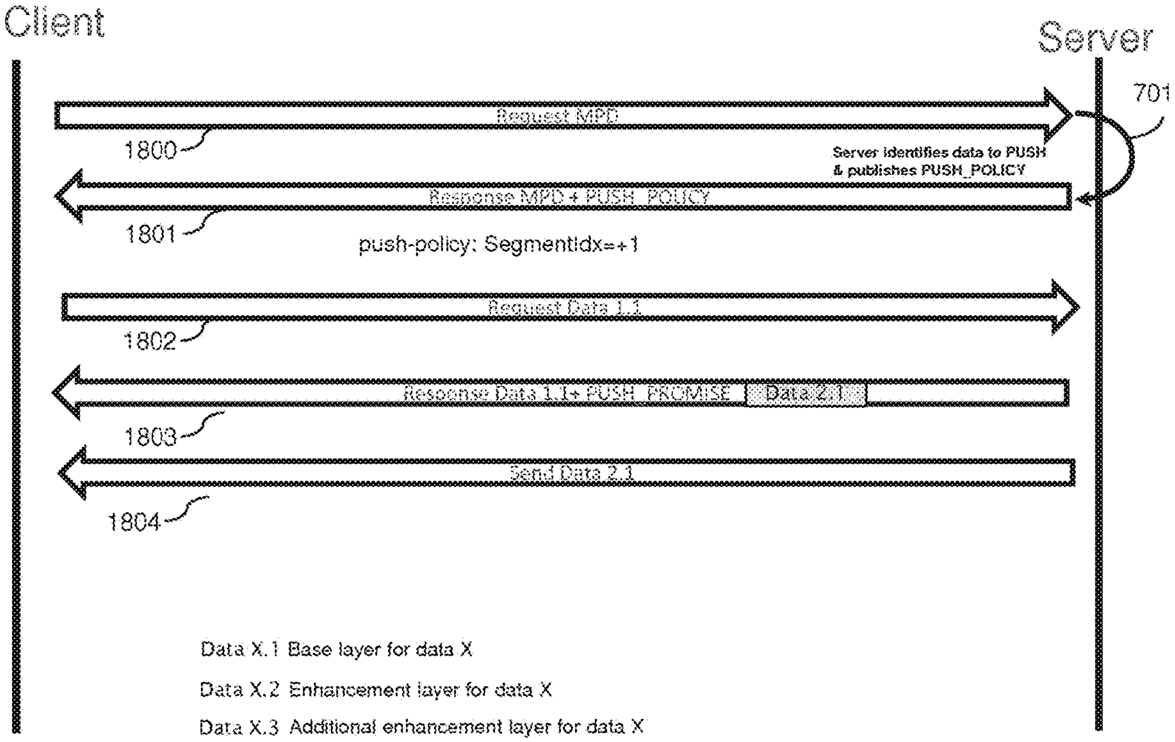
FIG. 18*a* illustrates an example of communication between a server and client with a push policy transmitted in a HTTP "push-policy" header.

In FIG. 18*a*, the server in response to a MPD request from the client (arrow 1800) transmits (step 1801) the push-policy in an HTTP header accompanying the MPD sent, to share the push policy.

For instance, the push policy specifies that the segment following a requested segment will be pushed. As consequence, when the client requests (arrow 1802) segment Data1.1, the server sends (arrow 1803) PUSH_PROMISE for segment Data2.1 and then the data of segment Data1.1 (arrow 1804).

Any syntax could be used to define which data is about to be transmitted for subsequent segment request: a MPD-specific one or a more abstract one based on DOM tree node traversal.

In a specific embodiment dedicated to dynamic shared push policies, the client may request a specific push policy, i.e. may update the shared push policy, for example if the current shared push policy is not adapted to its needs or may be improved.

That means that the client device sends push policy update information embedded in a header of an HTTP frame to the server device. Correspondingly, the server device receives push policy update information embedded in a header of an HTTP frame from the client device. The server device may thus update accordingly the shared push policy before determining non-requested media data from other media data requested by the client device (for instance, for the next request).

In an embodiment, the push policy request from the client is conveyed in an HTTP header or request named "push-policy-request" (name here is just an example).

Figure 18B:
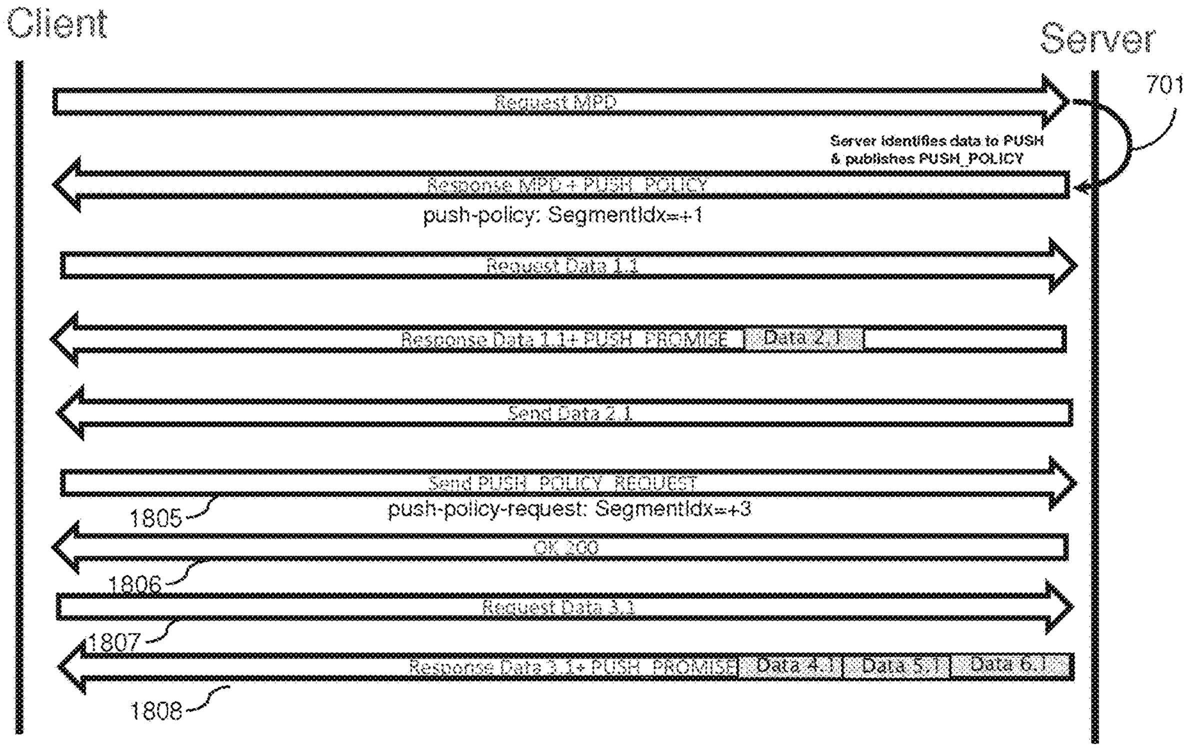
FIG. 18*b* illustrates the same example with a client's request to change the push policy.

FIG. 18*b* illustrates client-server exemplary exchanges when the client requests a new push policy.

The beginning of the exchanges is the same as in FIG. 18*a*.

After receiving segment Data2.1, the client identifies that the current push policy should be modified, for instance because the available bandwidth is stable enough to let the server push more segments in response to a segment request.

As a consequence, the client sends at step 1805 a push-policy-request that asks the server to push more segments (3 instead of 1) for each new request.

The server positively answers this push policy request with an OK 200, at step 1806. This positive answer means the server will use the new push-policy described in push-policy-request for any new request from the same client.

If the server does not want to change its push-policy, it returns an error code answer to notify the client that the push policy request is rejected.

Next, when the client requests at step 1807 a next segment Data3.1, the server answers at step 1808 with PUSH_PROMISE for the next three segments Data 4.1, Data5.1 and Data 6.1.

Figure 21:
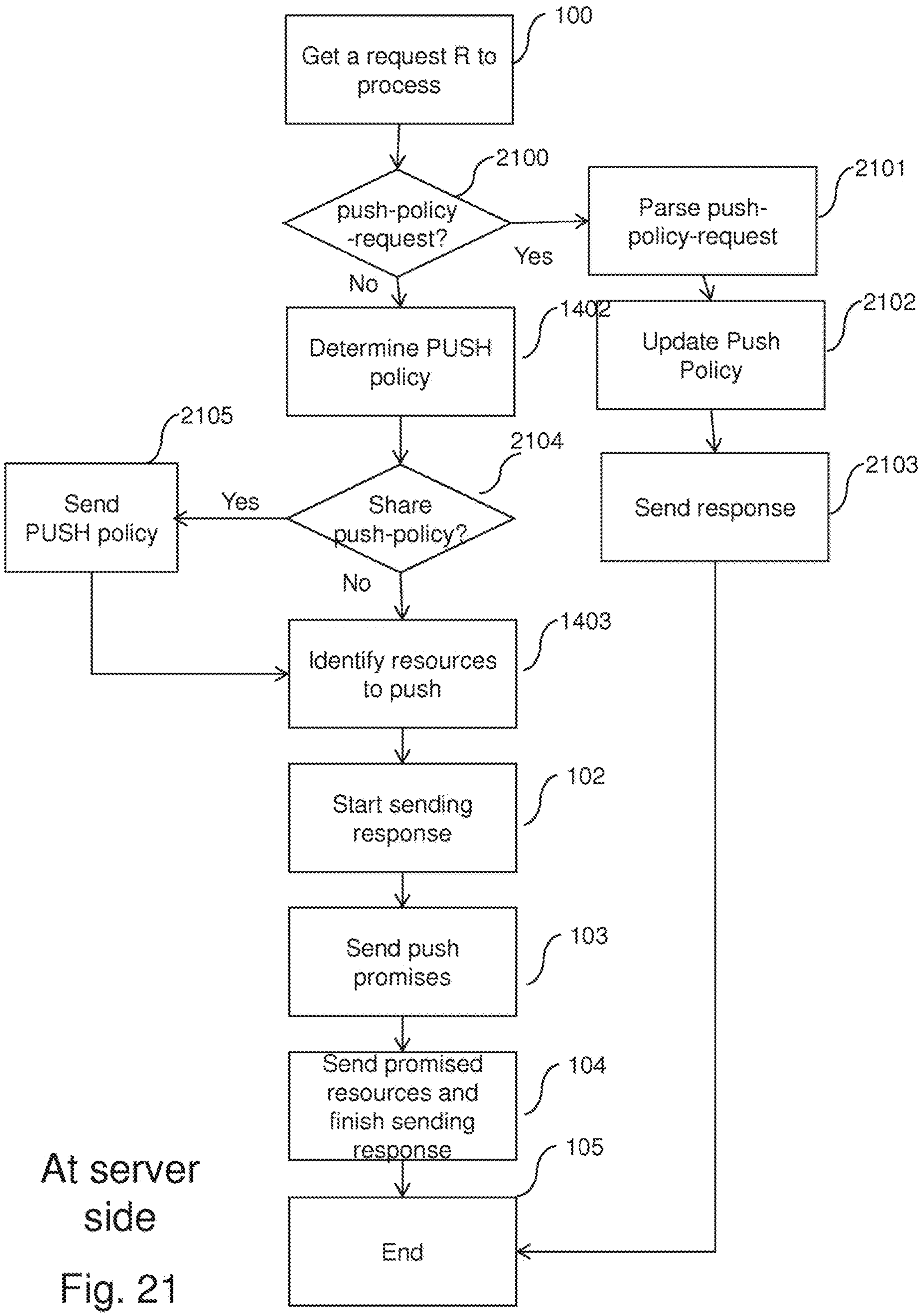
FIG. 21 illustrates, using a flowchart, steps of the process at the server side when using HTTP headers to declare the push policy.
Figure 22:
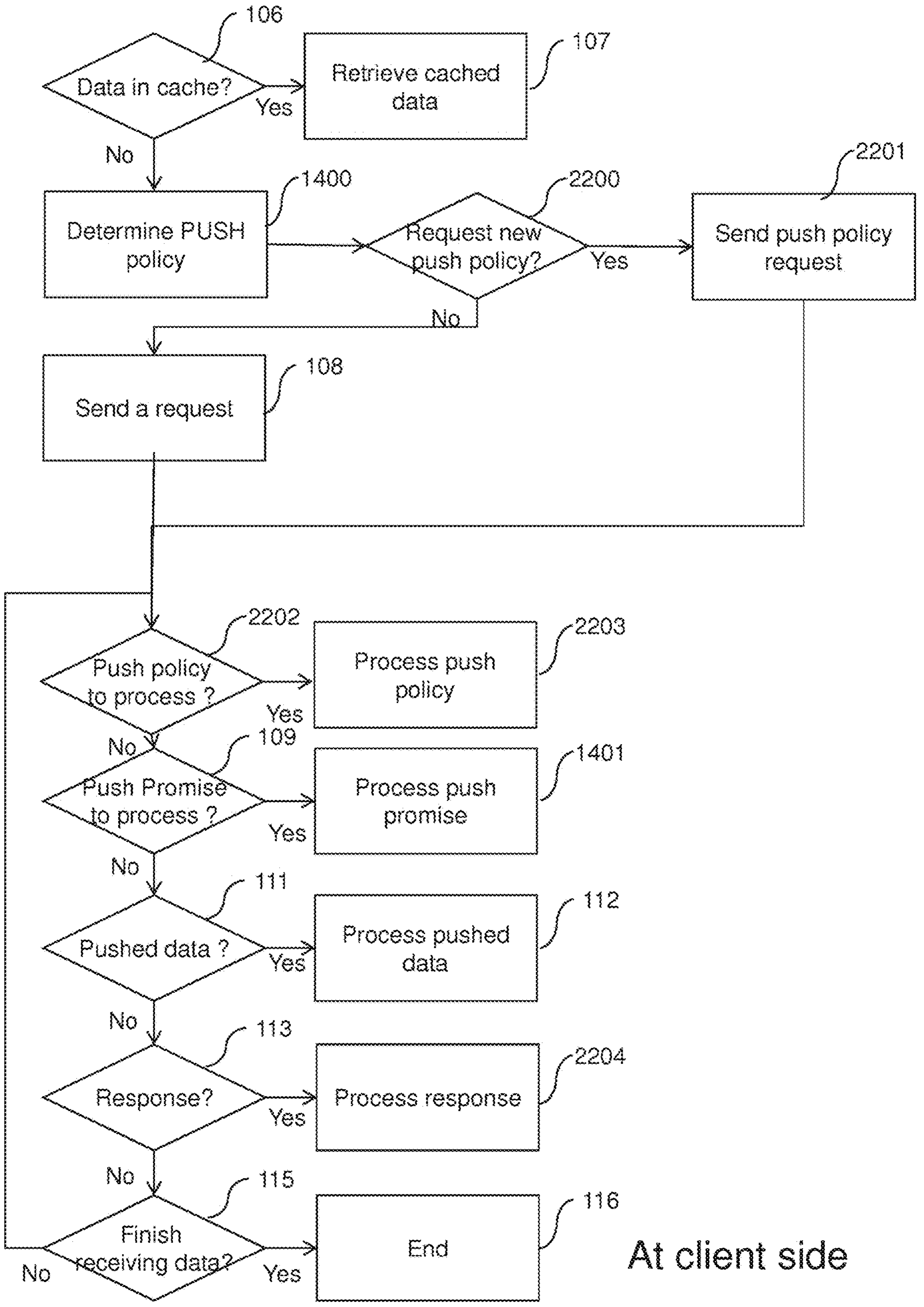
FIG. 22 illustrates, using a flowchart, steps of the process at the client side when using HTTP request to declare and share the push policy.

FIG. 21 illustrates, using a flowchart, steps of the process at the server side when using the HTTP request for sharing push policy, while FIG. 22 illustrates, using a flowchart, steps of the process at the client side when using the HTTP request for sharing push policy.

In comparison to the process of the FIG. 14, the server includes new processing steps (2100 to 2105) to handle a push policy request from the client and also to send the initial push policy and updates thereof.

If the request received by the server is a push policy request from the client (test 2100), the server first parses the push policy request at step 2101 in order to extract the constraints of data push proposed by the client.

During this step, the server may decide to follow the push policy requested by the client. In such case the server updates its internal push policy (step 2102) and sends an OK 200 response to the client at step 2103, in order to validate the proposed push policy.

Otherwise, when the server discards the push policy (for instance because the proposed policy is too costly in terms of resources or cannot be applied), step 2102 does not modify the internal push policy at the server and an error code is transmitted to the client at step 2103.

According to a specific embodiment, the server may in addition update its push policy independently of the client's requests. In such case, the server determines a push policy during step 1402 and may either decide to change its characteristics (for instance by analysing the requests performed by the client and network characteristics) or see that the determined push policy is different from the current one. In such a situation, the server has to share the new push policy with the client if the latter is not already aware of it (test 2104), in which case the new push policy is transmitted in an HTTP header in step 2105.

The corresponding process at the client side is explained with reference to FIG. 22. As for the server processing, new processing steps (2200 to 2204) are added in comparison to the process of FIG. 14 in order to process push policy messages and perform push policy requests.

After having determined the current shared push policy (i.e. the push policy of the server) in step 1400, the client may desire a new push policy, for instance to reduce the number of HTTP requests to send for retrieving segments of a media stream. Thus, when a new push policy is required by the client (test 2200), the client sends at step 2201 an HTTP request with a "push-policy-request" as described previously.

The response to this request is processed in step 2204 in which the client checks whether or not the server validates the request by returning an OK 200 response or otherwise an error code.

If the server returns an OK 200 response, the current push policy determined in step 1400 is replaced by the requested policy. Otherwise it is unchanged.

In addition to the process of FIG. 14, when the client receives a frame with a new push policy from the server (test 2202), the push policy is parsed and stored (step 2203) in memory in order to be retrieved in a next occurrence of step 1400.

It has to be noted that when the push-policy request is in a frame that also includes other data (e.g. media data), the other data are processed through steps 109-111-113-115.

Whereas the above HTTP-based examples use an HTTP request to fully define the push policy to be applied, one specific embodiment may rely on having a set of the same predefined push policies defined at both client and server sides, and each having a unique identifier. In this case, the HTTP request is only used to specify an identifier of the push policy to be used from amongst the set. This specific embodiment reduces the size of the HTTP request.

In one embodiment, the push policy request is sent as an additional HEADER of one of the HTTP requests used for requesting one of the server resource: typically, the push policy request is sent in an "Accept-Push-Policy" HTTP header in the GET request for the MPD file.

In another embodiment, the client specifies several "Accept-Push-Policy" in one HTTP request to indicate the list of push policies supported (or required) by the client. In response to the HTTP request the server may either choose one of the push policy in the proposed list and then specify the push policy in the HTTP response or respond by a new push policy if none is supported.

In yet another embodiment, the push policy request is sent in a dedicated HTTP request independent of any of the resource known by the server. For example, a GET (or POST) request is formed with an URL corresponding to none of the resource of the web page, for instance http://server/push_policy and also with at least one Accept-Push-Policy header.

In yet another specific embodiment, the set of alternative push policies may be defined in the MPD file exchanged between the server and the client, each having a unique identifier. One of the push policies may be marked as default push policy selected by the server. The client may specify which push policy should be used by sending a new push policy request which includes the identifier of the push policy to be used in replacement of the default push policy.

In one embodiment, a specific push policy is defined to indicate which segment will be pushed just after the request to the MPD document for fast start.

In a hybrid approach, the push policy information describing the shared push policy is defined by a first push policy part and a second push policy part, the first push policy part being inserted in the description file (MPD), and the second push policy part being embedded in a header of an HTTP frame transmitted from the server device to the client device.

For instance, the MPD may define the push policy with template arguments that are then defined (or even overloaded) by the server thanks to push-policy HTTP request. As an example, the push policy defined in the MPD file may be: <PushPolicy SegmentIdx="parameter"/> and the value of the variable "parameter" may be defined in a push-policy HTTP request. In this example, the second push policy part comprises (only) one or more values for one or more associated variables defined in the first push policy part.

Using the push-policy-identifier-based approach described above, the description file may include the description of a plurality of candidate push policies, and the second push policy part may thus comprise an identifier of a candidate push policy from said plurality, which identified candidate push policy thereby forming the first push policy part.

In another embodiment to declare the push policy to the client, the push policy relies on the <Role> descriptor defined in the MPD to indicate in which representation the push data will be selected. Typically, the push policy may specify that the push strategy will use a segment in a Representation with an "alternate" or "supplementary" role value.

In another embodiment, the document of resources, for example a streaming manifest or an HTML page, is transformed into a priority tree that is browsed to determine the resources to be pushed after a GET request is received. The navigation within the priority tree may be performed thanks to an XPath request. In this approach, the push policy information includes an XPath expression to be evaluated on a tree representation of the document of resources to identify the second non-requested media data.

For example, in the streaming manifest a "following [name( )="SegmentURL"][2]" XPath expression could be used to select, as segments to be pushed, the next two segments following the segment requested by the client in the GET request. Also for the chapter-switching use case, a "((following[name( )="Period"]//SegmentURL)[2])" XPath expression makes it possible to select two first segments of the following Period for preloading the first two segments of each chapter. For example, when the client requests segment 2401 in the MPD file of FIG. 24, segments 2402 and 2403 of the following Period are also transmitted by the server as pushed data.

In addition, the priority tree could be first re-ordered for example using an XSLT instruction in order to simplify the XPath expression writing for advanced push policy rules. The XSLT instruction makes it possible to reorganise the tree before applying a push policy. The XPath expressions is preferably transmitted to the client, for instance in one HTTP header and the XSLT stylesheet is defined in a web page. This applies in particular to HTML documents for example to group all pictures declared in the document, all CSS resources as consecutive nodes at the same level of the DOM tree.

For instance, the tree 2501 of FIG. 25 represents an HTML page with different resources of different types: hashed nodes (2511-2514) correspond to image resources and nodes in plain color (2521-2524) are scripted resources (CSS or Javascript). The tree 2502 is an example of XSLT transformation result to group the resources by type (images in 2530 and scripted resources in 2540). A simple XPath expression could thus be defined to indicate that some resources for a given type will be pushed once the first resource of this given type is requested.

In all the embodiments described above, it is very likely that for each client request the server replies with several PUSH_PROMISE if the push policy requires several segments to be pushed.

For instance, MPD 1900 of FIG. 19 has a push policy which indicates that the three segments following a requested segment will be pushed (see <PushPolicy> element). Consequently, if the client requests the initialization segment with a GET request for media 1901 with a byte range equal to 0-999, the server will send the three PUSH_PROMISE messages 1902 during step 103.

In one embodiment, if the identified second media data comprise a plurality of media segments, each requiring an announcement message (i.e. a PUSH_PROMISE), the corresponding plurality of announcement messages may be merged into a single announcement message to be transmitted to the client device.

Figure 20:
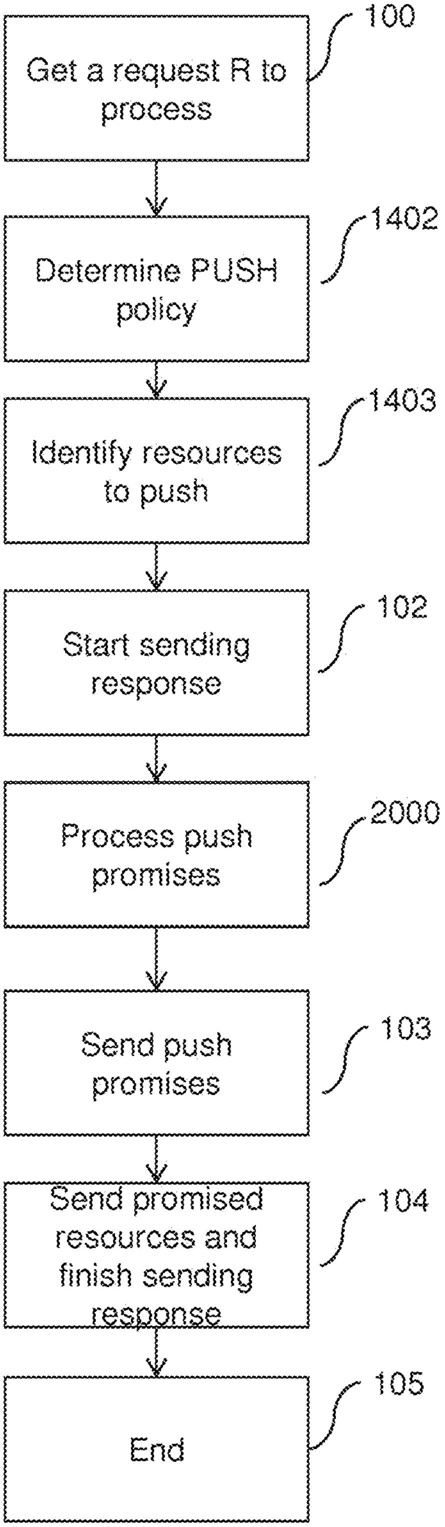
FIG. 20 illustrates, using a flowchart, steps of the process at the server side according to embodiments merging announcement messages.

To achieve this situation, as shown in FIG. 20, the processing at the server preferably includes a pre-processing step 2000 just before sending the push promises in step 103, compared to the general process of FIG. 14. The pre-processing step seeks to perform the above-mentioned merger of announcement messages.

When the push promises include byte range requests as in 1902, the list of push promises 1902 is browsed to generate a reduced set of push promises 1903 that contains consecutive byte range addresses. Next, each set of push promises 1902 is replaced by a reduced set of push promises 1903 with a contiguous byte range equal to the concatenation of the byte ranges in the push promises set or by a single push promise with a list of non-contiguous byte ranges for example 1905.

For instance, the three push promises 1902 are replaced by the single push promise 1903 shown in FIG. 19.

This approach of merging push promises makes it possible for the client to cancel the send of push data in a simpler way and at lower bandwidth and processing costs. This is because the client just has to close a single stream for the single push promise instead of closing several streams for each of the non-merged push promises.

In an alternative, even if the push promises have disjoint byte range intervals, all push promises may be replaced by a list of byte ranges (where consecutive byte range intervals have been concatenated).

In addition, if the push promises do not include byte range intervals but rather different SegmentURL values, the push promises may also be concatenated to generate a single push promise message as follows: the method of the generated push promise message is defined as MGET (for multiple GET) and the path field is a list of segment URLs as represented in 1904. Similar to the previous embodiment, the client has to close the single stream corresponding to the generated push promise to cancel the push of all segments.

Note that the server may include END_SEGMENT flags at the end of each segment in the data then transmitted, in order to ensure that the client is able to parse and identify each pushed segment.

In addition, the SETTINGS frame of HTTP/2 is extended to include a new SETTINGS_ENABLE_GROUP_PUSH_PROMISE parameter that makes it possible to indicate if the grouping of push promises is allowed for the streaming session.

Embodiments of the invention may make it possible to have a DASH fast start because one or several roundtrip(s) can be avoided. This aspect of the invention is now described with reference to FIGS. 26 to 28.

The DASH fast start feature may be used with any communication approach as described above with reference to all or part of FIGS. 7 to 12 and 14 to 25.

Figure 26:
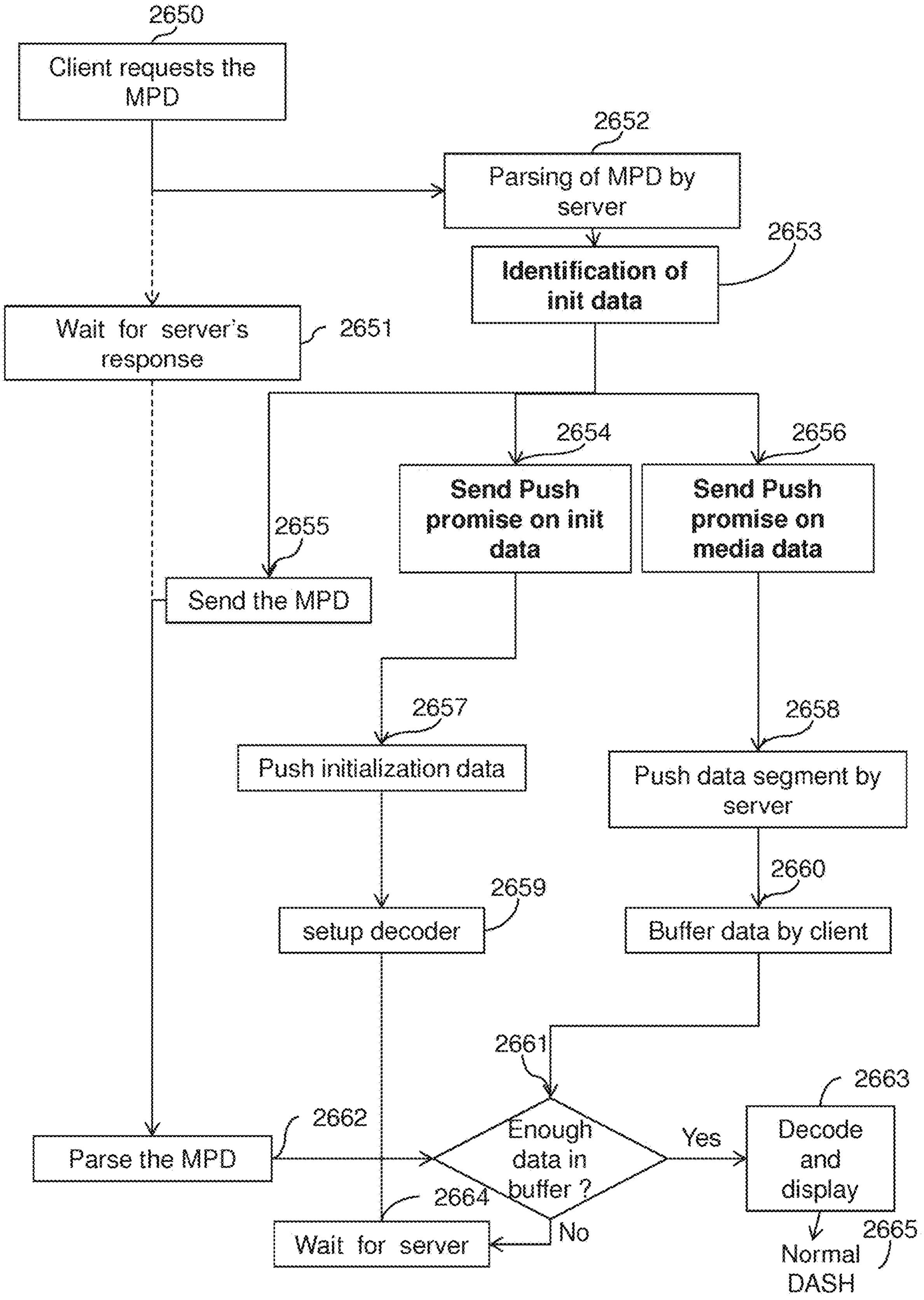
FIG. 26 shows exemplary methods respectively implemented by a server and by a client device to obtain a DASH fast start in accordance with embodiments of the invention.

FIG. 26 shows exemplary methods respectively implemented by a server and by a client device in accordance with the teachings of the invention, in order to obtain a DASH fast start.

As in the standard process just described, the first step consists for the client to request the description file, here an MPD file (step 2650). The client then waits for the server's response (step 2651).

In the meantime, the server analyses the MPD file (step 2652), in particular to identify (step 2653) initialization data which will help the client to start faster, as explained below. An exemplary embodiment for step 2653 is described below with reference to FIG. 27.

Once initialization data is identified by the server, it sends a PUSH_PROMISE frame to the client at step 2654 to indicate its intention to push initialization data without waiting for a client's request.

Possibly, it signals in addition that it will also push initial media data (step 2656) by sending another PUSH_ PROMISE frame including header fields that allow the client to identify the concerned resource, i.e. the concerned initial media data, such as :scheme, :host, and :path.

Both in the case of a PUSH_PROMISE frame for initialization data and of a PUSH_PROMISE frame for initial media data, other header fields are also added by the server to indicate how much the server is confident in the data it has decided to push: in the present embodiment, a confidence level parameter is associated to (i.e. included in a header of) the PUSH_PROMISE frame. The determination of the confidence level parameter is described below with reference to FIG. 27. The server can also insert a specific DASH header to unambiguously indicate the segment that it intends to push.

To minimize the risk that a client will make a request for initialization data and first media data that are to be pushed, the PUSH_PROMISE frames should be sent prior to any content in the response, i.e. step 2654 and step 2656 should occur before a step 2655 of sending the MPD file from the server to the client device.

Thus, when PUSH_PROMISE frames are sent to the client device, the server sends the MPD file to the client device at step 2655.

If the server has not received any CANCEL or ERROR message from the client device in the meantime, it starts pushing initialization data (step 2657) and first media data (step 2658).

PUSH_PROMISE frames and pushing of data from the server to the client device is for instance performed in accordance with corresponding features being developed in the frame of HTTP 2.0, as described for instance in the document "*Hypertext Transfer Protocol version* 2.0*, draft-ietf-httpbis-http*2*-latest*", HTTPbis Working Group, Internet-Draft, Jun. 24, 2013 (available for instance at http://http2.github.io/http2-spec/).

Upon receipt at the client device, the initialization data can be used by the client to set up the decoder(s) (step 2659) and the first media data are buffered (step 2660) until a sufficient amount of data is available for decoding and rendering (e.g. displaying) without display freeze.

When the client has fully received the MPD file, it parses it (step 2662) and starts decoding and displaying (step 2663) provided enough data are buffered (step 2661). If this is not the case, and the client device knows from PUSH_ PROMISE frames sent by the server (see step 2656) that more segments will be sent, it waits at step 2664 for the completion of the push of first media data from the server. During this idle step 2664, the client device may prepare the next requests for subsequent segments that will be issued in a standard client controlled DASH (step 2665), as already explained above. This is possible because the client device has received information on the initial media data to be pushed (or being pushed) in the corresponding PUSH_ PROMISE frame (see step 2656 above) and can thus prepare requests for the temporal segment immediately following the last temporal segment intended to be pushed by the server.

The client device, when it has fully received the MPD, may also use the information on initial media data received at step 2656 to check whether this initial media data fills the buffer and, if not, to send a request for the following media data (e.g. media data corresponding to a temporal segment following the temporal segment represented by initial media data) according to the standard client controlled DASH process prior to step 2661 (contrary to what is shown in FIG. 26 which shows a case where the pushed initial media data fills the buffer). This enables the client to correct a bad estimation from the server on the quantity of first media data to push.

This process enables a streaming client to start displaying media earlier than in standard manifest-based streaming. Indeed, the startup delay is reduced because the number of HTTP roundtrips on the network is reduced to get initialization data and/or initial media data.

This process remains however compliant with the current DASH standard, because:

- there is no modification of the MPD file: its transmission remains light and fast;
- the behaviour of standard DASH clients (i.e. not benefiting from the teachings of the invention) may be unchanged: such client devices would ignore unrecognized HTTP headers and, when not accepting the push feature, would simply have to perform more requests/responses and thus spend more time to start the presentation.

Figure 27:
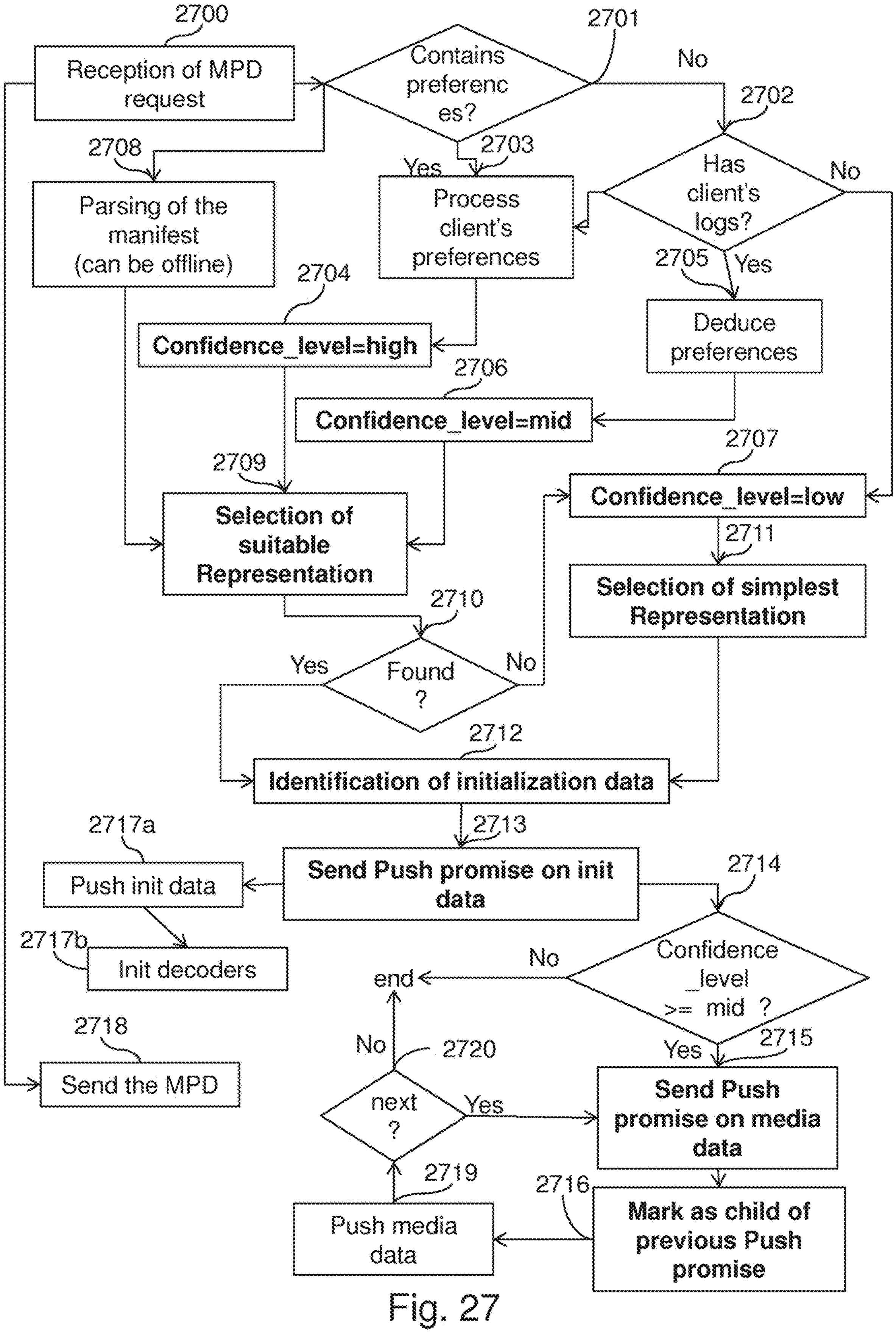
FIG. 27 describes an exemplary method implemented by a server for a DASH fast start.

FIG. 27 describes an exemplary method implemented at the server side following a request for the manifest (or description file) from a client device.

This method seeks to identify the most relevant initial data to push in advance so that the client can start rapidly the display of the media presentation.

In step 2700, the request for the manifest is received. The server then checks at step 2701 whether the client device inserted some preferences in the request. This may be done via a dedicated HTTP header like for example to express a transmission rate for the media presentation and a preferred language for audio stream:

GET http://myserver.com/presentation/pres1.mpd \r\n
Prefered-MediaRange: bw=2000;lang=FR\r\n\r\n If the request includes preferences (test 2701 true), the server analyses the client's preferences (step 2703) and sets its confidence level parameter to the value "high" (step 2704).

If no indication is provided in the request (test 2701 false), the server checks at step 2702 whether it has already registered service usage information (logs) for this client (i.e. statistics or usage data based on prior exchanges between the user or client device and the server) or the information from the User-Agent header. Indeed, the User-Agent header is defined as a HTTP header in RFC2616 (see e.g. http://www.ietf.org/rfc/rfc2616.txt) and provides a means for applications to exchange information like for example operating system, browser type, application name, etc.). For instance, the DASH server may have an authentication scheme for the clients before being able to use the service; in a variation, it can be a user logging before getting access to the service. With such means, the server can link media parameters to a connected user or device.

When prior usage information (logs) is available for the concerned client device or user (test 2702 true), by parsing the logs at step 2705, the server can deduce most frequent usages for a given client or user. For example, it can deduce that the user or client device always selects an audio stream with French language and video stream in HD (High Definition). Moreover, the server can know whether this is a first request in the open TCP connection or not (client connected to service and requesting a second media presentation). In this case, the bandwidth estimation can be more accurate and reliable and the TCP congestion window may be bigger than for a first request. This can impact the choice made by the server in terms of suitable Representation, By registering DASH quality metrics, the server can have in its logs the changes among various representations the user/client usually performs. From this, the server determines the usual behaviour between "aggressive" or constant depending on the frequency of changes (by changes we mean switches to other Representation, whatever the criterion: bandwidth, resolution, frame rate, etc.). An aggressive client is a DASH client that will automatically switch to a different representation when its context changes. As an example, when monitoring bandwidth or buffer occupancy, an aggressive client will request a Representation with a different bandwidth as soon as a new Representation has characteristics closer to the client's context compared to the current Representation. In opposition, a constant client will try to avoid frequent Representation switches in order to maintain stable quality and display rate. When the user/client device behaviour is rather aggressive in terms of adaptation, the server then knows that whatever it selects as initial representation to start the streaming, the client will try to adapt in the following first seconds or minutes of streaming.

When preferences are deduced from logs, the server sets its confidence level parameter to the value "mid" at step 2706. Indeed, this information may be a bit less relevant than explicit preferences signaling by the client itself (test 2701 true).

When no log information is available (test 2702 false), then the server puts its confidence level parameter to the lowest value: "low" at step 2707. This indicates that the server is performing a best guess on the information it pushes because it has no a priori information to decide. Further process in this case is described below (see step 2711).

In parallel of this confidence level parameter computation, the server may parse the manifest at step 2708. In cases where the manifest is not liable to change very often (especially for on-demand service, in opposite to live service), the parsing of the manifest can be performed offline, once for all, by registering the description of the various Representations in a lookup table. This lookup table may also be used by the server to link clients' logs to some parts of the media presentation. This enables a faster log processing (see step 2705 described above) to deduce some client's preferences.

The parsing of the manifest (step 2708) provides information to the server at the time of selecting (at step 2709) a suitable Representation as initial Representation (i.e. initial media data) to start the streaming.

Both steps 2703 and 2705 (obtaining preferences respectively in the request or based on usage data from prior exchanges) consist in translating preferences or usages from client device/user into concrete parameters that would match MPD attributes. For example, it can be bandwidth, width and height of the video, the kind of codec in use, the language for subtitles or audio streams. Then, from the obtained values for these parameters, the server compares with values in the manifest to identify at step 2709 the most convenient Representation to push to the client.

It may be noted that this step 2709 is typically what the client device performs continuously in a dynamic and adaptive streaming protocol like DASH. Here, the same step is performed by the server at the beginning of the streaming session by MPD parsing means.

In case no suitable Representation can be deduced in 2709, test 2710 is false and the server puts its confidence level parameter to the "low" value (in step 2707 previously mentioned).

When the confidence value parameter has the "low" value (either because no preferences could be determined or because no suitable Representation can be found based on preferences), the server decides at step 2711 to select the simplest Representation. For video, for instance, the simplest Representation may be the Representation with lowest spatial resolution and designed for lowest bandwidth. According to a possible complementary feature (not represented in FIG. 27), when there is no ambiguity on the codec (i.e. all video Representations have the same value for the codec attribute, i.e. the same codec, for example HEVC, has been used to encode all the video Representations), the confidence level parameter may be raised to the value "mid".

The next step after step 2711, or when a suitable Representation has been found (test 2710 true), consists in identifying the initialization data (step 2712). Indeed, in the DASH manifest (or description file), initialization information can be signaled in different ways: it can be explicitly put in an Initialization element of a SegmentBase, SegmentList or Segment Template element that provides a direct URL to the initialization data. In this case, this URL is put in a header field of the PUSH_PROMISE frame (see step 2654 described above with reference to FIG. 26) that will allow the client to identify the resource promised to be pushed (by specifying the variables :scheme, :host, and :path and eventually :Range).

When initialization data is not explicitly described, this means that media segments are self-initialized. In such case, the server has to parse the beginning of the segment (e.g. segment index information boxes for segments in mp4 format). Based on this analysis, it can build the corresponding URL with the appropriate byte range that will be put as header in the PUSH_PROMISE frame.

Once identified, a PUSH_PROMISE frame for initialization data is immediately sent to the client (step 2713, corresponding to step 2654 in FIG. 26), immediately followed here by the push of the initialization data (step 2717*a*, corresponding to step 2657 in FIG. 26). When initialization data are received, the client can then initialize its media decoders (step 2717*b*).

Figure 5B:
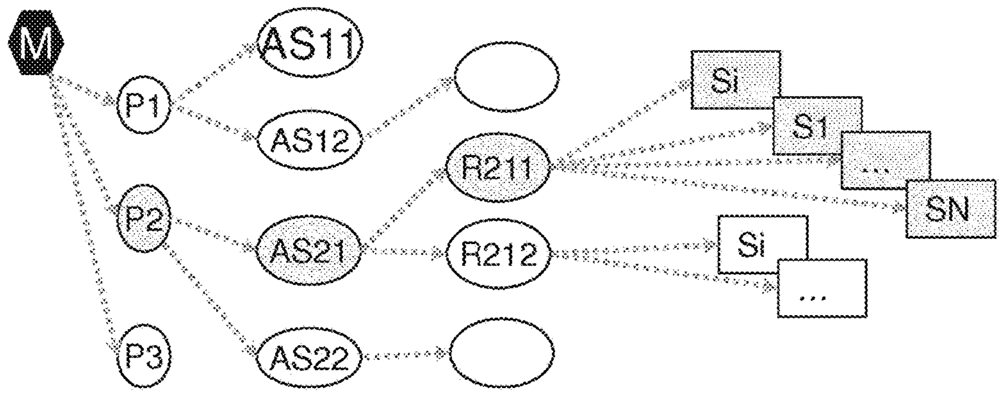
FIG. 5*b* illustrates a tree representation of an exemplary manifest file.
Figure 5A:
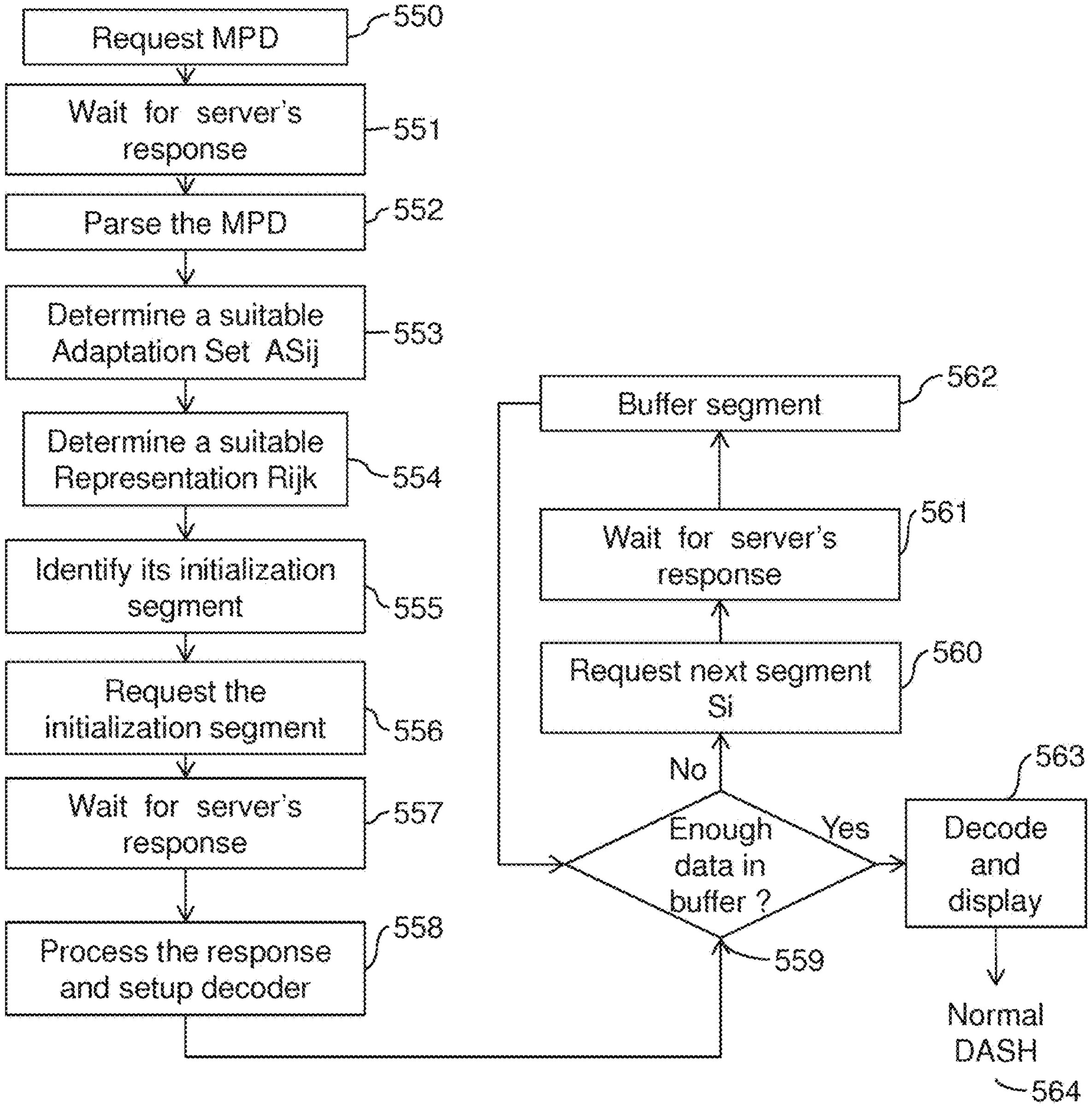
FIG. 5*a* illustrates a flowchart of various steps associated with a streaming session by a DASH client.

Optionally, to improve the segment signaling and later identification by the client device when processing the PUSH_PROMISE frame (see step 2806 described below), the server can indicate in step 2713: the nature of the pushed data: initialization or media or both (in case of self-initializing segments); the parameters of the URL template or an indication of the segment as a path in the MPD representation tree of FIG. 5*b* (for example: P2AS21R211S1; i.e a concatenation of element type followed by an identifier). It may be noted that this requires the client device to have received the MPD. Then, the server can decide to add this specific information only in the PUSH_PROMISE messages that it thinks will be processed after MPD reception by the client device. To help the decision at the client device on accepting or not a PUSH_PROMISE before the MPD reception and parsing, the server can indicate, instead of the segment path in the MPD, qualitative information on the pushed segment, such as whether it is a segment from a base layer or an enhancement layer; according to another example, the server can place in a header the attributes of the selected Representation with their values.

According to a possible embodiment (not represented on FIG. 27), when parsing the manifest at step 2708 determines that initialization data is present in top level elements of the manifest (i.e. whatever the Representations, the initialization data is common to all representations; for example in case of dependent Representation), the server can immediately (i.e. concurrently with step 2708) send the PUSH_PROMISE frame designating initialization data with a confidence level parameter set to the value "high" since there is no risk of mismatch between pushed data and what the client would have chosen. The benefit of sending the confidence level parameter with the PUSH_PROMISE frame, for example as a HTTP header, is that it can help the client device in accepting or cancelling the push promise (see the description of FIG. 28 below).

Thanks to this feature, the client will receive even earlier the initialization data required to setup its decoders (as the PUSH_PROMISE frame is sent early). This also works when initialization data is unique for a given media type (e.g. one single InitializationSegment per AdaptationSet whatever the number of Representations in this AdaptationSet). This even faster push would come just after the parsing of the manifest (step 2708 described above), thus before processing logs or preferences (steps 2701, 2703 and 2705 described above).

Then, if the confidence_level parameter previously determined by the server is greater than or equal to the "mid" value (test 2714), the server takes the initiative of pushing the first media data it considers as suitable for the client.

This is done iteratively in two steps: first a PUSH_PROMISE frame is sent (step 2715, corresponding to step 2656 in FIG. 26) and then the push of first media data starts in step 2719. This is repeated for each first media data segment that has been selected to be pushed in step 2709.

According to a possible embodiment, when consecutive media segments are promised to be pushed (i.e. a plurality of PUSH_PROMISE are sent for respective media segments), the PUSH_PROMISE associated to the current media segment is marked as a child or a follower of a previous PUSH_PROMISE (step 2716). This can be put as a new HTTP header in the PUSH_PROMISE frame if the server is stateless or kept in a table if the server is stateful. Keeping this relationship can be useful to perform hierarchical cancel on push promises (as described below with reference to FIG. 28).

A possible schedule of the various transmissions of data is as follows: before actually pushing first media data, the server starts pushing the initialization data in step 2717*a* mentioned above; in parallel to sending the PUSH_ PROMISE frame relating to first media data and initialization data, the server also sends the MPD file (manifest) at step 2718 and keeps the stream open until the pushed data are completely sent.

In another embodiment, test 2714 can be avoided to push first media data whatever the level of confidence. But in case the confidence level parameter is set to "low", the server may wait for a potential CANCEL from the client before actually pushing the first (or initial) media data.

When pushing the first media data, the server determines the overall quantity of data to push and the speed to use (flow control).

Regarding the first aspect, the server can exploit information from the manifest such as for example the minBufferTime attribute mentioned at the beginning of the manifest. Using this attribute, and considering the Representation selected in step 2709 or 2711, and given the segment duration attribute also provided in the manifest, the server easily determines the number of segments to push to fulfill the minBufferTime constraint (i.e. the quantity of segments, hence the quantity of data, forming the initial media data to be pushed). Advantageously, when parsing of the manifest (step 2708) is performed offline, this number of first media segments can be recorded in a table in a memory of the server.

Regarding the second aspect, given the duration of the segment and the bandwidth of the chosen Representation, an estimate of the required bitrate may be obtained by the server. This provides, mainly for video segments, the transmission rate to use. For example for a compressed video representation with bandwidth equal to 1.6 Mbits/s having segments of 5 seconds duration, each segment would represent 1 mega-byte of data to send. By default, the flow control in HTTP v2.0 provides a stream window size at most equal to 65535 bytes. Thus, in our example, this means that the client would have to send back to the server an acknowledgement for each packet of 65536 pushed bytes, so in our example more than 15 times per segment! Since we aim at reducing network roundtrips and traffic when using the push feature under development HTTP 2.0, we see clearly that there is a need here to modify the default behaviour (actually the default congestion window size) to enable DASH fast start (by reducing network traffic).

In case the client device sends preferences included in its request for the manifest, it can also indicate that a SETTINGS frame is to be sent immediately after the request; this SETTINGS frame specifies for instance an initial window size (SETTINGS_INITIAL_WINDOW_SIZE) in line with its buffering capacities. According to a possible variation, this SETTINGS frame can be sent at connection setup time. Another possibility is for the client device, when acknowledging the first pushed data, to send a WINDOW_UPDATE with appropriate size.

Figure 28:
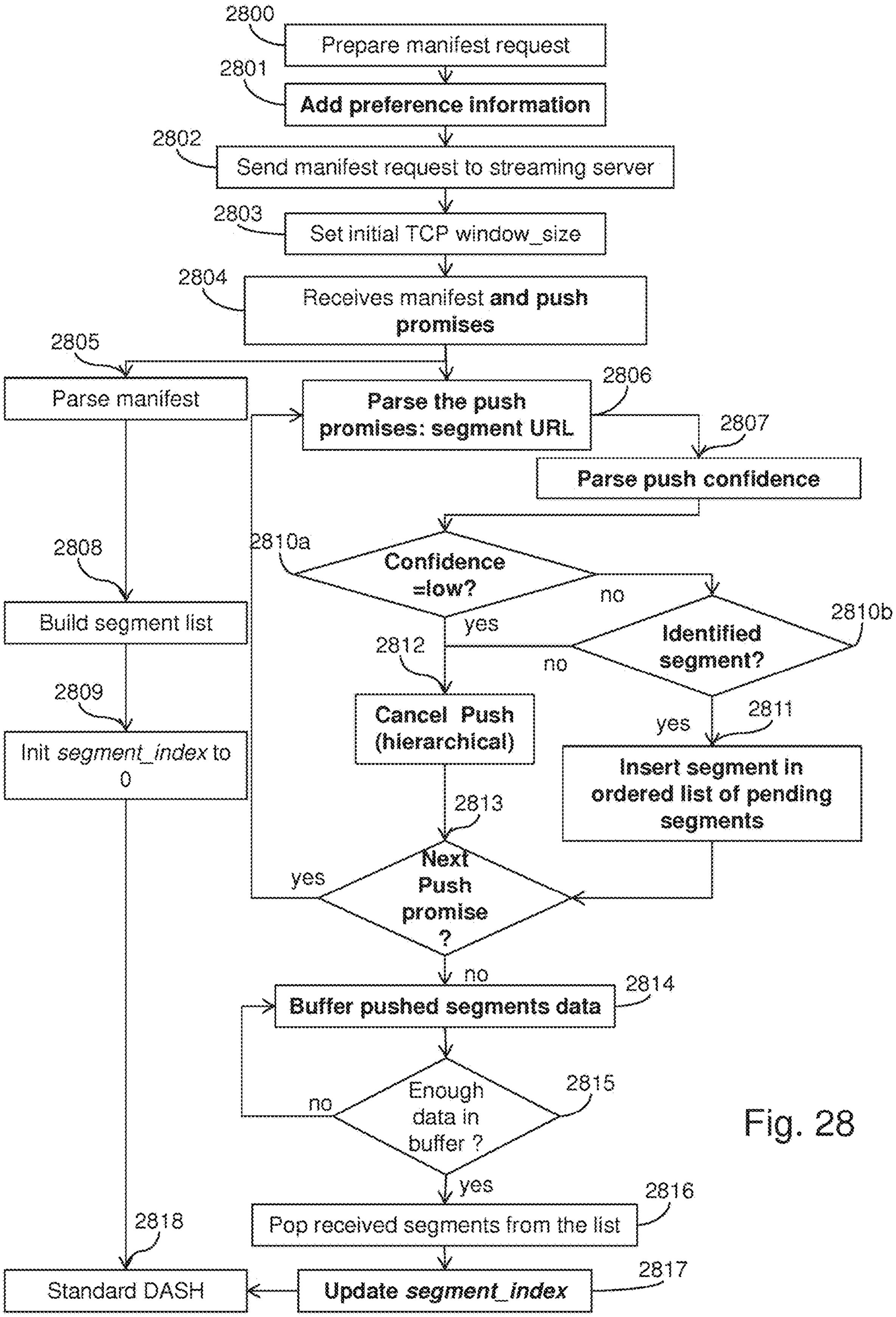
FIG. 28 describes a possible method implemented by a client device for a DASH fast start.

FIG. 28 describes a possible method implemented by the client device, when exchanging data with the server executing a method for instance as described in FIG. 27, in accordance with the teachings of the invention.

According to a possible application of this method, the client device connects to the server in order to benefit from a video on demand service. The connection establishment between the client and the server is conventional. In the present example, both the client device and the server are able to exchange messages using HTTP/2.0 protocol described for instance in the already mentioned document "*Hypertext Transfer Protocol version* 2.0, *draft-ietf-httpbis-http*2-*latest*".

At a time (for instance when the user at the client device selects a given video), the client device gets information from the server on the address (e.g. the URL) of a manifest describing a media presentation (here the video the user would like to see).

The client device then prepares a request to download the manifest (step 2800). In a preferred embodiment, the client adds through HTTP headers some preferences on the video resolution, codecs, bandwidth it supports (step 2801). The client device then sends its request to the server (step 2802).

In the present embodiment, the client device then sends at step 2803 an HTTP/2.0 SETTINGS frame to indicate an initial window size (SETTINGS_INITIAL_WINDOW_SIZE) in line with its buffering capacities (see the document "*Hypertext Transfer Protocol version* 2.0, *draft-ietf-httpbis-http*2-*latest*" mentioned above, section 3.8.5).

In step 2804, the client device starts processing the various server responses: receiving data forming the manifest and parsing it (step 2805) but also the PUSH_PROMISE frame(s) sent by the server (step 2806).

Before deciding to accept or to cancel the push(es) designated in the PUSH_PROMISE frame(s), the client builds the URL of the resource the server intends to push (step 2806) and checks (step 2807) the confidence level parameter that has been included in the PUSH_PROMISE frame by the server.

In parallel and when the manifest (or description file) is fully received, the client device builds (step 2808) the list of desired media segments it would like to get (i.e. the list of versions of each segment that best suit its needs) and initializes a current segment_index variable to 0 (step 2809). The first step in processing the PUSH_PROMISE consists (step 2810*a*) in checking the confidence level parameter. Then, depending on (predefined) client settings or user preferences the client may decide to reject the PUSH_PROMISE under a certain level of confidence, for example the PUSH_PROMISEs for which the PUSH_PROMISE frames include a confidence level parameter with a "low" value.

If the client can match (step 2810*b*) the URL mentioned in the PUSH_PROMISE frame with the URL of a desired segment (as derived from the manifest in step 2808 as just mentioned), it initializes a table for a list of pending segments being transmitted with their transmission status (step 2811). If the client cannot identify the segment intended to be pushed by the server in step 2810*b* in the list of desired media segments, it then cancels the push (step 2812) by sending an appropriate CANCEL instruction to the server.

To facilitate the segment identification at step 2810*b*, the client can exploit additional header information like for example the index of the pushed segment, as the path in the MPD tree representation (see FIG. 5*b*), or the URL template parameters when the description file (i.e. the MPD file or manifest) relies on Segment Template.

This is a specific CANCEL message here (step 2812) since using the hierarchical relationship inserted by the server when building the PUSH_PROMISE (see the description of FIG. 27 above), the client can send a recursive CANCEL that will result in the cancellation of the current PUSH_PROMISE plus the following ones.

According to a possible embodiment, when the client device cannot interpret the push promise, it stops by default all pushes of media data corresponding to the next temporal segments of a media resource.

This new usage of the CANCEL instructions will avoid the client to repeat CANCEL messages once it is desynchronized with the server in terms of media segment identification. In such case, the client will fall back to a pull mode.

When the segment to be received by the push from the server corresponds to a desired segment (test 2810*b* true), the client then continues the processing of the PUSH_PROMISE frames (test 2813 and loop on step 2806).

When all PUSH_PROMISE frames have been processed, the client device expects and begins receiving and buffering (step 2814) data corresponding to the accepted PUSH_PROMISE.

When enough media segments are received in the reception buffer of the client (test 2815), they are processed by the client (2816). The current segment_index variable is then updated with the ordering number of the first segment in the list (step 2817). It should be noted that not all clients may get access to the client's buffer. For example, web applications in particular do not usually have access to the web browser cache. In such a case, the server may send the list of pushed segments to the web application client directly. This information may be exchanged from the server to the client using a web socket connection, for instance.

When all pushed media segments have been processed, the client can then go back to standard pull-based DASH (step 2818), starting requesting data corresponding to the next segment, designated by the variable segment_index+1. In parallel, the pushed segment data are used to start the decoding and the display of the selected video.

Figure 13:
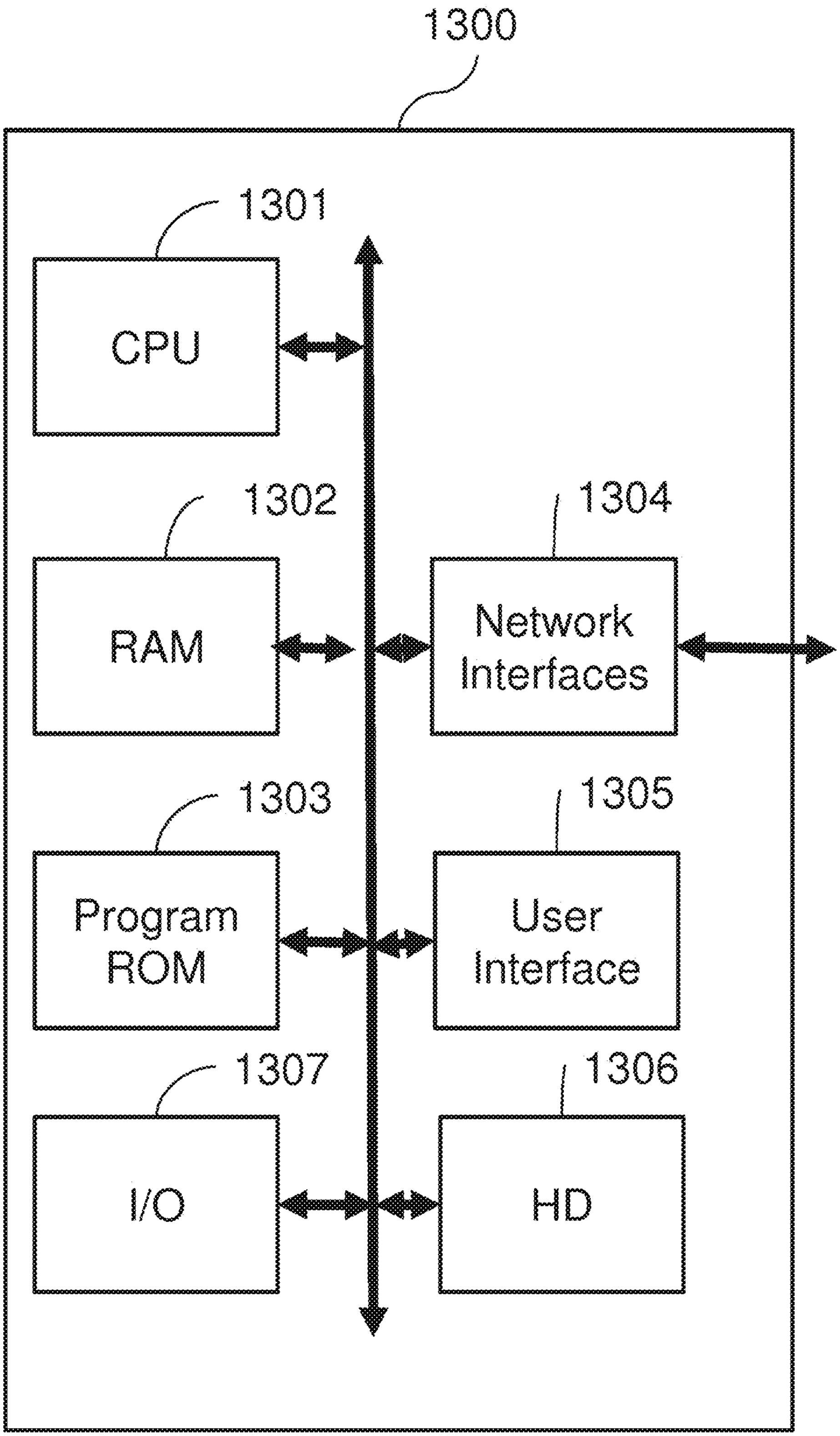
FIG. 13 is a schematic illustration of devices according to embodiments.

FIG. 13 is a schematic illustration of a device according to embodiments. The device may be a server, a client or a proxy. The device comprises a RAM memory 1302 which may be used as a working memory for a control unit 1301 configured for implementing a method according to embodiments. For example, the control unit may be configured to execute instructions of a computer program loaded from a ROM memory 1303. The program may also be loaded from a hard drive 1306. For example, the computer program is designed based on the flowcharts of FIGS. 8-12, 14, 15, 17, 20-22 and 26-28, and the above description.

The device also comprises a network interface 1304 which may be a single network interface, or comprise a set of network interfaces (for instance several wireless interfaces, or several types of wired or wireless interfaces). The device may comprise a user interface 1305 for displaying information to a user and for receiving inputs from the user.

The device may also comprise an input/output module 1307 for receiving and/or sending data from/to external devices.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfill the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A control method of providing data according to media data by a server to a client, the method comprising:
- identifying, at the server, based on push strategy shared between the server and the client, data to be pushed to the client,
- sending, by the server, a notification indicating that the server intends to push the identified data according to the push strategy, and
- cancelling, at the server, in response to receiving a cancel request from the client, push of the identified data to the client.

2. The control method according to claim 1, wherein an acknowledgement message is sent to the client as the notification.

3. The control method according to claim 1, wherein PUSH_PROMISE frame defined by HTTP/2 is sent to the client as the notification.

4. The control method according to claim 1, wherein a message defined by WebSocket is sent to the client as the notification.

5. The control method according to claim 1, wherein the identifying is performed in response to receiving a predetermined request from the client.

6. The control method according to claim 5, wherein the predetermined request is a request for MPD (Media Presentation Description).

7. The control method according to claim 5, wherein the predetermined request is a request for a media segment corresponding to media data of a predetermined time period.

8. The control method according to claim 1, wherein the pushed identified data is notified to the client by the notification.

9. The control method according to claim 1, wherein the cancel request is compliant with RST_STREAM frame defined by HTTP/2.

10. The control method according to claim 1, wherein the cancel request from the client comprises identification information of a stream established to push the identified data.

11. The control method according to claim 1, wherein the identified data according to media data is a media segment which contains the media data.

12. The control method according to claim 1, wherein the identified data according to media data is at least one of (i) an initialization segment which contains metadata to be used for playing the media data and (ii) a media segment which contains the media data.

13. A control method of receiving data according to media data by a client from a server, the method comprising:

sharing, between the server and the client, push strategy for determining data to be pushed from the server to the client, receiving, at the client, a notification indicating that the server intends to push the determined data according to the push strategy, determining, at the client, whether to cancel push of the determined data from the server to the client, and sending, by the client to the server, a cancel request for cancelling push of the determined data according to a result of the determining.

14. The control method according to claim 13, wherein an acknowledgement message is received at the client as the notification.

15. The control method according to claim 13, wherein PUSH_PROMISE frame defined by HTTP/2 is received at the client as the notification.

16. The control method according to claim 13, wherein one or more media data segments are notified by the notification.

17. The control method according to claim 13, wherein the cancel request is compliant with RST_STREAM frame defined by HTTP/2.

18. A server for providing data according to media data to a client, the server comprising:

one or more processors; and at least one memory storing one or more programs configured to be executed by the one or more processors, the one or more programs including instructions for:

identifying, based on push strategy shared between the server and the client, data to be pushed to the client, sending a notification indicating that the server intends to push the identified data according to the push strategy, and cancelling, in response to receiving a cancel request from the client, push of the identified data to the client.

19. The server according to claim 18, wherein an acknowledgement message is sent to the client as the notification.

20. The server according to claim 18, wherein PUSH_PROMISE frame defined by HTTP/2 is sent to the client as the notification.

21. A client for receiving data according to media data from a server, the client comprising:

one or more processors; and at least one memory storing one or more programs configured to be executed by the one or more processors, the one or more programs including instructions for:

performing processing for sharing, between the server and the client, push strategy for determining data to be pushed from the server to the client, receiving a notification indicating that the server intends to push the determined data according to the push strategy, determining whether to cancel to push the determined data from the server to the client, and sending to the server a cancel request for cancelling to push the determined data according to a result of the determining.

22. The client according to claim 21, wherein an acknowledgement message is received at the client as the notification.

23. The client method according to claim 21, wherein PUSH_PROMISE frame defined by HTTP/2 is received at the client as the notification.

24. A non-transitory information storage medium readable by a computer or a microprocessor storing instructions of a computer program, for implementing a control method of providing data according to media data by a server to a client, when the program is loaded and executed by the computer or microprocessor, the method comprising:

identifying, at the server, based on push strategy shared between the server and the client, data to be pushed to the client, sending, by the server, a notification indicating that the server intends to push the identified data according to the push strategy, and cancelling, at the server, in response to receiving a cancel request from the client, push of the identified data to the client.

25. A non-transitory information storage medium readable by a computer or a microprocessor storing instructions of a computer program, for implementing a control method of receiving data according to media data by a client from a server, when the program is loaded and executed by the computer or microprocessor, the method comprising:

sharing, between the server and the client, push strategy for determining data to be pushed from the server to the client, receiving, at the client, a notification indicating that the server intends to push the determined data according to the push strategy, determining, at the client, whether to cancel push of the determined data from the server to the client, and sending, by the client to the server, a cancel request for cancelling push of the determined data according to a result of the determining.

* * * * *